(12) United States Patent
Fukumoto et al.

(10) Patent No.: US 7,536,020 B2
(45) Date of Patent: May 19, 2009

(54) WEARABLE COMMUNICATION DEVICE

(75) Inventors: Masaaki Fukumoto, Tokyo (JP);
Yoshinobu Tonomura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 218 days.

(21) Appl. No.: 11/128,853

(22) Filed: May 13, 2005

(65) Prior Publication Data
US 2005/0207599 A1 Sep. 22, 2005

Related U.S. Application Data

(62) Division of application No. 09/268,486, filed on Mar. 11, 1999, now Pat. No. 6,912,287.

(30) Foreign Application Priority Data

| Mar. 18, 1998 | (JP) | ................................. 10-67939 |
| Mar. 18, 1998 | (JP) | ................................. 10-67940 |
| May 26, 1998 | (JP) | ................................. 10-143627 |

(51) Int. Cl.
*H04R 25/00* (2006.01)
*A63B 21/00* (2006.01)
*A61N 1/00* (2006.01)
*G04C 21/16* (2006.01)
*H04B 3/36* (2006.01)
*H04M 1/00* (2006.01)
*H03K 17/94* (2006.01)

(52) U.S. Cl. .................. 381/151; 381/364; 381/320; 381/114; 607/62; 607/68; 482/131; 368/255; 340/384.6; 340/407.1; 379/433.1; 379/433.06; 341/20; 341/27; 341/34

(58) Field of Classification Search ................ 482/131; 368/168–183, 243–275, 13; 340/407.1, 407.2, 340/5.51, 5.63, 825.39, 825.19, 7.6, 384.1, 340/384.4, 384.5, 384.7, 384.72, 384.73, 340/388.1, 390.2, 391.1, 393.3, 398.1, 566, 340/384.6; 379/433.1, 434, 442, 443, 433.06; 607/62, 68; 341/20, 27, 34; 434/112, 113, 434/114, 116
See application file for complete search history.

(56) References Cited

U.S. PATENT DOCUMENTS

| 4,334,315 | A | | 6/1982 | Ono et al. | |
| 4,791,620 | A | | 12/1988 | Leysieffer et al. | |
| 4,974,250 | A | | 11/1990 | Tomiyori | |
| 5,184,009 | A | * | 2/1993 | Wright et al. | 250/227.11 |
| 5,337,364 | A | | 8/1994 | Fitch | |
| 5,381,387 | A | | 1/1995 | Blonder et al. | |
| 5,499,292 | A | | 3/1996 | Blonder et al. | |
| 5,581,484 | A | * | 12/1996 | Prince | 702/150 |
| 5,659,611 | A | | 8/1997 | Saksa | |
| 5,677,834 | A | | 10/1997 | Mooneyham | |
| 5,692,059 | A | | 11/1997 | Kruger | |
| 5,721,783 | A | | 2/1998 | Anderson | |
| 5,847,658 | A | * | 12/1998 | Irie et al. | 340/683 |
| 5,963,891 | A | * | 10/1999 | Walker et al. | 702/150 |
| 6,141,643 | A | * | 10/2000 | Harmon | 704/271 |
| 6,169,847 | B1 | | 1/2001 | Mizoguchi et al. | |
| 6,380,923 | B1 | * | 4/2002 | Fukumoto et al. | 345/156 |
| 6,411,195 | B1 | * | 6/2002 | Goldman | 340/5.1 |
| 6,431,768 | B1 | | 8/2002 | Nakamura | |
| 6,509,847 | B1 | * | 1/2003 | Anderson | 341/34 |
| 6,515,669 | B1 | * | 2/2003 | Mohri | 345/474 |
| 6,848,083 | B2 | * | 1/2005 | Shen | 715/863 |

FOREIGN PATENT DOCUMENTS

JP 10-200610 7/1998

OTHER PUBLICATIONS

Zimmerman, T. G.: "Personal Area Networks: Near-Field Intrabody Communication" IBM Systems Journal, IBM Corp. Armonk, New York, US, vol. 35, No. 3/4, 1996, pp. 609-617.

Fukumoto, Masaaki et al. "Body Coupled Fingering: Wireless Wearable Keyboard" CHI 97. Human Factors in Computing Systems. Atlanta, Mar. 22-27, 1997, Conference on Human Factors in Computing Systems, New York, ACM, US, Mar. 22, 1997, pp. 147-154.

* cited by examiner

*Primary Examiner*—Wayne R Young
*Assistant Examiner*—Dionne H Pendleton
(74) *Attorney, Agent, or Firm*—Kenyon & Kenyon LLP

(57) ABSTRACT

A wearable communication device includes a bone conduction actuator which is applicable for being in contact with a user's wrist, hand, back of the hand, finger or nail in order to transmit voice signals. The user inserts the user's finger into the user's ear canal, or touches the user's finger to a part near the user's ear, or puts the user's fingertip or nail on the user's ear canal so as to block the user's ear canal when the user uses the wearable communication device. Also, the wearable command input device includes a first part for detecting shock or acceleration which arises when the user taps the user's fingertip on the surface of an object or when the user taps the fingertips mutually and which is transmitted through the user's finger, a second part for detecting specific frequency components which are included in signals from the first part and for detecting the presence or the absence of the tap of the finger of the user, and a part for determining and executing commands based on series of signals output from the second part.

2 Claims, 52 Drawing Sheets

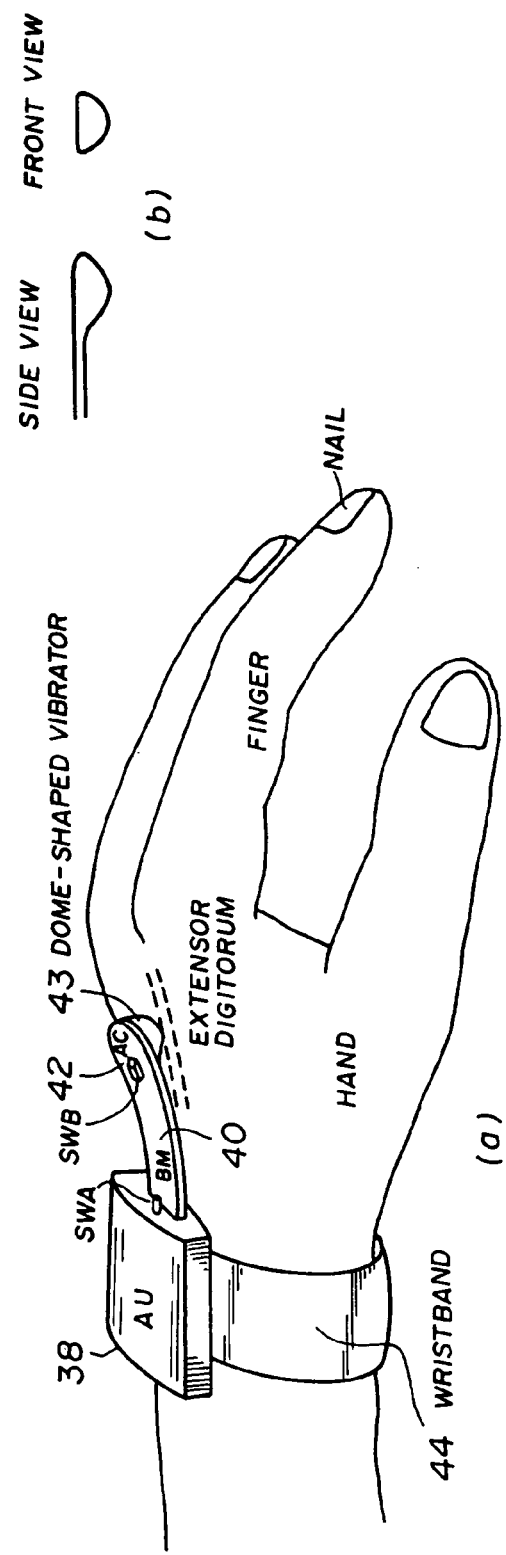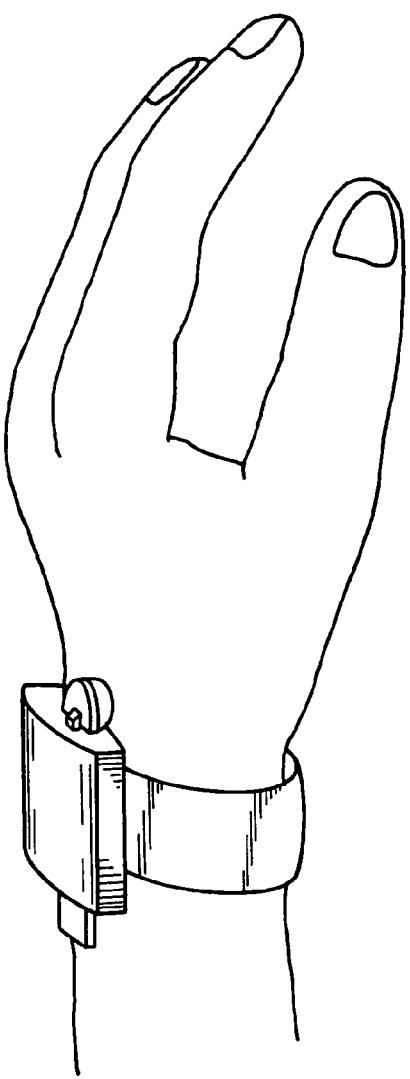
FIG. 13
FIG. 14

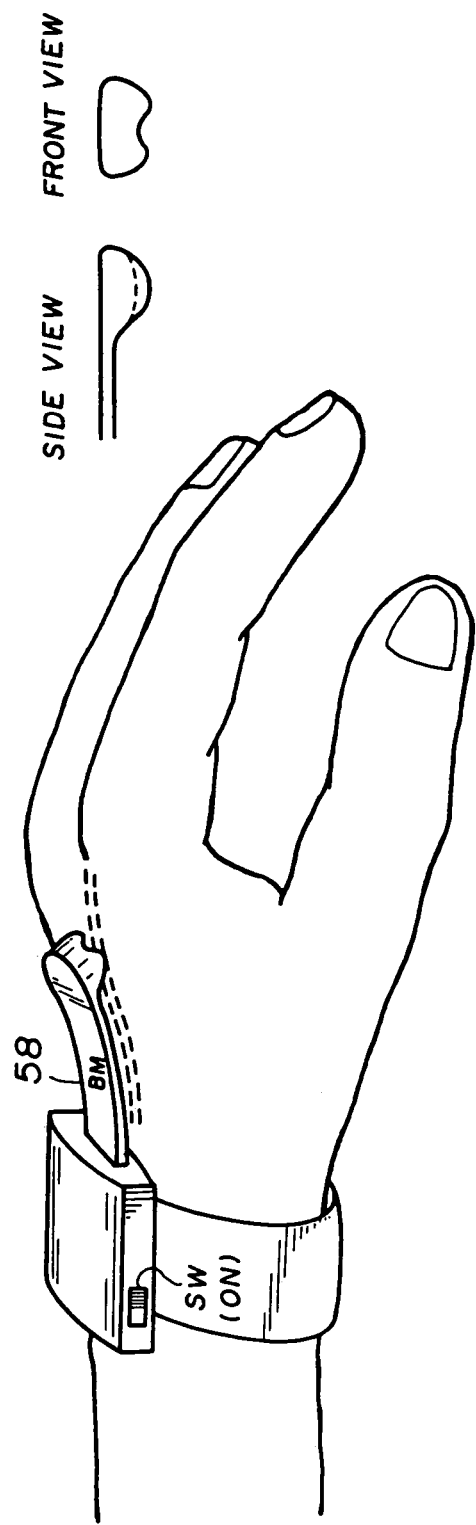
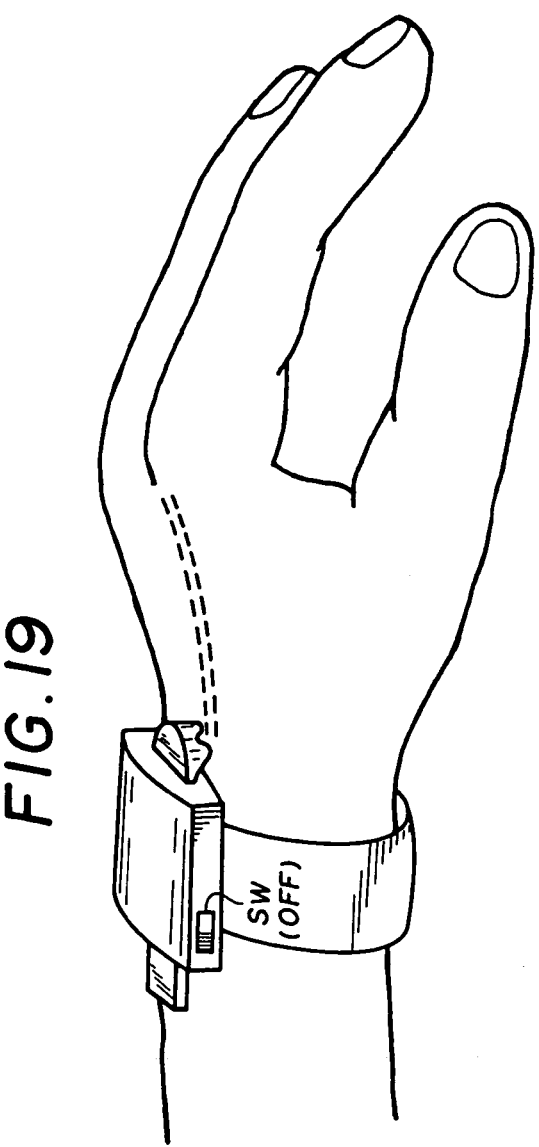
FIG. 17
FIG. 18
FIG. 19

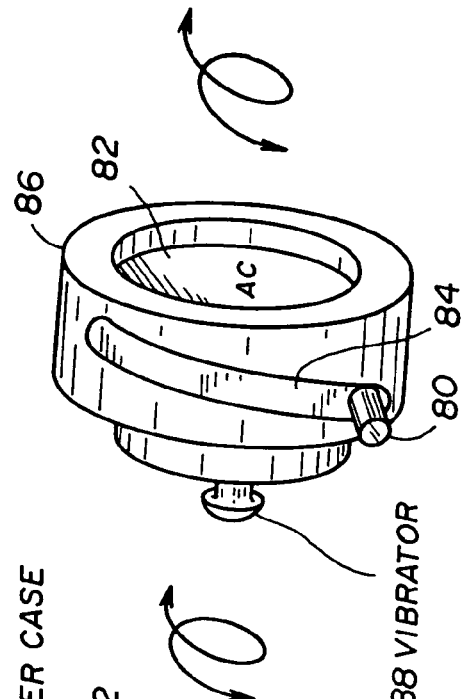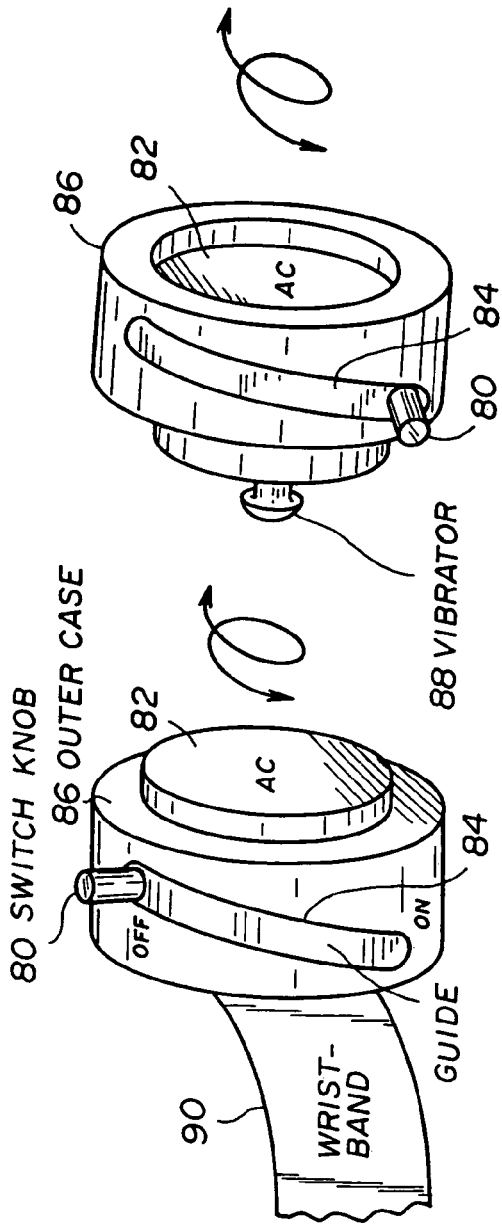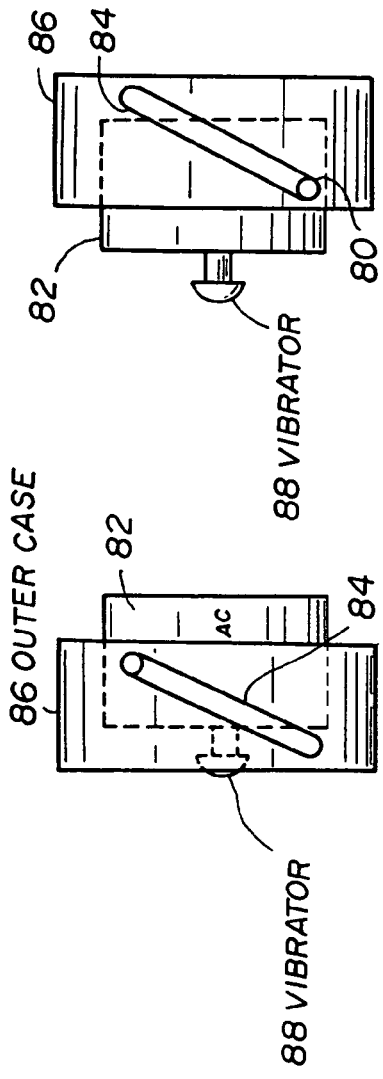

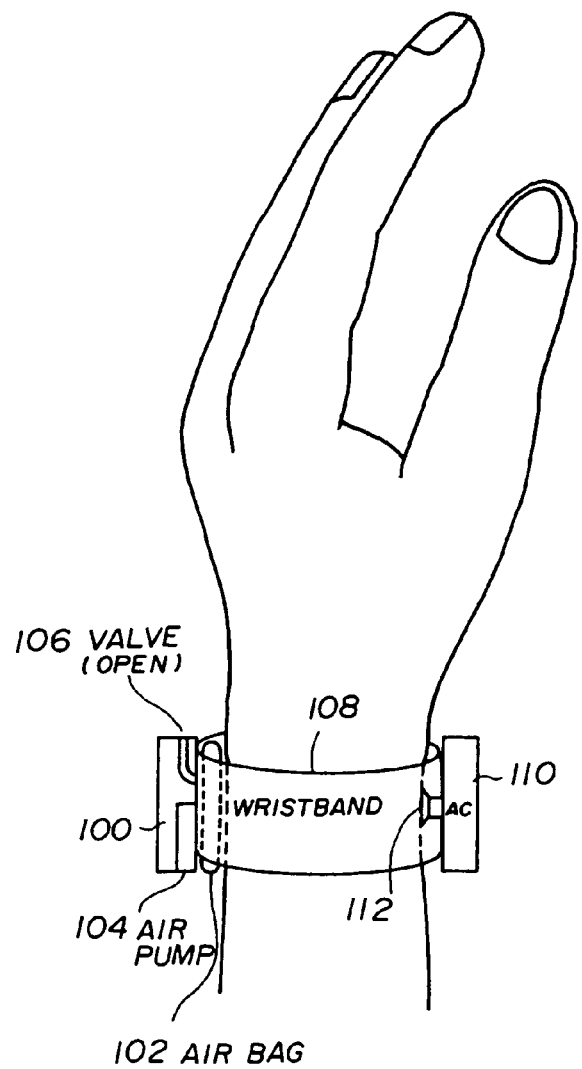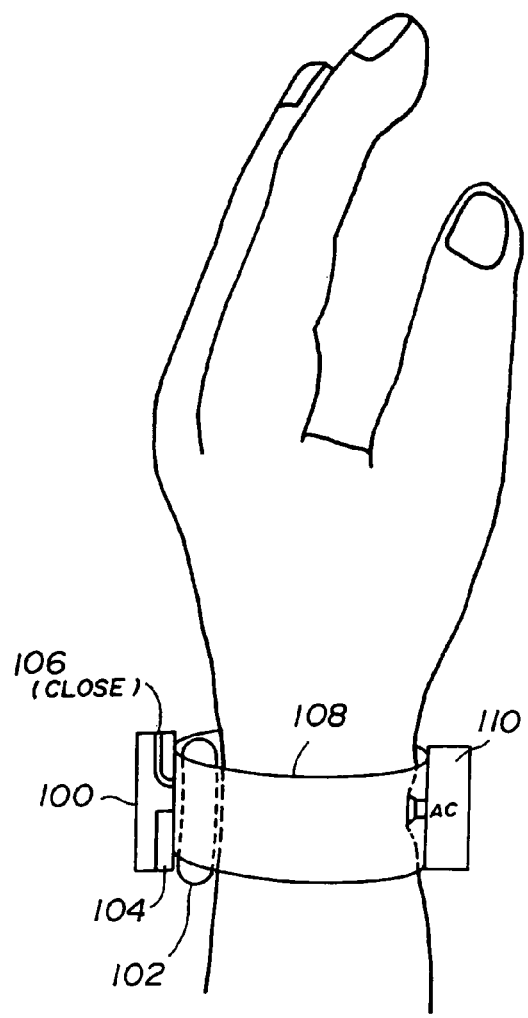

FIG.40
(a)
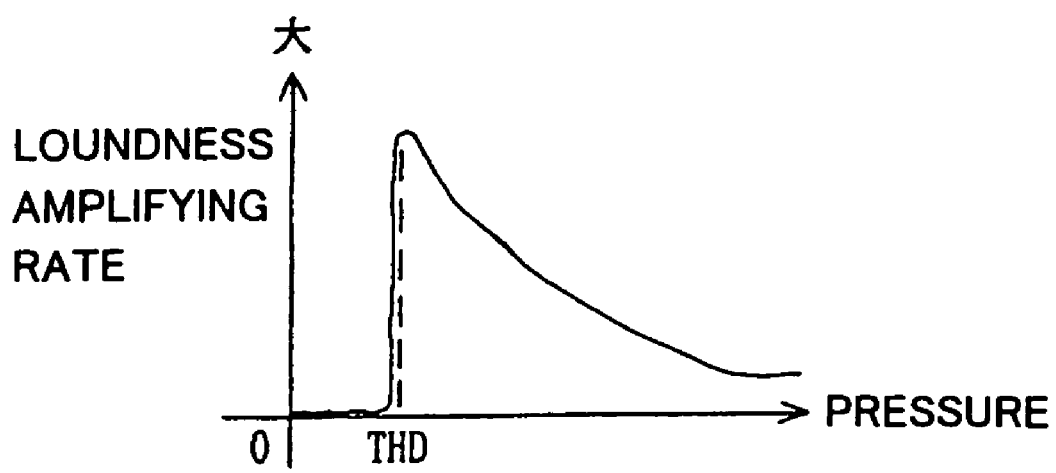
(b)
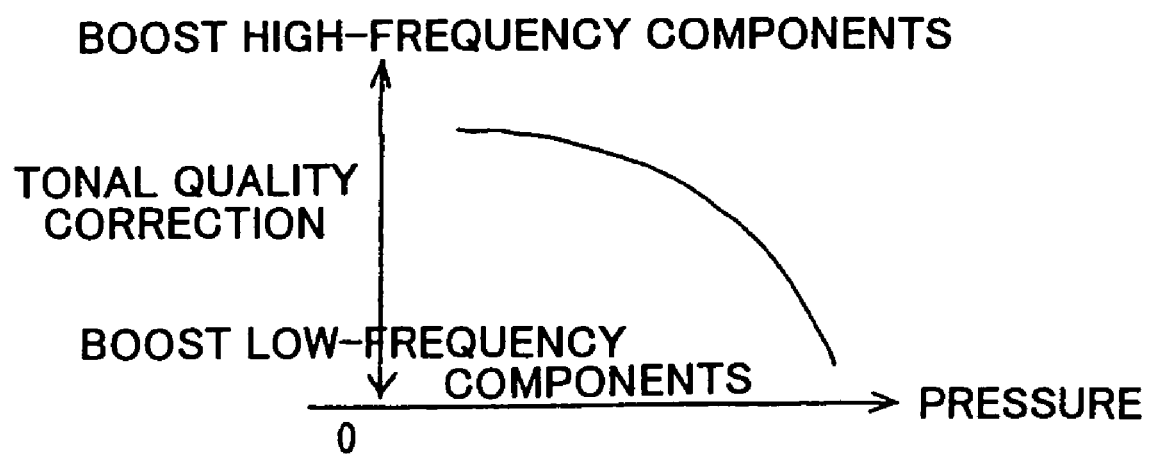

FIG. 59
(a)
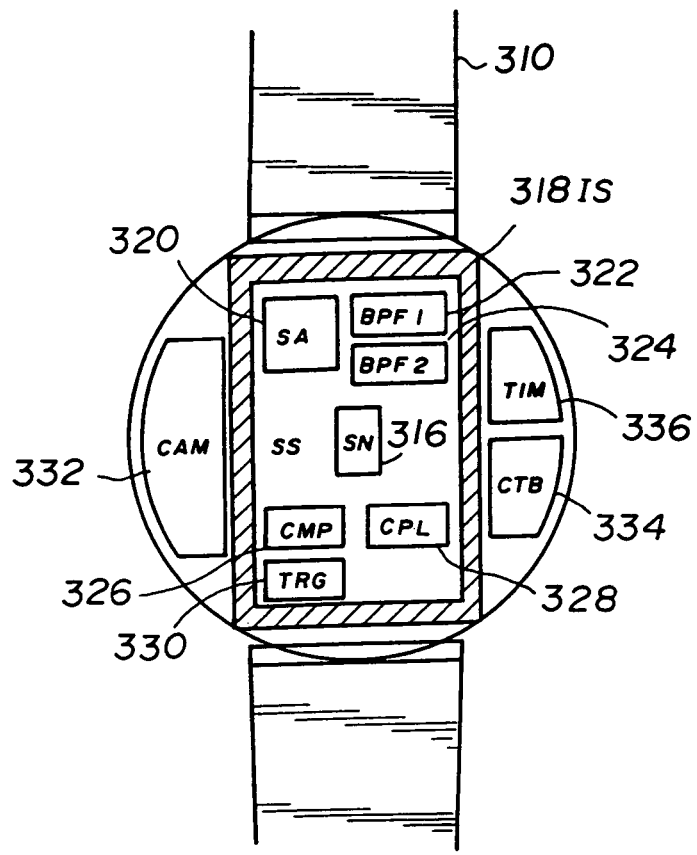
(b)
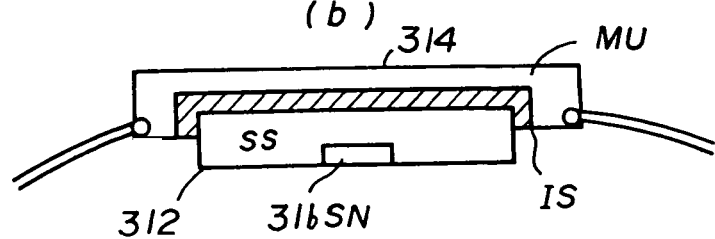
(c)
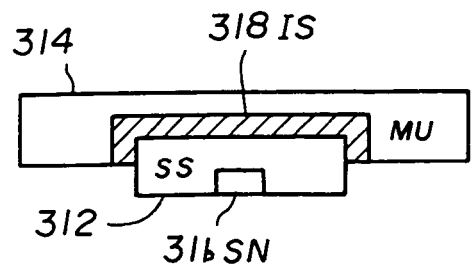

FIG. 61
(a)
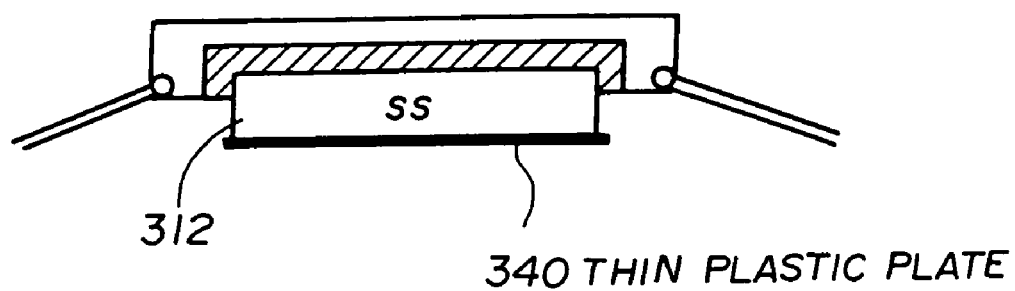
(b)
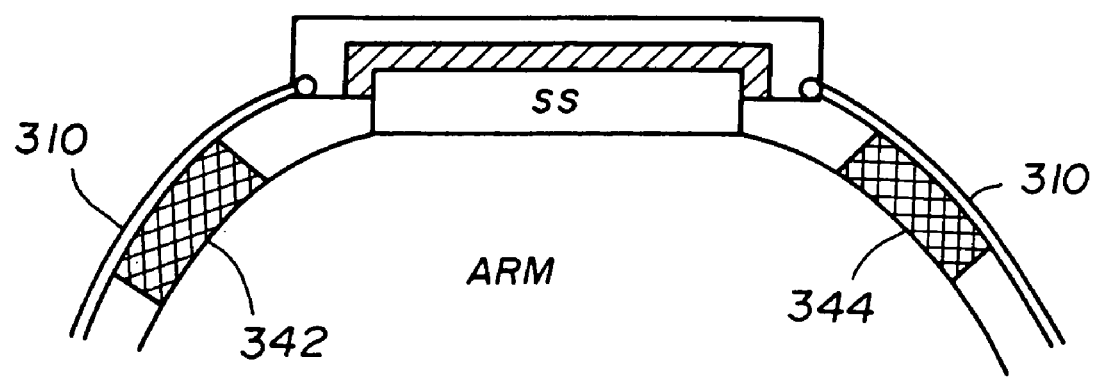

FIG.64

| FCM | CCM |
|---|---|
| 0 1 0 1 | HOOKING / DIALING |
| 0 1 0 0 1 | MEMORY SELECTION |
| 1 | 1 |
| 0 1 | 2 |
| 0 0 1 | 3 |
| 0 0 0 1 | 4 |
| 0 0 0 0 1 | 5 |
| 1 1 | 6 |
| 1 0 1 | 7 |
| 1 0 0 1 | 8 |
| 1 0 0 0 1 | 9 |
| 1 1 1 | 0 |

WEARABLE COMMUNICATION DEVICE

RELATED/PRIORITY APPLICATION INFORMATION

This application claims the benefit and priority of and is a division of U.S. patent application Ser. No. 09/268,486, filed Mar. 11, 1999,now U.S. Pat. No. 6,912,287 which claims foreign priority benefits under 35 U.S.C. § 119 of Japanese Patent Application No. 10-67939, filed Mar. 18, 1998; Japanese Patent Application No. 10-67940, filed Mar. 18, 1998 and Japanese Patent Application No. 10-143627, filed May 26, 1998, all of which are incorporated herein by reference.

BACKGROUND OF THE INVENTION

1. Field of the Invention

The present invention generally relates to a wearable communication device such as a wearable telephone. Further, the present invention relates to a wearable communication device which can be used in a noisy outdoor environment and can be used without annoying surrounding people.

Furthermore, the present invention relates to a wearable command input device, more particularly, to a full-time wearable command input device in which a user can input a command by minute movements of a human body while preventing any improper input caused by bending or twisting the user's wrist from being input as a command.

2. Description of the Related Art

A conventional mobile telephone such as a cellular phone is generally used by being grasped with a hand. However, because a user needs to take the phone out from a pocket or a bag when the user needs to use it, there are disadvantages that the user can not use the phone immediately when he wants to do so and can not respond to a call immediately. Therefore, as a mobile telephone which can be used immediately, a wearable telephone which is used by being worn on a human body is becoming a focus of attention.

As a wearable telephone which is used by wearing on a human body, each of U.S. Pat. Nos. 5,381,387 and 5,499,292 discloses a wrist telephone, which includes a speaker mounted in an arc-shaped boom, with which a user speaks by putting the speaker on the center of the user's palm and covering the ear by the hand.

As another wrist-wearing-type wearable telephone, there is a wristwatch-type PHS telephone which is used in a manner similar to looking at a wristwatch. This type of telephone can be used immediately and the user can immediately respond to a call because there is no need to take out it from a pocket or a bag. However, because a microphone and a speaker of the telephone are located at the wrist, there are disadvantages that, for example, a received voice is sometimes hard-to-hear and a user's utterance sometimes is not transmitted to the party on the other end.

Further, as for a conventional mobile telephone such as a conventional cellular phone, the user's utterance tends to be loud when using the telephone, and the other party's speaking voice leaks from the receiver. Further, the alert of the phone is very loud. Therefore, a disadvantage that such a telephone sometimes annoys surrounding people is pointed out.

As for other types of wearable telephones such as the above-mentioned wristwatch type and a conventional ear-attaching type, because the using styles of those types are different from the style when using a conventional handset, there is a problem that the style seems to be strange and may be problematic. Also, as those telephones become small, the operating buttons become quite small. As a result, the user can not operate those telephones easily.

The operation style of the above-mentioned wrist telephones which are disclosed in the U.S. Pat. No. 5,381,387 and No. 5,499,292 is similar to that of a conventional handset. Therefore, the operation style does not seem to be strange to the surrounding people. However, as mentioned above, because the user's utterance tends to be loud when using the phone and the other party's speaking voice leaks from the receiver, there is also the disadvantage of annoying surrounding people in a crowded place. Also, the difficulty of the operation due to the small size is still a problem.

Furthermore, in a recent situation in which a small PDA device is becoming widely used, the above-mentioned operability problem needs to be solved so that the PDA may become even smaller so as to be wearable on an arm or a hand.

SUMMARY OF THE INVENTION

Accordingly, it is a general object of the present invention to provide a wearable communication device which can be used without annoying surrounding people and without being influenced by an outside noise.

It is another object of the present invention to provide a wearable communication device and a wearable PDA device which improve operability and usability.

The above objects of the present invention are achieved by a wearable communication device which includes at least a receiving part for receiving voice signals wherein a user inserts the user's finger into the user's ear canal, or touches the user's finger to a part near the user's ear, or puts the user's fingertip or nail on the user's ear canal so as to block the user's ear canal when the user uses the wearable communication device, the wearable communication device including a bone conduction actuator which is applicable for being in contact with the user's wrist, hand, back of the hand, finger or nail in order to transmit the voice signals.

According to the wearable communication device of the present invention, the user can hear a received voice without leaking the voice outside and can hear the received voice clearly even under a noisy environment since the user inserts the finger into the ear canal. And, the user's utterance is naturally boosted and is returned to the user's ear naturally. Therefore, the user does not need to speak loudly even in a noisy environment.

The bone conduction actuator may include:

a converter for converting an electronic signal into vibrations; and a vibrator for transmitting the vibrations to a human body, wherein the vibrator is shaped like a ring which can be mounted on the user's finger.

Accordingly, the bone conduction actuator is easily mounted on the user's finger like a ring. Therefore, the user does not feel inconvenience even when the user wears the wearable communication device continually in daily life.

The wearable communication device may further include a main unit which is connected to the bone conduction actuator and can be mounted on the user's wrist, wherein the main unit includes at least a part for transmitting voice signals to the bone conduction actuator. Therefore, the main unit does not become an obstacle for the user.

The bone conduction actuator may be connected to the main unit by a cord which has a connector which is detachable from the bone conduction actuator, and the main unit includes:

a part for taking up the cord and for storing the connector to said main unit if the connector is detached from the bone conduction actuator; and a part for utilizing storing of the connector or taking up of the cord as a switch.

The bone conduction actuator also may be connected to the main unit by a cord which is connected to the converter which is detachable from said vibrator, and the main unit includes:

a part for taking up the cord and storing the converter to the main unit if said converter is detached from the vibrator; and a part for utilizing storing of the converter or taking up of the cord as a switch.

The wearable communication device may further include a main unit which is connected to the bone conduction actuator and can be mounted on the user's wrist, wherein the main unit includes:

a part for transmitting voice signals to the bone conduction actuator, the bone conduction actuator being provided in an end of a boom which slides from the main unit, the end being shaped so as to slide easily while touching the back of the user's hand.

According to the wearable communication device of the present invention, the transmission efficiency of the received voice will improve since the vibrator is in intimate contact with the extensor digitorum. Further, the boom can be smoothly slid.

The wearable communication device may further include a main unit which comprises at least a part for transmitting voice signals to the bone conduction actuator and can be mounted on the user's wrist, the bone conduction actuator including:

a converter, provided in the main unit, for converting an electronic signal into vibrations; and a vibrator for transmitting the vibrations to a human body, the vibrator being provided in an end of a boom which slides from the main unit, the end being shaped so as to slide easily while touching the back of the user's hand, wherein vibrations by voice signal are transmitted from the converter to the vibrator through the boom.

The bone conduction actuator can be mounted on the user's wrist and includes:

a converter for converting an electronic signal into vibrations; and a vibrator for transmitting the vibrations to a human body, wherein the vibrator is rodlike and protrudes from the wrist-side surface of the bone conduction actuator.

According to the wearable communication device of the present invention, the transmission efficiency of the received voice improves since the vibrator is in intimate contact with the flexor digitorum.

The bone conduction actuator may further include an insulator, provided on the actuator's side facing the user's body, shaped so as to be in intimate contact with the user's wrist without touching the vibrator. Also, the inside of said bone conduction actuator may be near-vacuum.

The bone conduction actuator may include a part for operating the bone conduction actuator if the bone conduction actuator is pushed on the user's body at a pressure higher than a predetermined pressure and for stopping operation of the bone conduction actuator if the bone conduction actuator is not pushed on the user's body at the pressure higher than the predetermined pressure. Accordingly, the leakage of sound can be prevented.

The wearable communication device may further include a transmitting part for transmitting voice signals.

The wearable communication device may further include:

a microphone for gathering the user's utterance; and a part for mounting the microphone on the inside of the user's wrist, wherein the transmitting part transmits the user's utterance gathered by the microphone.

According to the wearable communication device of the present invention, since the user's mouth becomes close to the microphone, the user can operate the wearable communication device with a natural posture.

The wearable communication device may further include:

a bone conduction microphone for gathering the user's utterance; and a part for contacting the bone conduction microphone with the user's wrist, hand, finger or nail, wherein the transmitting part transmits the user's utterance gathered by the bone conduction microphone.

Accordingly, the user's conversation on the wearable communication device does not annoy surrounding people since the user does not need to speak loudly.

The bone conduction actuator may include a gathering part for gathering the user's utterance, wherein the transmitting part transmits the user's utterance gathered by the bone conduction actuator. Therefore, another bone conduction microphone is not necessary.

The wearable communication device may further include:

a part for inputting the user's voice into the wearable communication device;

an executing part for recognizing the user's voice and executing a corresponding command; and a feedback part for notifying the user of a status of the wearable communication device operated according to the command by a voice or a sound.

According to the wearable communication device of the present invention, operability will improve in daily use since there is no button operation.

The above objects of the present invention are also achieved by a wearable command input device for inputting information by tapping a fingertip of a user on a surface of an object or by tapping the fingertips mutually, wherein the wearable command input device can be mounted on the user's body and includes:

a detecting part for detecting shock or acceleration which arises when the user taps the fingertip on the surface of the object or when the user taps the fingertips mutually and is transmitted through the user's finger;

a trigger generator for detecting specific frequency components which are included in signals from the detecting part and for outputting series of trigger signals by detecting the presence or the absence of the tap of the finger of the user; and a command generator for outputting commands corresponding to the trigger signals.

According to the wearable command input device of the present invention, operability will improve in daily use since there is no button operation.

The above objects of the present invention are also achieved by a wearable command input device for inputting information by tapping a fingertip of a user on a surface of an object or by tapping the fingertips mutually, wherein the wearable command input device can be mounted on the user's body and includes:

a detecting part for detecting tap vibrations which arise when the user taps the fingertip on the surface of the object or when the user taps the fingertips mutually and transmitted through the user's finger;

a vibration generator, applicable to be mounted on the user's wrist, for generating wrist vibrations which arise when the user's wrist is bent or twisted and has specific frequencies different from the frequencies of the tap vibrations;

an extracting part for extracting tap signals which are signal components of the tap vibrations and wrist signals which are signal components of the wrist vibrations from output signals from the detecting part;

a trigger generator for outputting series of trigger signals by detecting the presence or the absence of the tap signals while suppressing the detection of the tap signals from the extracting part if the wrist signals from the extracting part are detected; and a command generator for outputting commands corresponding to the trigger signals.

According to the wearable command input device, undesigned inputs caused by wrist movement can be prevented.

The above objects of the present invention are also achieved by a wearable PDA device which includes at least an outputting part for outputting voice signals wherein a user inserts the user's finger into the user's ear canal, or touches the user's finger to a part near the user's ear, or puts the user's fingertip or nail on the user's ear canal so as to block the user's ear canal when the user uses the wearable PDA device, the wearable PDA device including:

an bone conduction actuator which is applicable for being in contact with the user's wrist, hand, back of the hand, finger or nail in order to transmit the voice signals; and a main unit which includes:
  a display for displaying information;
  a part for executing PDA functions;
  a part for inputting the user's voice;
  an executing part for recognizing the user's voice and executing a corresponding command; and
  a part for notifying the user of outputs from the PDA device operated according to the command by displaying the outputs or by voice through the bone conduction actuator.

According to the wearable PDA device, the problem of the conventional PDA device that it is too small to operate smoothly can be solved, and it is possible to provide a PDA device which is operated easily in daily life.

BRIEF DESCRIPTION OF THE DRAWINGS

Other objects, features and advantages of the present invention will become more apparent from the following detailed description when read in conjunction with the accompanying drawings, in which:

FIG. 13 is a schematic perspective diagram showing a wearable communication device according to a fourth embodiment of the present invention;

FIG. 14 is a perspective diagram showing the wearable communication device when it is unused;

FIG. 17 is a schematic perspective diagram showing another example of the wearable communication device according to the fourth embodiment of the present invention;

FIG. 18 is a sectional view of an end of a boom of the wearable communication device;

FIG. 19 is a perspective diagram showing the wearable communication device shown in FIG. 17 when it is unused;

FIG. 26 is a perspective diagram showing a dual-purpose mechanism of the bone conduction actuator for bringing a vibrator into intimate contact with a wrist and for a switch;

FIG. 27 is a diagram showing the dual-purpose mechanism when the wearable communication device is unused;

FIG. 28 is a perspective diagram showing the dual-purpose mechanism of the bone conduction actuator for bringing a vibrator into intimate contact with a wrist and for a switch;

FIG. 29 is a diagram showing the dual-purpose mechanism, when the wearable communication device is used;

FIG. 32 is a perspective diagram showing an air-pump-driven mechanism of the bone conduction actuator for bringing a vibrator into intimate contact with a wrist, showing a case when the wearable communication device is unused;

FIG. 33 is a perspective diagram showing the air-pump-driven mechanism of the bone conduction actuator for bringing a vibrator into intimate contact with a wrist, showing a case when the wearable communication device is used;

FIG. 40 is graphs showing examples of corrections of a sound level and sound quality against a contact pressure according to the sixth embodiment of the present invention;

FIG. 59 is a sectional views of the wearable command input device according to the eleventh embodiment of the present invention;

FIG. 61 is a sectional views of a vibration generator of the wearable command input device according to the eleventh embodiment of the present invention;

FIG. 64 is a diagram showing an example of tapping commands and commands corresponding to the tapping commands.

DETAILED DESCRIPTION OF THE PREFERRED EMBODIMENTS

A detailed description of embodiments of the present invention will now be given below with reference to the figures.

Figure 1:
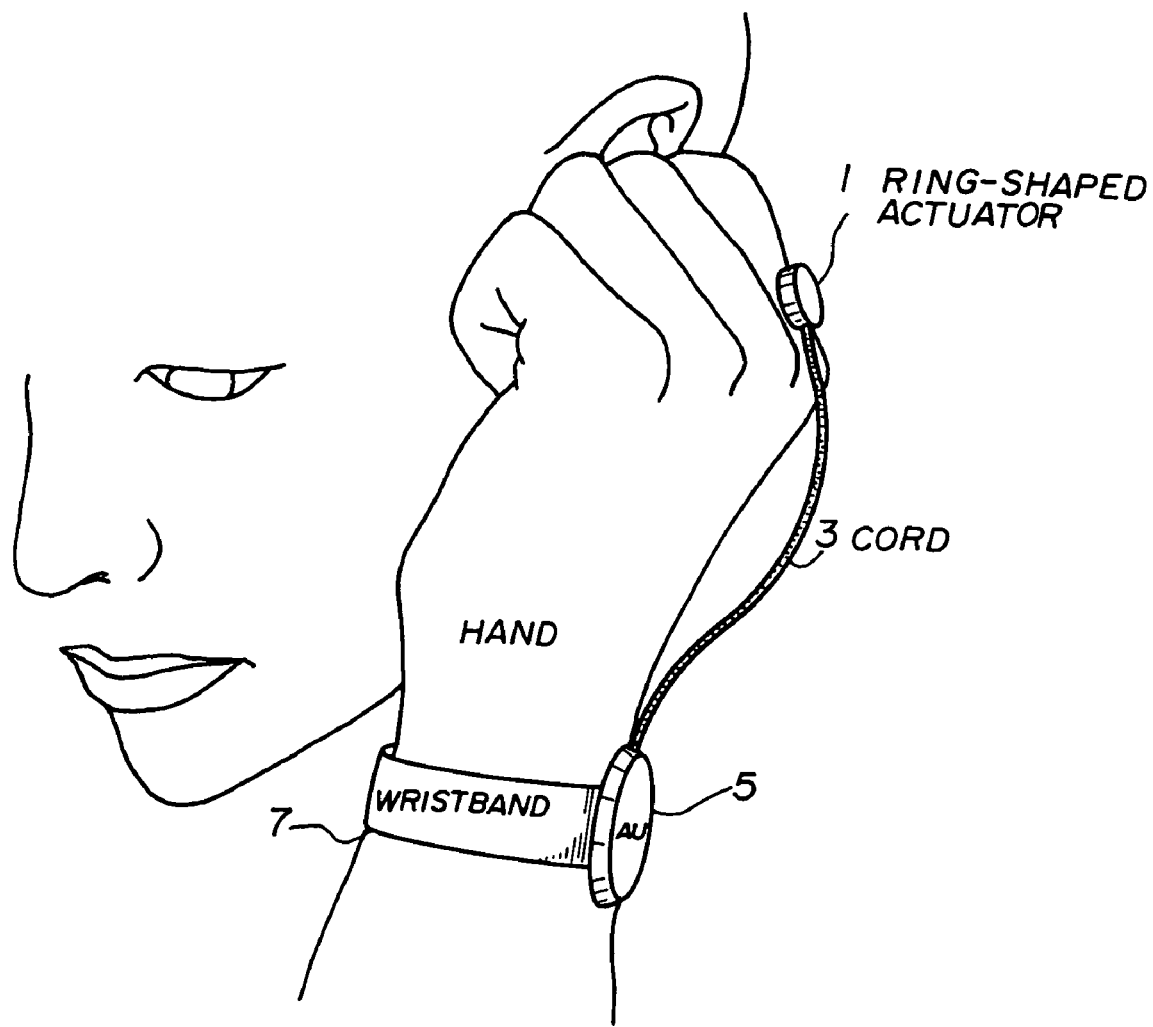
FIG. 1 is a schematic perspective diagram showing a wearable communication device according to a first embodiment of the present invention.
Figure 2:
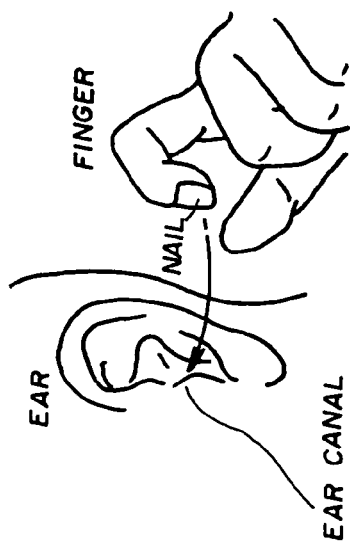
FIG. 2 is a perspective diagram showing the operating method of the wearable communication device according to the first embodiment of the present invention.

FIG. 1 is a schematic perspective diagram showing a wearable receiver of the first embodiment of the present invention. As shown in FIG. 1, the wearable receiver includes a ring-shaped actuator 1, a cord 3, an amp unit (AU) 5 and a wristband 7. The ring-shaped actuator 1 which has a ring-shaped vibrator and a bone conduction actuator is mounted on a base of the user's finger, and the amp unit (AU) 5 is mounted on the user's wrist with the wristband 7. When the user use the wearable receiver, as shown in FIG. 2, the user covers the ear canal with a fingernail or inserts a finger into the ear canal or touches the user's finger to a part near the user's ear.

Figure 3:
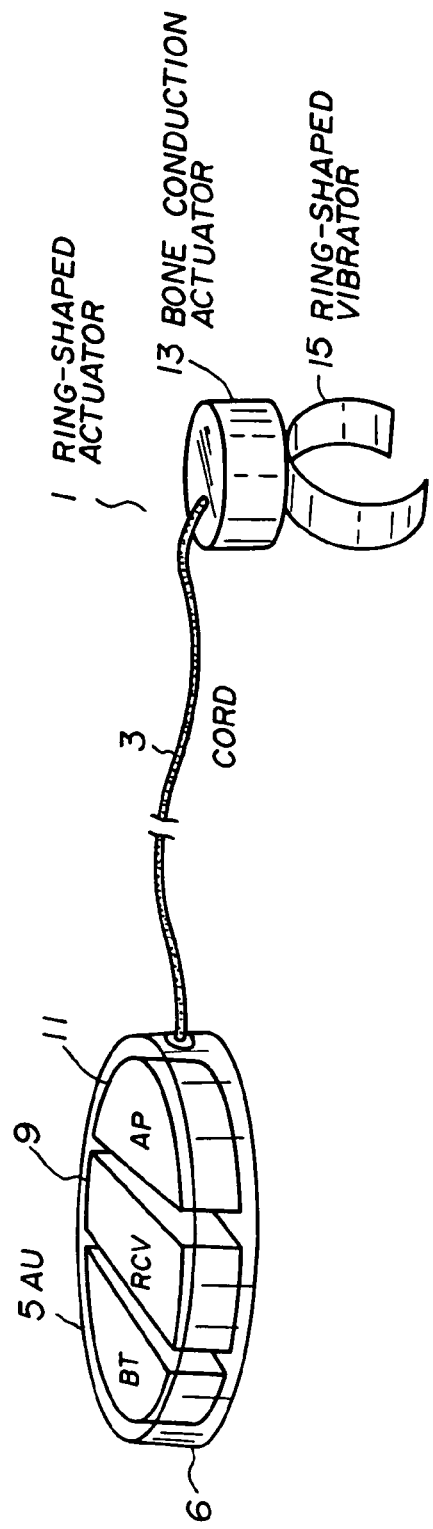
FIG. 3 is a block diagram showing the wearable communication device according to the first embodiment of the present invention.

FIG. 3 is a perspective view showing the inside of the wearable receiver in detail. As shown in the figure, the amp unit (AU) 5 includes a battery (BT) 6 for supplying power, a wireless receiver (RCV) 9 and an amp (AP) 11 for driving the bone conduction actuator. Hereinafter, the amp (AP) for driving the bone conduction actuator will be referred to as an actuator amp (AP). The ring-shaped actuator 1 includes a bone conduction actuator 13 for generating a vibration by a received signal and a ring-shaped vibrator 15 for mounting the bone conduction actuator 13 and for conveying the vibration to the finger and vice versa. The amp unit (AU) 5 and the ring-shaped actuator 1 are connected by the cord (CD) 3. According to the configuration, the received signal and the power are supplied to the bone conduction actuator 13, and, then, the user can hear a received voice through the vibration generated by the bone conduction actuator 13. In the above-mentioned configuration, the wireless receiver can be replaced by a radio or other devices like that.

Figure 4:
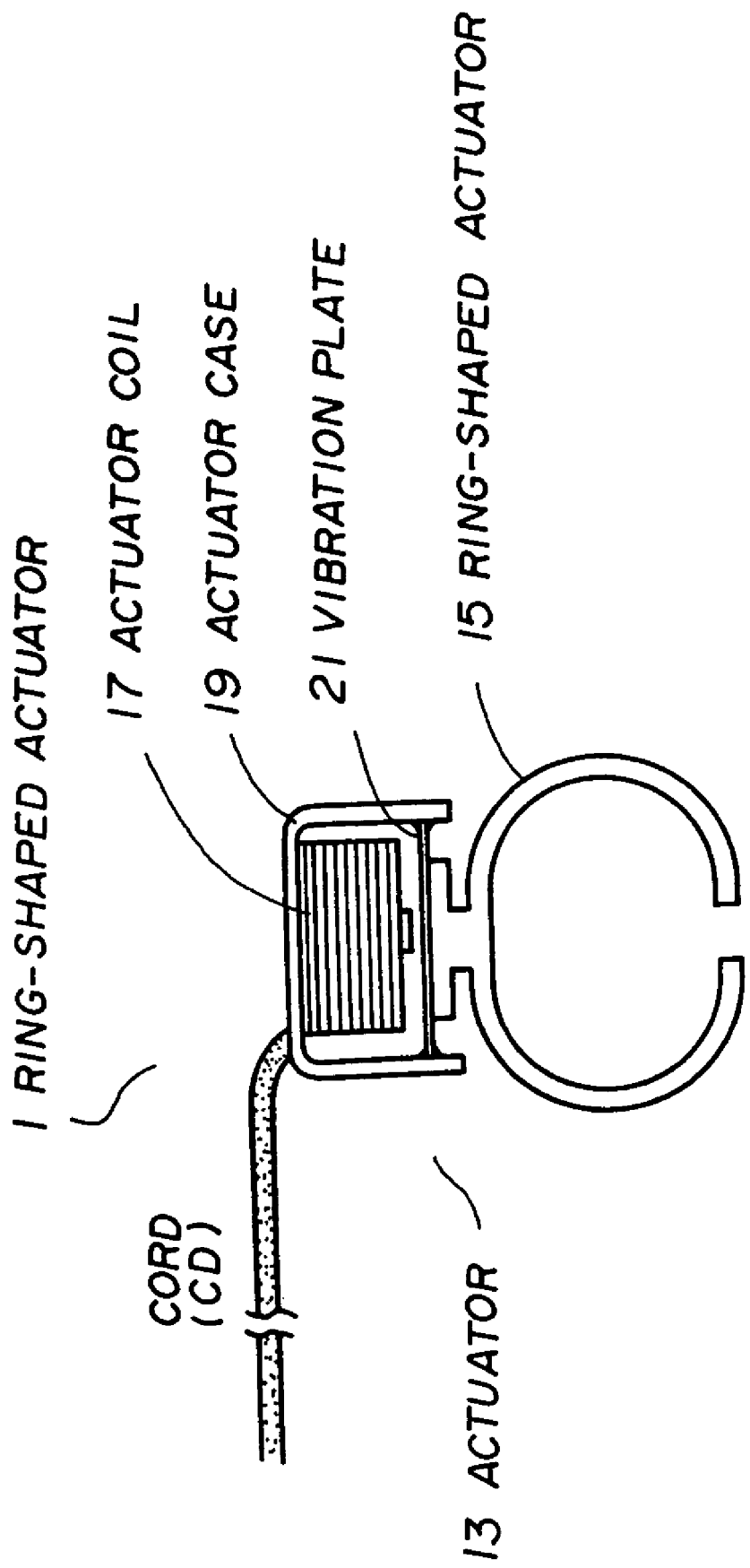
FIG. 4 is a sectional view of a ring-shaped actuator of the present invention.

FIG. 4 is a sectional view of the ring-shaped actuator 1. As mentioned above, the ring-shaped actuator 1 has the bone conduction actuator 13 and the ring-shaped vibrator 15. The bone conduction actuator 13 conveys a signal to the user's ear through bone conduction by being mounted on a human body, and includes an actuator coil 17, an actuator case 19, and a vibration plate 21. The actuator coil 17 vibrates the vibration plate 21 by the received signal, and the actuator case 19 contains the actuator coil 17 and the vibration plate 21. The vibration plate 21 conveys vibrations by vibrating. The ring-shaped vibrator 15 is mounted on the user's finger, and conveys the vibrations from the vibration plate 21 to the finger. The ring shape of the vibrator of the bone conduction actuator allows the actuator 1 to be mounted on the finger easily, and the vibration is effectively conveyed to the finger. Further, because the bone conduction actuator is located on the back of the finger, the bone conduction actuator is not a obstacle in daily life for the user. Hereinafter, the bone conduction actuator will be referred to as an actuator unless otherwise specified.

Figure 5:
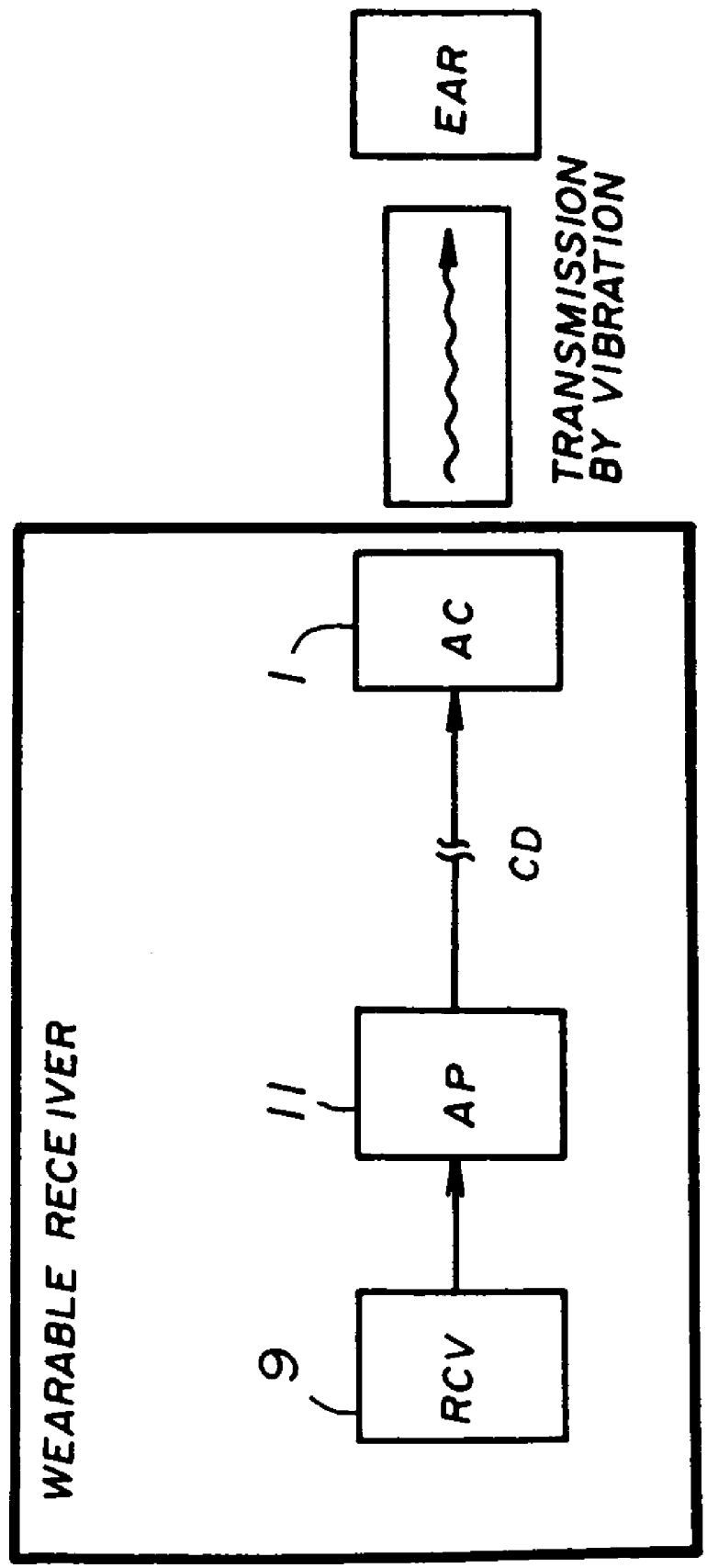
FIG. 5 is a block diagram showing the wearable communication device according to the first embodiment of the present invention.

FIG. 5 is a block diagram showing the wearable receiver. As the configuration has been described above, only the operation will be described in the following. A correction of frequency response changes of a voice signal caused while being transmitted through the finger is performed on the signal output from the wireless receiver (RCV) or the radio by a receiving filter (not shown in FIG. 5), and the voice signal is amplified by the actuator amp (AP) 11, and, then, the voice signal vibrates the actuator (AC) 1. The vibrations of the actuator (AC) 1 are conveyed to the ear through the finger.

The location of the receiving filter can be anywhere so long as the location is between the wireless receiver and the actuator (AC) 1.

According to this embodiment, by inserting the user's finger, on which the wearable receiver is mounted, into the ear canal, the user can receive a voice without leaking the voice outside and can receive the voice clearly even in a noisy environment.

Figure 6:
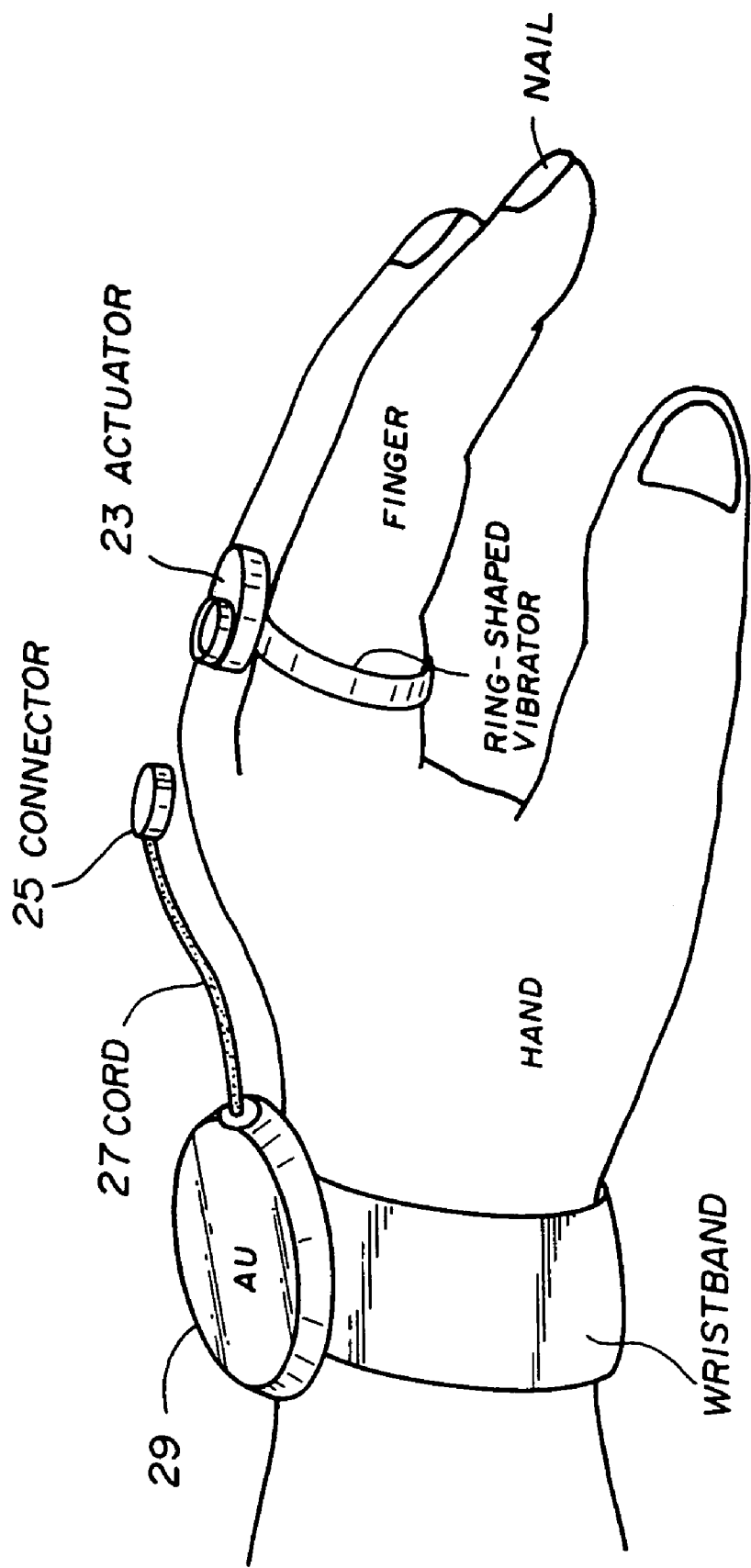
FIG. 6 is a schematic perspective diagram showing a wearable communication device according to a second embodiment of the present invention.

FIG. 6 shows a wearable receiver of a second embodiment of the present invention. As shown in FIG. 6, a connector 25 which is detachable from an actuator 23 is provided on the upper side of the actuator 23. A cord 27 connecting between an amp unit 29 and the actuator 23 can be stored in the amp unit (AU) 29.

Figure 7:
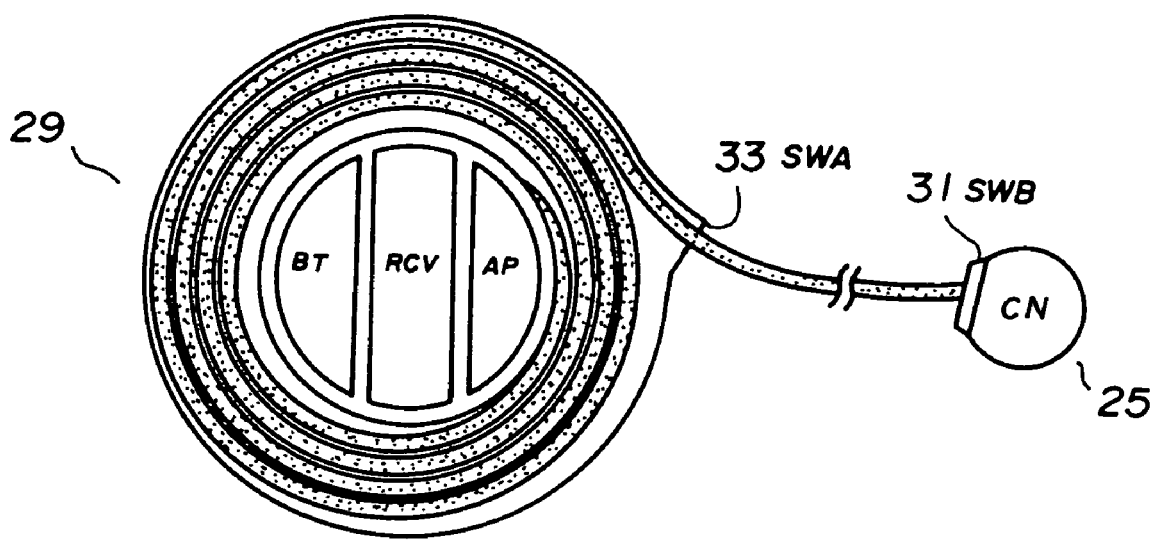
FIG. 7 is a sectional view of the wearable communication device according to the second embodiment of the present invention.
Figure 8:
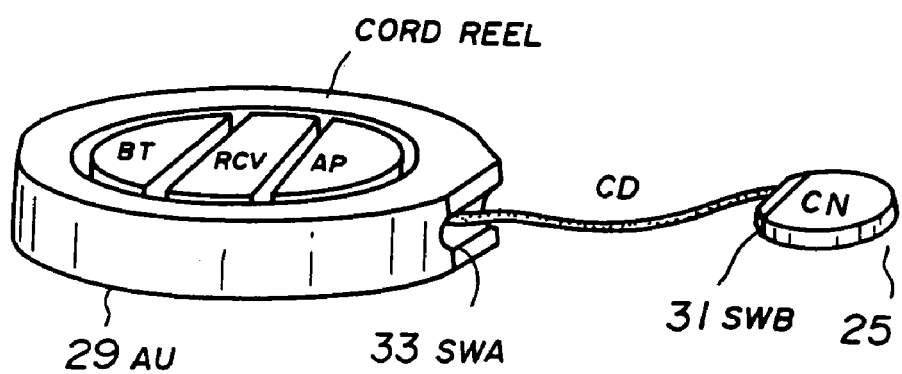
FIG. 8 is a perspective diagram showing the wearable communication device according to the second embodiment of the present invention.

FIG. 7 shows a sectional view of the connector (CN) 25 and the amp unit (AU) 29. FIG. 8 is a perspective diagram of the wearable receiver. As shown in FIG. 7, the amp unit 29 stores the cord 27 by wrapping it around the center part of the amp unit. Also, the connector 25 acts as a switch. To be more specific, a base (SWB) 31 of the connector can be inserted into an outlet (SWA) 33 of the case, and the switch is operated by connecting the SWA33 and the SWB31. The SWA33 forms a pair of electrodes, and the switch is realized by allowing the SWB31 to contact the pair of electrodes. The switch can be realized in various ways. For example, the SWA33 can be made of a Hall device and the SWB31 can be made of a magnet. Further, the SWA33 may have a button switch mechanism in which the SWB31 pushes the button.

As mentioned above, because the shapes of the outlet of the case (SWA33) and the connector (SWB31) are formed so that the connector dovetails neatly with the outlet of the case, the connector is firmly fixed to the amp unit without loosening.

Further, when a magnet is used for the SWA33 and/or the SWB31, the user feels as if the connector is drawn in by the amp unit and the connector is more firmly fixed. Also, the connector 25 can be used as a knob when the connector is pulled out and when it is stored. The mechanism for wrapping the cord can take various configurations. For example, a ratchet method which is used in an electric rice cooker and the like, by which method the user pulls a cord a little and releases it, and a wrapping button method and the like, which method is used in a vacuum cleaner, or a combination of these methods can be used.

Figure 9:
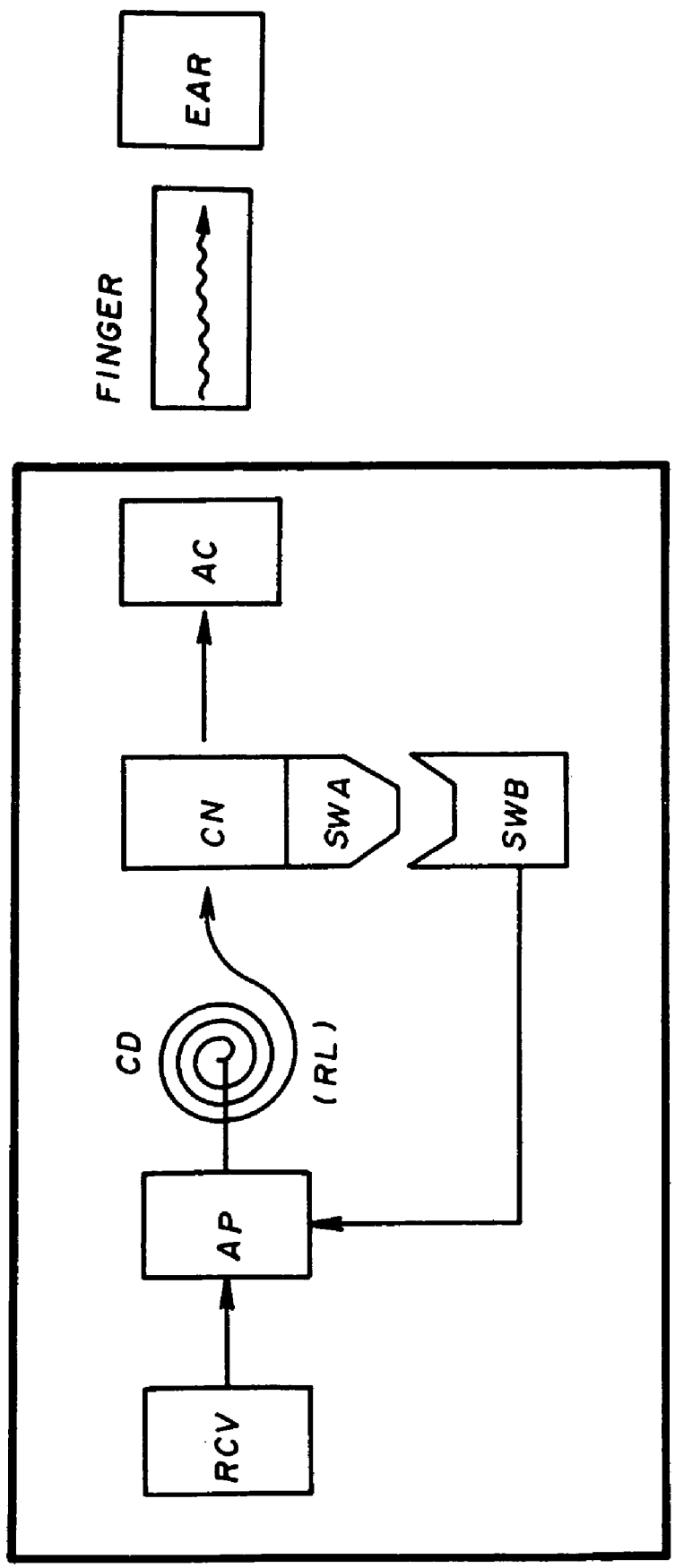
FIG. 9 is a block diagram showing the wearable communication device according to the second embodiment of the present invention.

FIG. 9 is a block diagram showing the wearable receiver of the second embodiment. As shown in FIG. 9, the SWA being provided in the connector (CN) and the SWB being provided in the amp unit (AP) perform the function of a switch such that the actuator amp does not work when the switch is OFF and the actuator amp works when the switch is ON.

Figure 10:
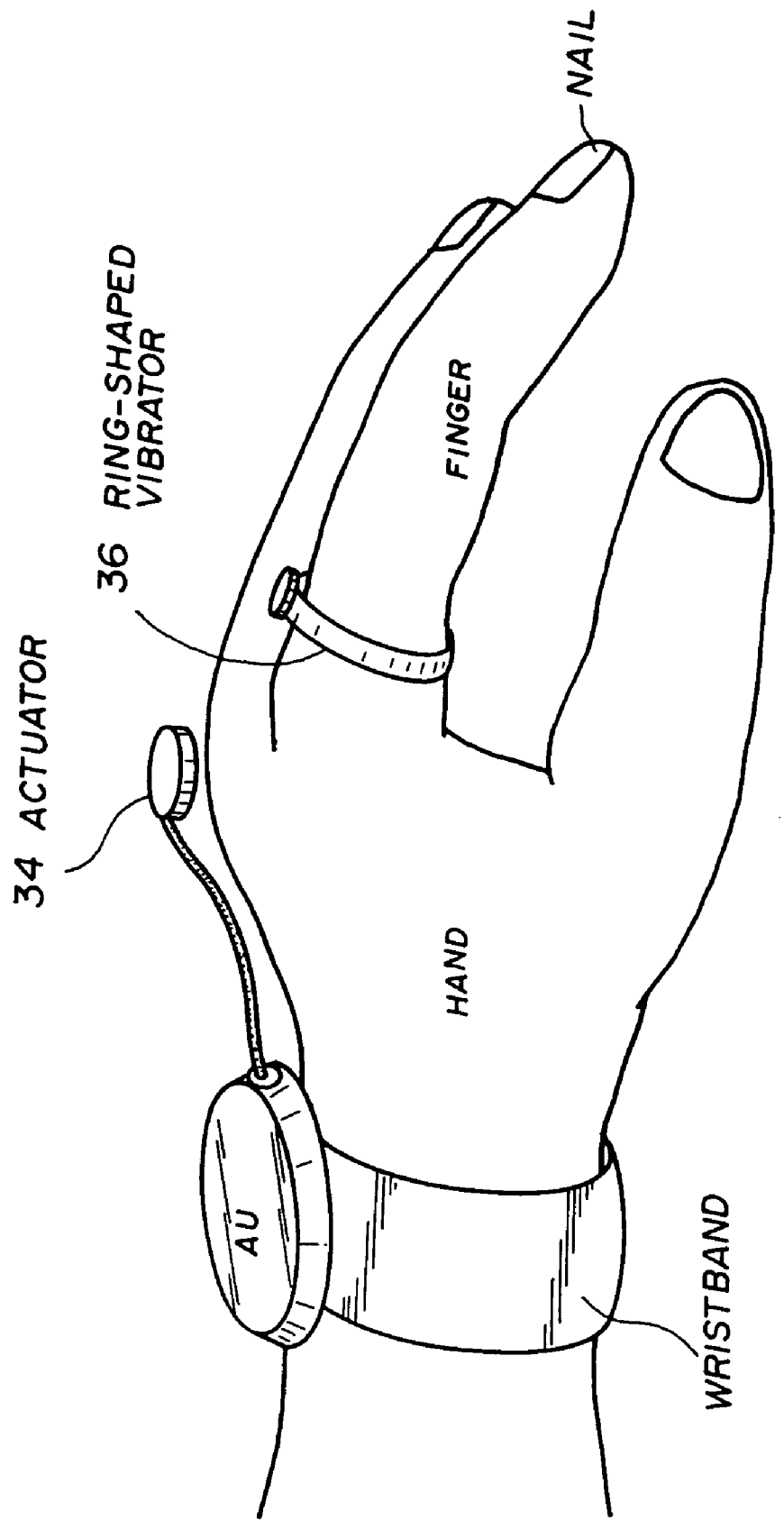
FIG. 10 is a schematic perspective diagram showing a wearable communication device according to a third embodiment of the present invention.
Figure 11:
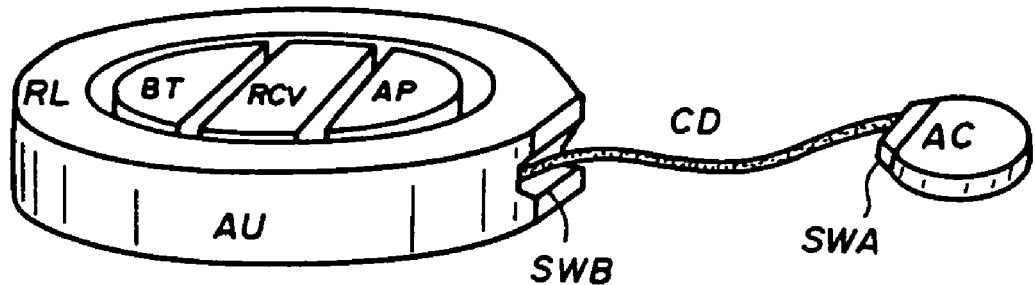
FIG. 11 is a perspective diagram showing the wearable communication device according to the third embodiment of the present invention.
Figure 12:
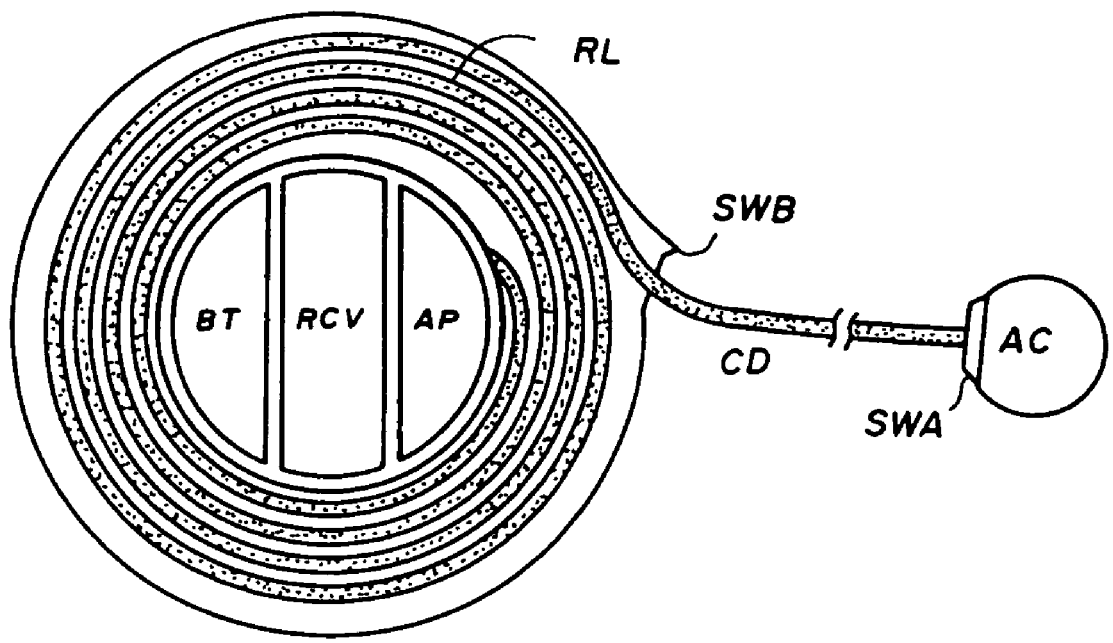
FIG. 12 is a sectional view of the wearable communication device according to the third embodiment of the present invention.

FIG. 10 is a schematic perspective diagram showing a wearable receiver according to a third embodiment. As shown in FIG. 10, an actuator 34 is detachable from a ring-shaped vibrator. In the configuration, the top part of the ring-shaped vibrator 36 dovetails nicely with the bottom part of the actuator 34. To be more specific, for example, the top part is formed so as to be fitted on the bottom part mechanically, or the parts are formed so as to be connected by a magnetic force. Further, as shown in FIG. 11 and FIG. 12, the actuator may have the switch mechanism which is described in the second embodiment.

Thus, according to the configurations shown in the second and the third embodiments, a user does not feel discomfort even when wearing the wearable receiver on the finger full-time in daily life since the cord which connects between the wrist part and the ring-shaped actuator can be stored in the amp unit when the user does not use the wearable receiver. Further, the ON/OFF control can be made easily since the connector or the actuator has the switch mechanism.

FIG. 13 is a schematic perspective diagram showing a wearable receiver of a fourth embodiment. As shown in (a) of the figure, the wearable receiver includes an amp unit (AU) 38 and a boom (BM) 40 which extends from the amp unit (AU) 38. An actuator (AC) 42 is provided at an end point of the boom (BM) 40. As shown in (b) of the figure, the part which contacts the back of the hand is shaped like a smooth dome which is downward convex, and the surface of which part is processed with teflon and the like so as to reduce friction. The amp unit (AU) 38 is mounted on the wrist by the wristband 44. Also, the wearable receiver has an ON/OFF switching mechanism using expansion and contraction of the boom (BM) 40. The boom (BM) 40 can be stored into the amp unit (AU) 38. FIG. 14 shows a case in which the boom is stored.

As shown in FIG. 13, when the user uses this wearable receiver, the user bends the hand backwards and brings the end of the boom into contact with the back of the hand, specifically, with the extensor digitorum of the back of the hand. Then, the user can hear a received voice by inserting the user's fingertip of any finger of the hand on which the wearable receiver is mounted into the ear canal. By bringing the end of the boom into contact with the extensor digitorum, the efficiency of transmission of the received voice signal is improved.

The posture taken when inserting the fingertip into the ear canal allows the dome-shaped vibrator to be in intimate contact with the back of the hand. Further, to form the boom (BM) 40 of an elastic material is effective for improving the intensity of the contact between the dome-shaped vibrator 43 and the back of the hand.

Thus, the end of the boom slides smoothly on the back of the hand without jerky movement because of the dome shape. Even though the tail of the boom hangs over the arm when the boom is stored, the hangover is not so large as to bother the user's activity.

Figure 15:
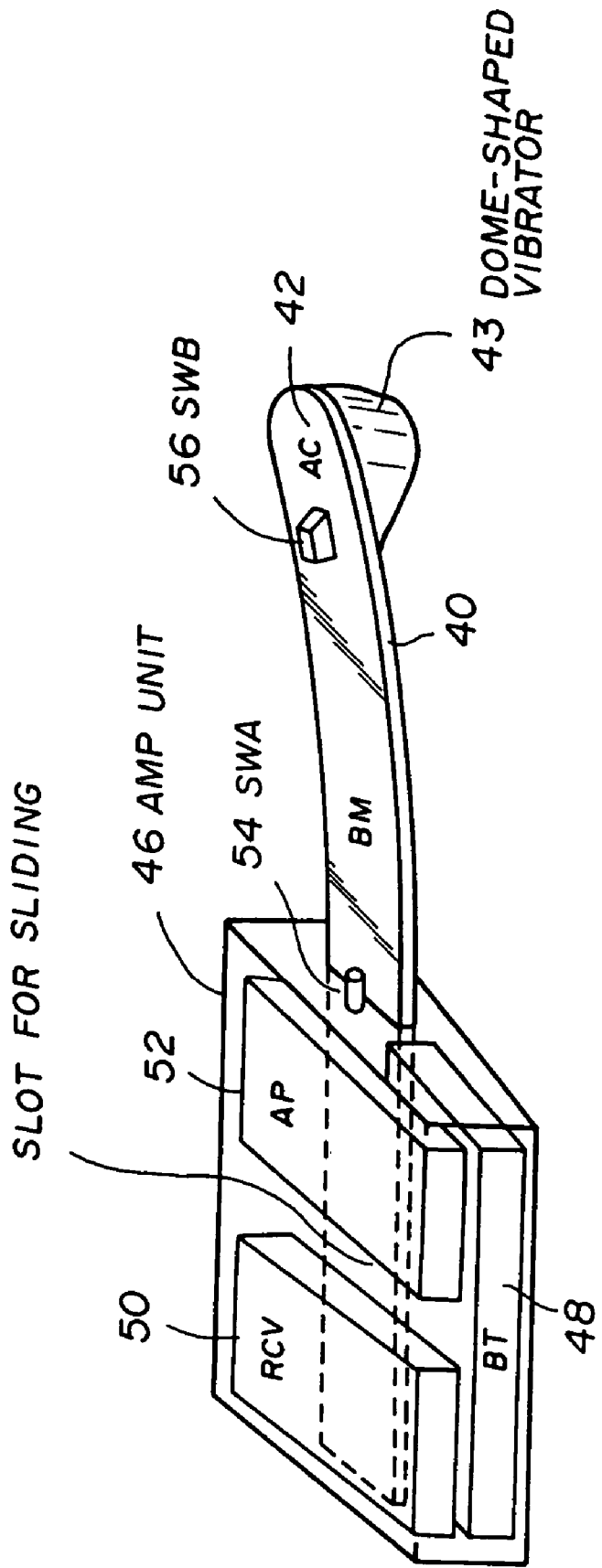
FIG. 15 is a perspective diagram showing the wearable communication device according to the fourth embodiment of the present invention.

FIG. 15 shows the configuration of the wearable receiver. As shown in FIG. 15, the wearable receiver includes a battery (BT) 48 in the lower portion of the amp unit 46, a wireless receiver (RCV) 50 and an actuator amp (AP) 52 in the upper portion. A space for storing the boom is provided between these components. The operation of these components have been described above. As mentioned before, the end of the boom (BM) has the actuator (AC) 42 and the dome-shaped vibrator. The boom (BM) 40 includes a signal cord to the vibrator. Further, a switch mechanism is provided so that the switch is turned off when a projection SWB54 is in contact with a projection SWA56.

Figure 16:
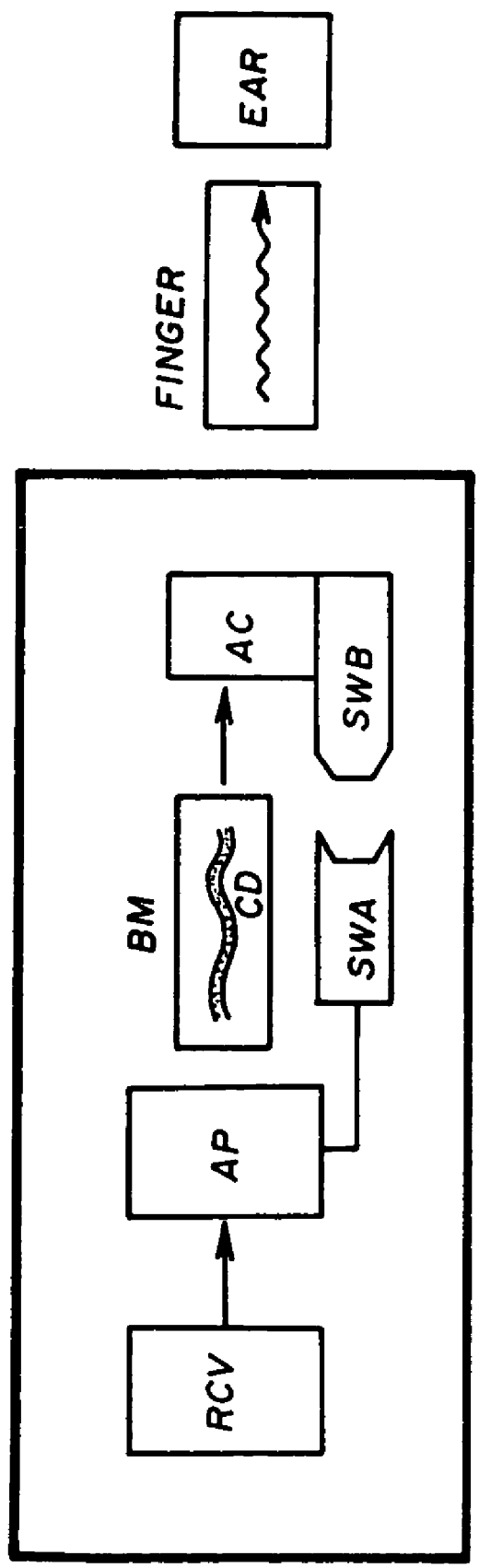
FIG. 16 is a block diagram showing the wearable communication device according to the fourth embodiment of the present invention.

FIG. 16 is a block diagram of the wearable receiver. The operation is the same as mentioned before. The wearable receiver using the boom such as one described as the fourth embodiment can be configured in a form shown in FIG. 17. The wearable receiver shown in FIG. 17 has a boom (BM) 58, the end part of which boom is shaped like a smooth dome which is downward convex as a whole. In addition, the end part of the boom has one or more smooth grooves in the movement direction while keeping the dome shape. FIG. 18 shows sectional views of the part. Usability for the user increases by the grooves since the end part slides on the back of the hand while the grooves are fitting to the extensor digitorum so that the end part hardly departs from the extensor digitorum. FIG. 19 shows the case when it is unused.

Figure 20:
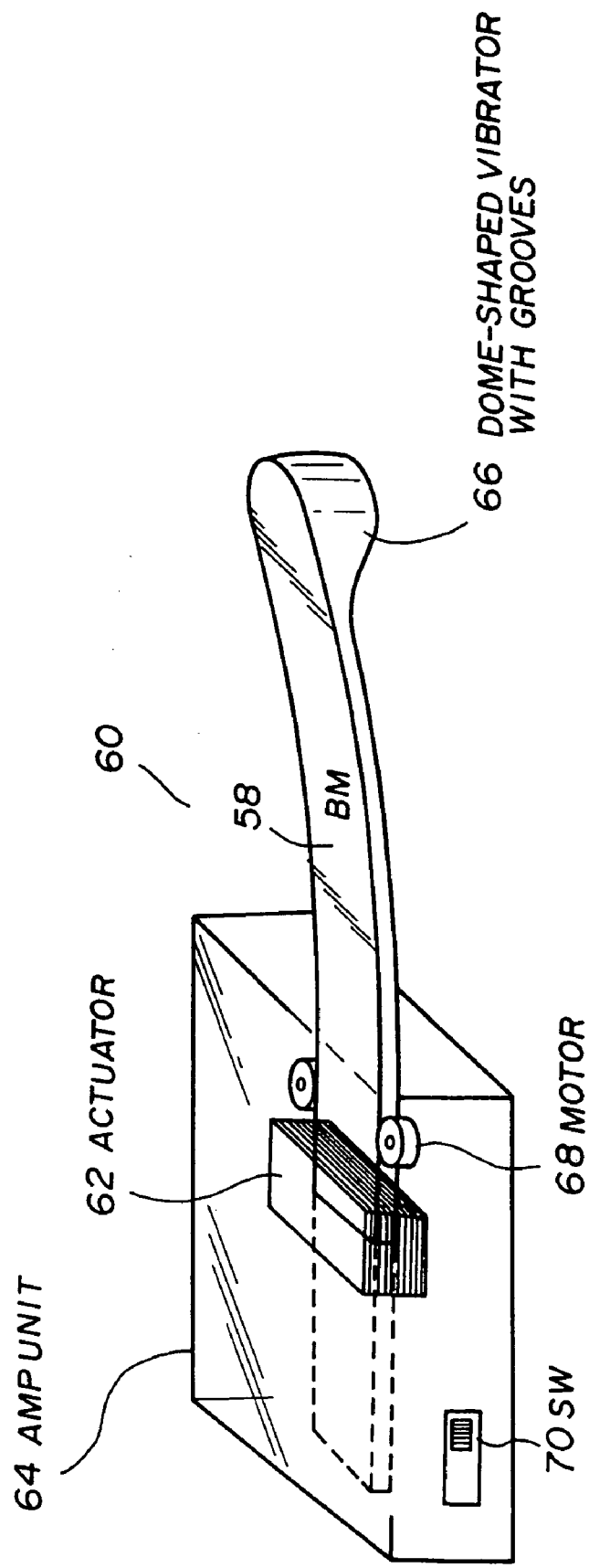
FIG. 20 is a perspective diagram showing the wearable communication device shown in FIG. 17.
Figure 21:
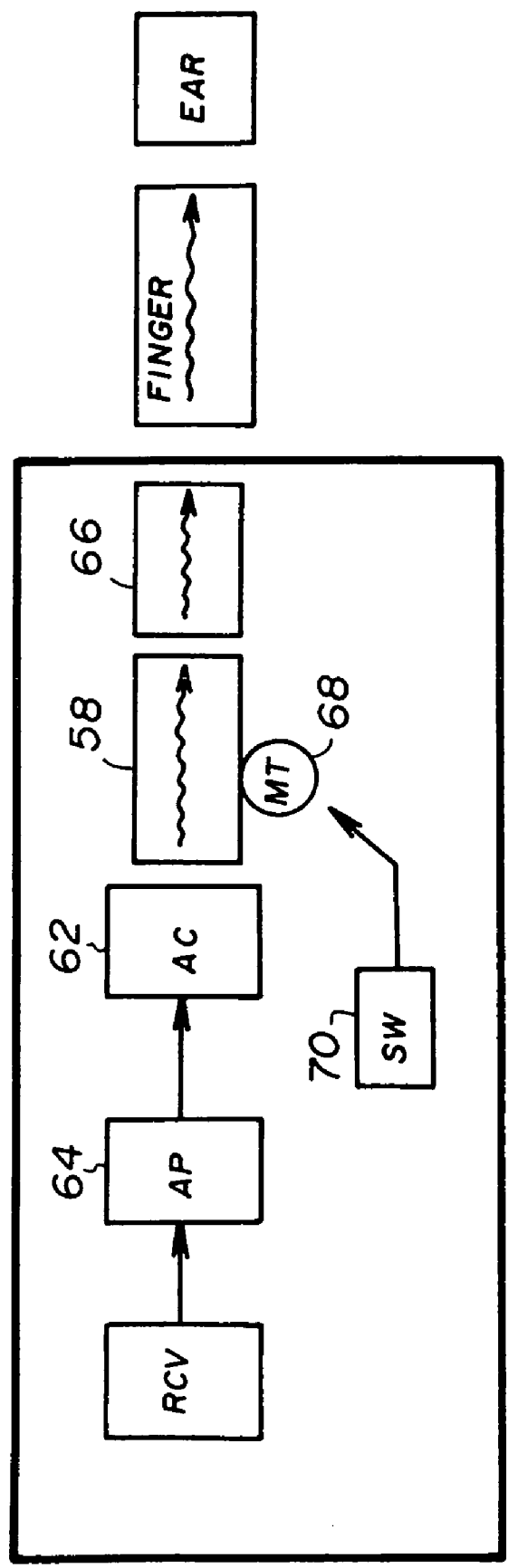
FIG. 21 is a block diagram showing another example of the wearable communication device shown in FIG. 17.

FIG. 20 shows the configuration of the wearable receiver 60. As shown in FIG. 20, an actuator 62 is embedded in an amp unit 64. The vibration of the boom (BM) 58 conveys the received signal to the dome-shaped grooved vibrator 66 of the end part. Further, the wearable receiver has a motor 68 for extending the boom (BM) 58 and a switch (SW) 70. The motor starts by a signal from the switch (SW) 70, and, then, the boom (BM) 58 extends by friction. The other components are the same as shown in FIG. 13. FIG. 21 shows a block diagram of the wearable receiver.

The mechanism for extending the boom 58 by the motor 68 can use various methods other than the friction method, such as a gear driven method using a rack pinion or a worm gear, and an extension method using wire which is used, for example, in an automatic antenna of a car radio.

Figure 22:
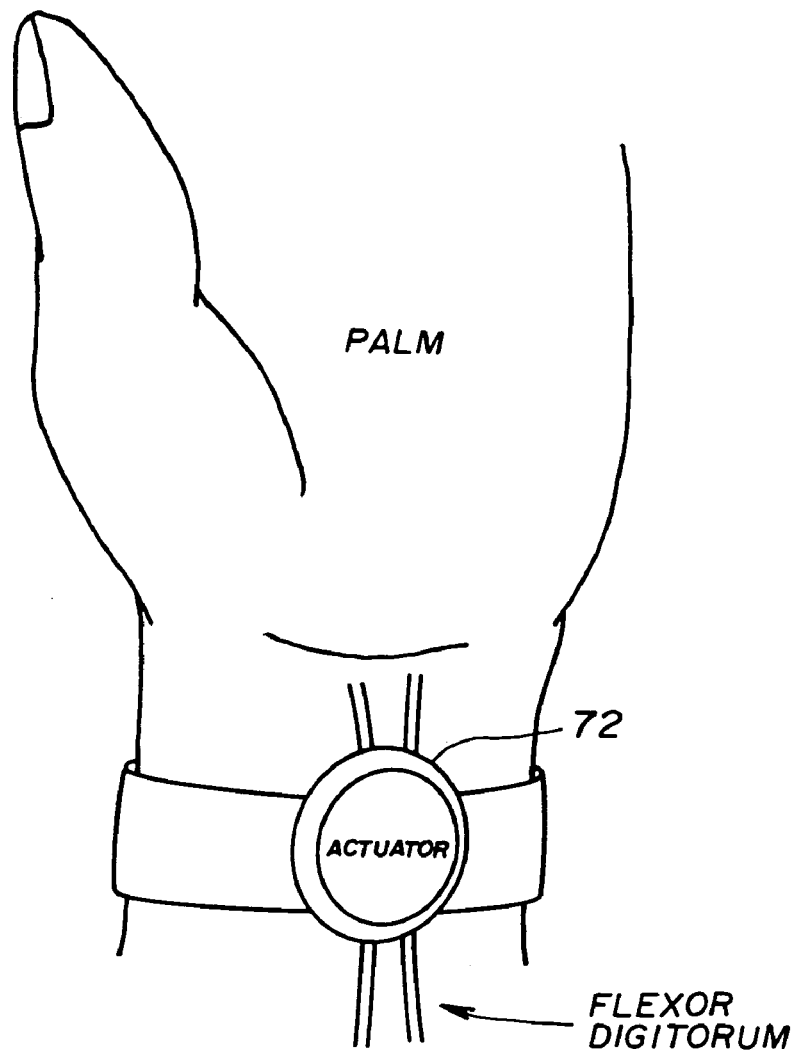
FIG. 22 is a schematic perspective diagram showing a wearable communication device according to a fifth embodiment of the present invention.
Figure 23:
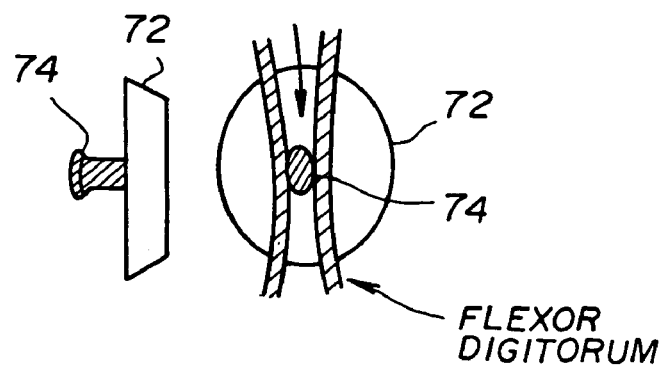
FIG. 23 is sectional views of a bone conduction actuator of the wearable communication device according to the fifth embodiment of the present invention.

FIG. 22 is a schematic perspective diagram showing a wearable receiver according to a fifth embodiment of the present invention. As shown in FIG. 22, an actuator 72 is mounted on the inside of the user's wrist. Since the amp unit is mounted on the back of the wrist, as in the case shown in FIG. 6, it is not illustrated in FIG. 22. As shown in FIG. 23, the end of a vibrator 74, which is rodlike, protrudes from the surface of the actuator 72 so that the actuator 72 is mounted with the rodlike vibrator 74 fitting between the flexor digitorums (there are a plurality of flexor digitorums) for the sake of improving transmission efficiency of the received signal. According to such a configuration, the vibrator can be in intimate contact with the flexor digitorums. Further, the vibrator hardly departs from the flexor digitorums even when the wrist moves to a certain extent. Because the finger used for inserting into the ear canal usually is the second finger or the third finger, it is preferable to locate the vibrator so as to be in contact with the flexor digitorums corresponding to those fingers. Further, as shown in FIG. 23, by extending the sectional shape of the rodlike vibrator 74 to the running direction of the flexor digitorums, the contact between the vibrator and the flexor digitorums can be more stable and the user can feel more comfortable. Further, it is preferable to change the shape of the end of the vibrator according to the user's flexor digitorums so as to fit well to the flexor digitorums in order to convey vibration more effectively, since the running status of the flexor digitorums differs according to users. The inside of the actuator 72 and the operation is the same as described before.

Figure 24:
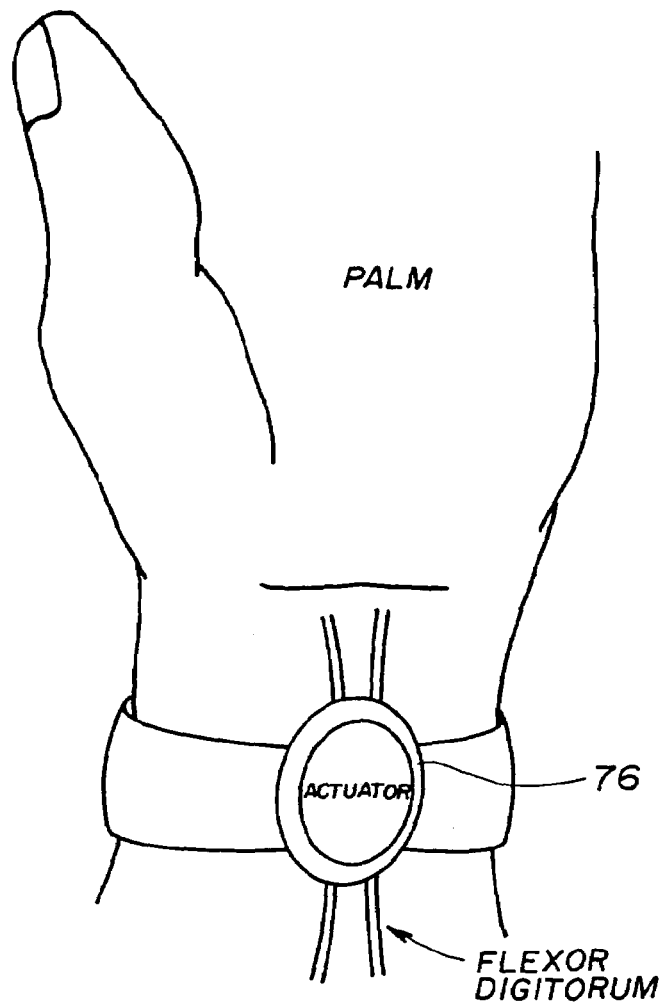
FIG. 24 is a schematic perspective diagram showing the wearable communication device in which a vibrator is different from the one shown in FIG. 22.

The fifth embodiment may take a configuration shown in FIG. 24. In the configuration, similar to the configuration shown in FIG. 22, an actuator is provided on the inside of the wrist. Since an amp unit is mounted on the back side of the wrist, as in the case shown in FIG. 6, it is not illustrated in FIG. 24.

Figure 25:
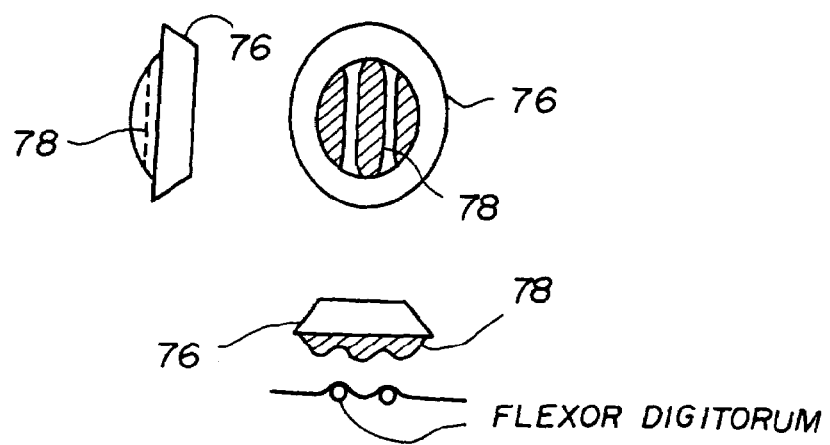
FIG. 25 is sectional views of the bone conduction actuator.

As shown in FIG. 25, the actuator 76 has a vibrator 78 which is formed in a smooth dome shape which is downward convex as a whole. In addition, the vibrator 78 has one or more smooth grooves in the direction of from the fingertip to the wrist while keeping the dome shape. For improving the efficiency of transmission of the received signals to the finger, the actuator is mounted with the grooves fitting between the flexor digitorums (there are a plurality of flexor digitorums) located in the inside of the wrist. According to such a configuration, the vibrator can be in intimate contact with the flexor digitorums. Further, the vibrator hardly departs from the flexor digitorums even when the wrist moves to a certain extent. Because the finger used for inserting into the ear canal usually is the second finger or the third finger, it is preferable to locate the vibrator so as to be in contact with the flexor digitorums corresponding to those fingers.

Further, it is preferable to change the shape of the vibrator according to the user's flexor digitorums so as to fit well to the flexor digitorums in order to convey vibration more effectively, since the running status of the flexor digitorums differs according to the user. The inside of the actuator 76 and the operation is the same as described before.

In the configuration illustrated in FIG. 22-FIG. 25, as shown in FIG. 26, a dual purpose mechanism for bringing the vibrator into intimate contact with the user's wrist and for a switch can be provided for the actuator. As shown in FIG. 26, the mechanism includes a SW knob 80 on an actuator 82 and an outer case 86 with a helical slot 84 which acts as a moving guide for the SW knob 80. The outer case 86 is attached to the actuator such that the knob protrudes through the slot 84. FIG. 27 shows the sectional view. The actuator (AC) 82 moves back-and-forth while rotating according to the slot 84. FIG. 28 shows the situation in which the vibrator is moved out when the actuator is used. FIG. 29 shows the sectional view. In addition, by moving the SW knob along the slot 84, the mechanism acts as a switch of the wearable receiver.

As shown in FIG. 26, since a wristband 90 is connected to the outer case 86 and the vibrator slides to the surface of the wrist against the outer case's position such that the surface of the wrist is pushed on by the vibrator, the transmission efficiency improves. When the wearable receiver is not used, the end of the vibrator is in contact with the surface of the wrist slightly, therefore, the pressure to the surface of the wrist is low and the user who always wears the wearable receiver does not feel fatigued.

In the fifth embodiment, an actuator using the rod-like type vibrator has been described with reference to FIG. 27-FIG. 29. Also, an actuator having the groove-type vibrator shown in FIG. 25 may have the dual-purpose mechanism.

Figure 30:
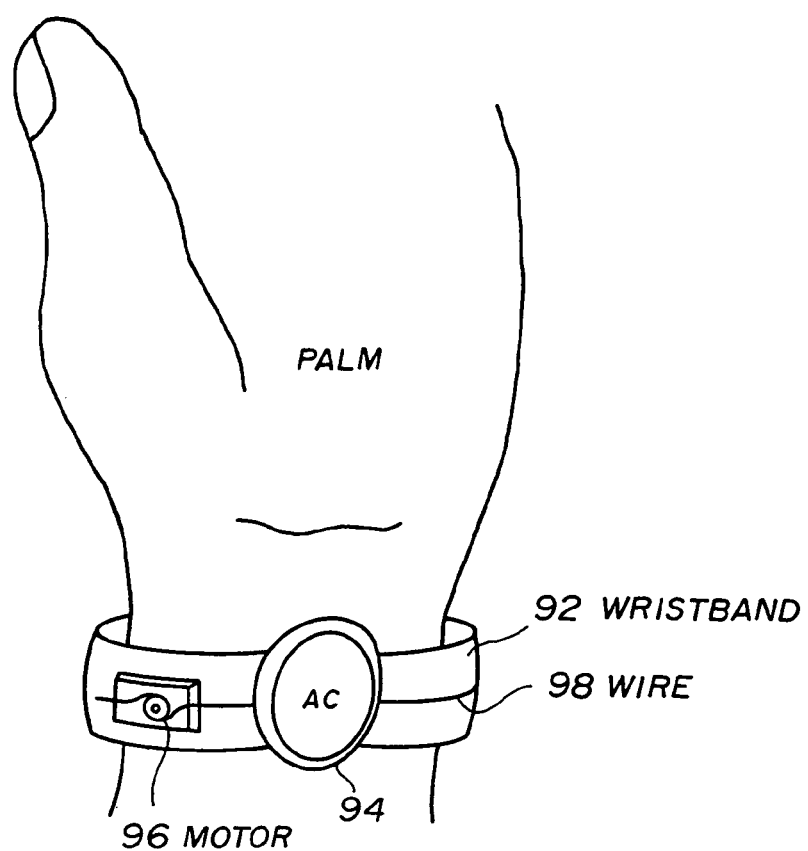
FIG. 30 is a perspective diagram showing an electric mechanism of the bone conduction actuator for bringing a vibrator into intimate contact with a wrist, when the wearable communication device is unused.
Figure 31:
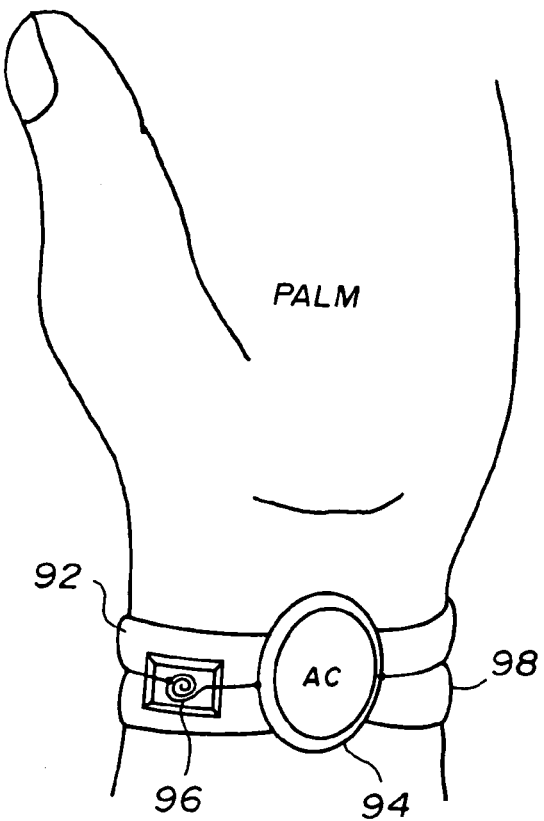
FIG. 31 is a perspective diagram showing the electric mechanism of the bone conduction actuator for bringing a vibrator into intimate contact with a wrist, showing a case when the wearable communication device is used.

In the above mentioned fifth embodiment, the wearable receiver can have an electric mechanism for the vibrator to provide better contact with the wrist as shown in FIG. 30-FIG. 31. As shown in FIG. 30, the mechanism includes a motor 96 and a wire 98 which is connected to the motor 96 and is wound around the wristband 92. As shown in FIG. 31, the wire 98 is wound up by the motor 96 so as to fasten the wristband 92. Thus, the transmission efficiency improves since the surface of the wrist is pushed by an actuator 94.

Further, an air pump driven mechanism for the vibrator to provide better contact with the wrist is shown in FIG. 32. As shown in FIG. 32, the mechanism includes an air bag 102 beneath an amp unit (AU) 100, an air pump 104 and a valve 106 in the amp unit (AU) 100. As shown in FIG. 33, when the wearable receiver is used, the valve 106 is closed and the air pump 104 blows air into the air bag 102 so that the air bag 102 is inflated and the wristband is fastened. Thus, the transmission efficiency improves since the surface of the wrist is pushed by an actuator (AC) 110.

When it is unused, as shown in FIG. 33, the valve 106 is open and the air bag is deflated. Thus, the user does not feel fatigued since the wristband is wound around the wrist without being fastened and the contact pressure of the vibrator to the wrist is weak.

Figure 34:
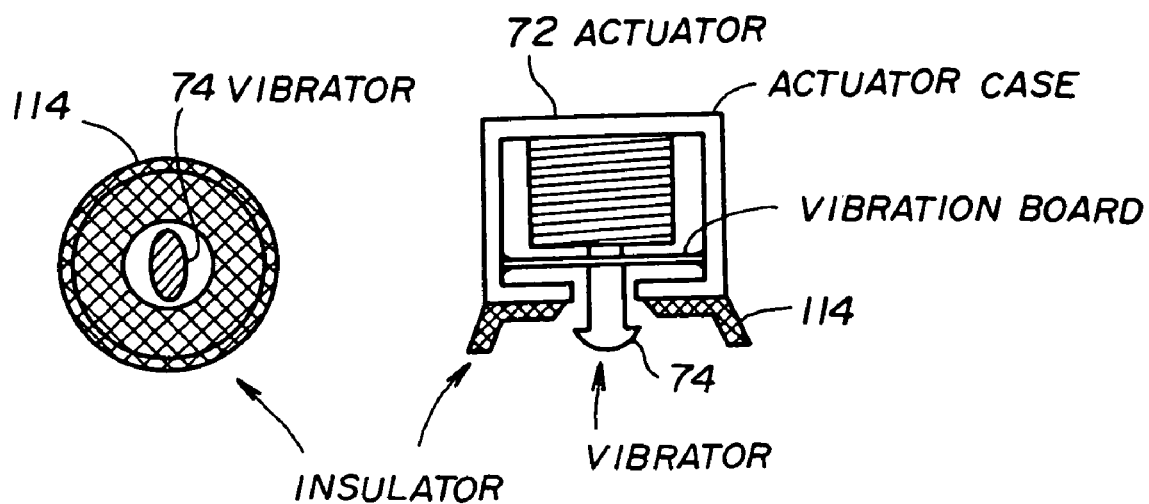
FIG. 34 is a sectional view of the bone conduction actuator which has an insulator, showing a case when it is unused.
Figure 35:
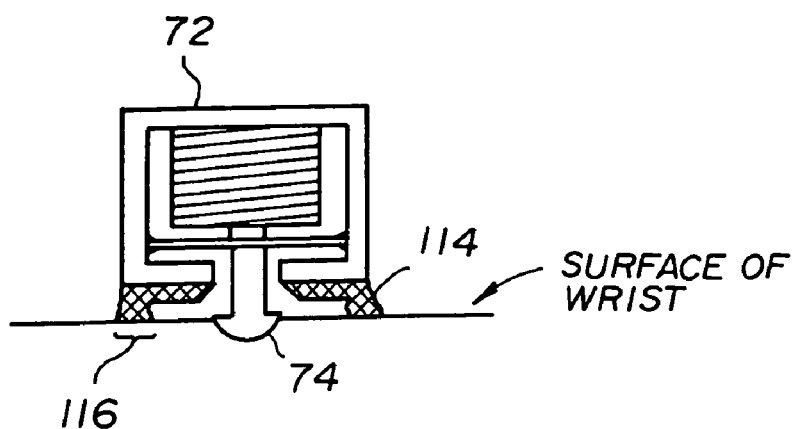
FIG. 35 is a sectional view of the bone conduction actuator which has the insulator, showing a case when it is used.

In the fifth embodiment shown in FIG. 22 and FIG. 23, the actuator 72 can be configured as shown in FIG. 34. The actuator 72 has an insulator 114 beneath the actuator which surrounds around the vibrator 74 so as to prevent leaking sound. To be more specific, as shown in FIG. 35, when the actuator 72 is pushed on the surface of the wrist, the insulator 114 is in intimate contact with the surface so as to enclose the contacting part of the vibrator directly. Therefore, the sound does not leak. In this configuration, the insulator 114 does not touch the vibrator.

Figure 36:
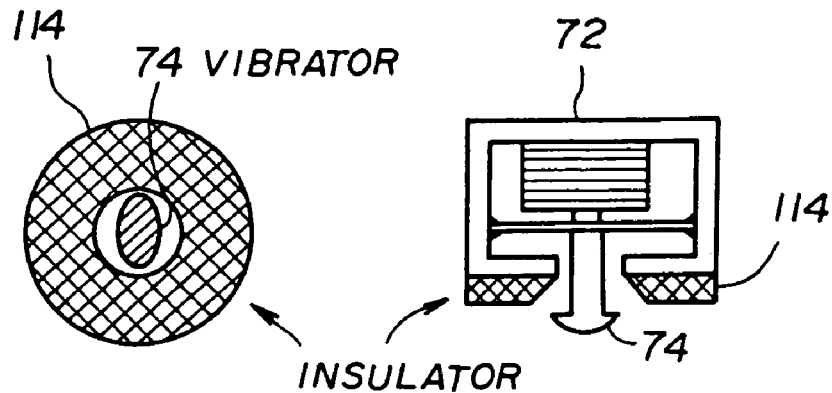
FIG. 36 is a sectional view of the bone conduction actuator which has another example of the insulator, showing a case when it is unused.
Figure 37:
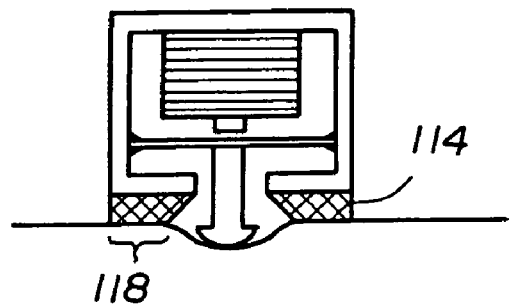
FIG. 37 is a sectional view of the bone conduction actuator which has the insulator, showing a case when it is used.

Further, the insulator 114 can be formed beneath the actuator 72 and shaped like a doughnut, as shown in FIG. 36. FIG. 37 shows a case in which the actuator is in contact with the surface of the wrist. Thus, because the insulator contacts more intimately the surface of the wrist with some contacting area, the actuator is more effectively soundproofed.

Figure 38:
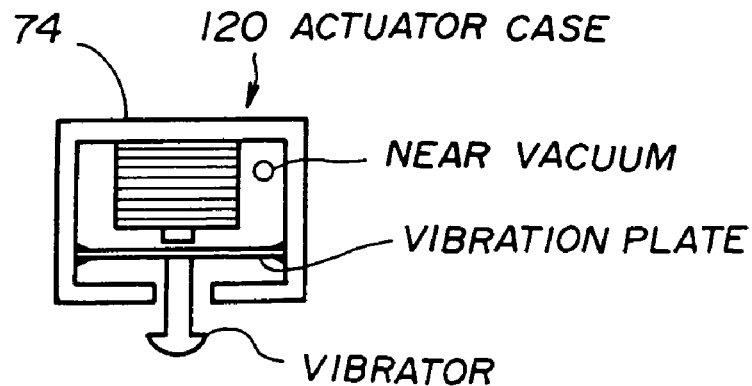
FIG. 38 is a sectional view of the bone conduction actuator in which the inside of the bone conduction actuator is in a vacuum.

In terms of soundproofing, as shown in FIG. 38, it is effective to make the inside of an actuator case 120 vacuum or near-vacuum. Specifically, leakage of sound to surrounding people decreases by decreasing a transmitting medium within the actuator case 120. This configuration can be taken regardless of the shape of the vibrator of the actuator.

According to an actuator like this, the user can hear clearly the received voice without the leakage of sound to the surrounding people. However, leakage of a loud sound can possibly occur if the actuator is detached from the surface of the wrist, and the loudness of the received voice can possibly change considerably depending upon the pressure at which the actuator is pushed on the human body.

Thus, in the following, a wearable receiver which is soundproof and solves the above possible disadvantages will be described as a sixth embodiment of the present invention. The wearable receiver can stop emitting the received voice when the actuator detaches from the human body and can convey the received voice while keeping the loudness or the tonal quality of the voice constant regardless of the pressure of the actuator to the human body.

Figure 39:
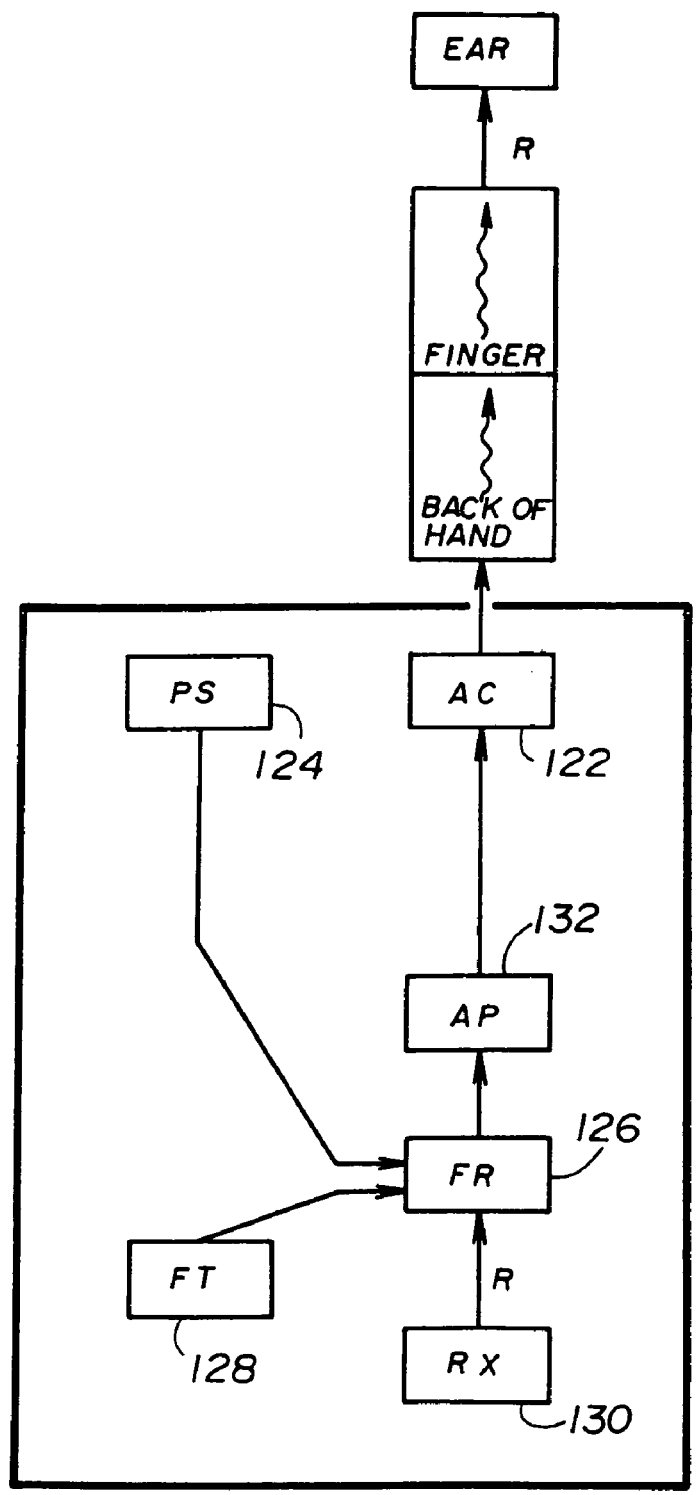
FIG. 39 is a block diagram showing a wearable communication device according to a sixth embodiment of the present invention.

FIG. 39 shows a block diagram of the actuator. As shown in FIG. 39, the wearable receiver includes an actuator (AC) 122, an actuator amp (AP) 132, a receiver (RX) 130, a pressure sensor (PS) 124 for detecting the pushing pressure of the actuator 122, a receiving filter (FR) 126 for correcting a change of the frequency characteristics and a receiving filter table (a conversion table) (FT) 128. The function of the receiving filter table (a conversion table) (FT) 128 will be described later.

In the configuration, the pressure sensor (PS) 124 is provided in the actuator (AC) 122, and, the receiving filter (FR) 126 and the receiving filter table (FT) 128 are provided in the amp unit which has been described before. The location of the receiving filter (FR) 126 can be anywhere as long as the location is between the receiver (RX) 130 and the actuator amp (AP) 132. Further, even though the block diagram indicates one of the configurations mentioned above in which the actuator contacts the back side of the hand, the actuator of this sixth embodiment can be applicable to any other configuration. The operation will be described below.

A receiving voice signal (R) is output from the receiver (RX) 130, and the change of the frequency characteristics caused by transmission through the back of the hand and the finger is corrected by the receiving filter (FR) 126. Then, the signal (R) is amplified by the actuator amp (AP) 132 and vibrates the actuator (AC) 122. The vibration of the actuator (AC) 122 is transmitted to the ear through the back of the hand and the finger.

The pushing pressure detected by the pressure sensor (PS) 124 is input to the receiving filter (FR) 126. The receiving filter (FR) 126 corrects the loudness and the tonal quality (the characteristics) of the received voice signal (R) according to the relationship between the pressure and the received voice signal (R) with reference to the receiving voice filter table (the conversion table) (FT) 128. An example of the configuration of the receiving voice filter table (FT) will be described in the following with reference to FIG. 40 (a) and (b).

FIG. 40(a) shows a graph of the loudness correction against the pushing pressure. In the present embodiment, as the pressure of the actuator (AC) increases, the efficiency of the voice transmission increases. As a result, the user can hear a louder sound. On the other hand, if the pressure decreases, the loudness decreases. Therefore, when the pressure is low, the filter amplifies the loudness so that the user can hear the received voice at a constant loudness level.

As shown in FIG. 40(a), when the pushing pressure is below a threshold (THD), the amplification rate is 0 for the sake of soundproofing. More specifically, the leakage of the sound to the surrounding people hardly occurs when the actuator (AC) is pushed on the surface of the wrist, but the leakage will occur at once when the actuator (AC) leaves the surface. Therefore, the amplification ratio becomes 0 so as not to emit the sound when the pressure is below the threshold.

In this way, the leakage will be decreased by detecting the separation of the actuator from the surface of the human body with the pressure sensor (PS) and by decreasing the loudness level of the receiving voice.

Only for preventing the leakage, a configuration in which the receiving signal is not sent to the actuator when the actuator detaches from the surface of the body can be taken without the receiving filter table (FT). Further, in this case, the wearable receiver can be further simplified by using a simple switch mechanism instead of the pressure sensor (PS).

FIG. 40(*b*) shows a graph of the correction of the tonal quality against the pushing pressure. In the present embodiment, as the pressure of the actuator increases, the transmission efficiency of high-frequency components increases. On the other hand, if the pressure is low, the receiving voice becomes a muffled sound because the transmission efficiency of the high-frequency components decreases. Therefore, if the pressure is low, the tonal quality of the sound to the user can be kept constant by amplifying the high-frequency components of the sound. The content of the receiving filter table (FT) is configured beforehand usually, but it is possible to configure the table (FT) so as to adapt to each user by a calibration.

In the embodiment shown in FIG. 39, the receiving filter table (FT) is formed like a separated block. However, the table (FT) can be embedded within the receiving filter (FR) by means of software or hardware. Further the pressure sensor (PS) can be placed anywhere, for example, on some midpoint or the base of the boom shown in FIG. 13, as long as the pressure of the actuator (AC) can be monitored.

As described above, according to the present invention, the leakage of the sound can be prevented since the receiving voice is not emitted when the actuator separates from the surface of the human body. Further, by correcting the loudness or the tonal quality of the receiving voice according to the pushing pressure of the actuator, the actuator transmits the receiving voice while keeping the loudness and the tonal quality constant.

In the following, a seventh embodiment of the present embodiment will be described. This embodiment is a wearable telephone which enables the user to speak into it without annoying surrounding people and without being influenced by outside noise.

Figure 41:
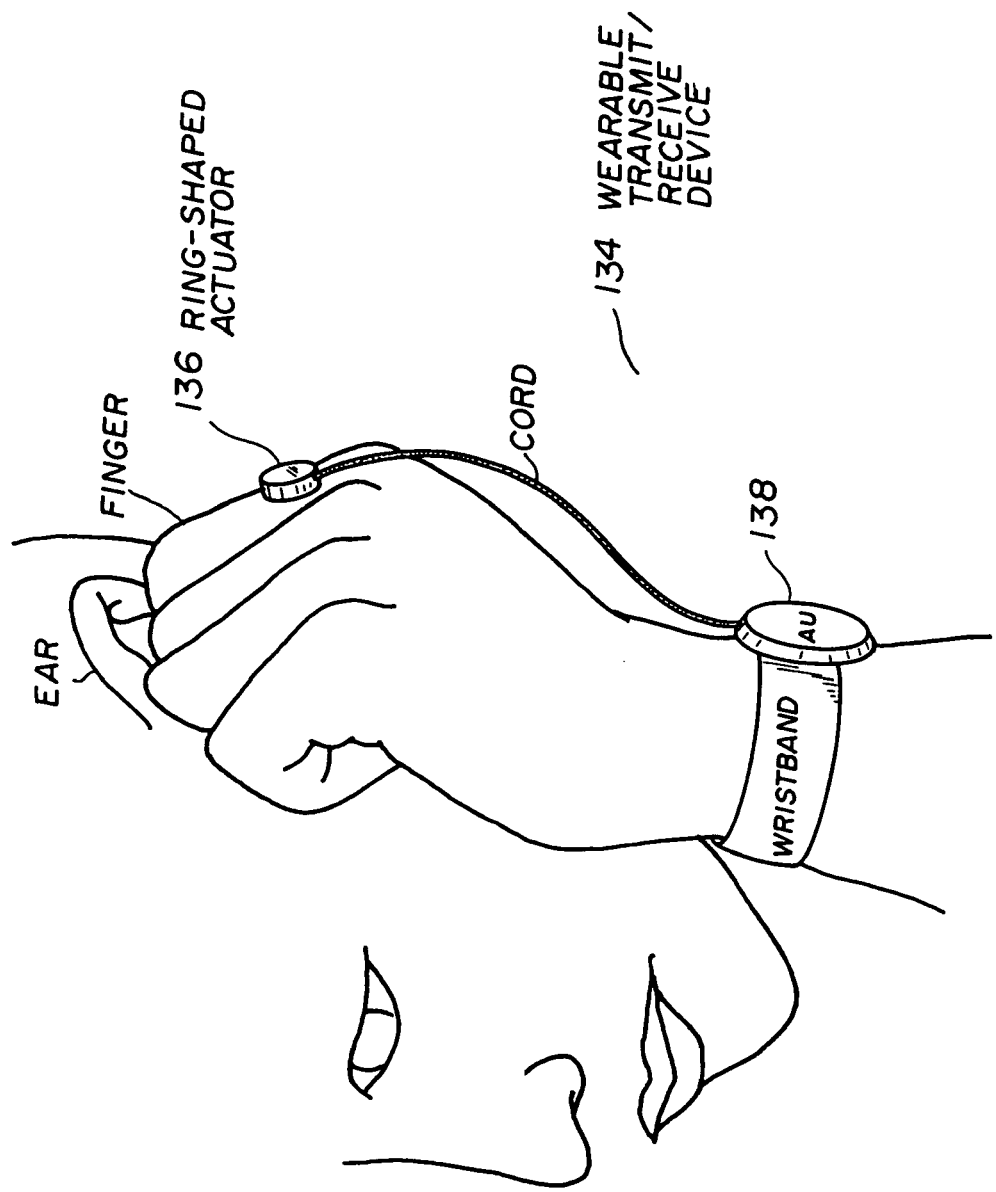
FIG. 41 is a schematic perspective diagram showing a wearable communication device according to a seventh embodiment of the present invention.

FIG. 41 is a schematic perspective diagram showing a wearable transmit/receive device 134 of the seventh embodiment of the present invention. As shown in FIG. 41, the wearable transmit/receive device 134 includes a ring-shaped actuator 136 and an amp unit (AU) 138. The ring-shaped actuator 136 is mounted on the base of the user's finger, and the amp unit (AU) 138 is mounted on the back of the wrist by a wristband 162.

Figure 42:
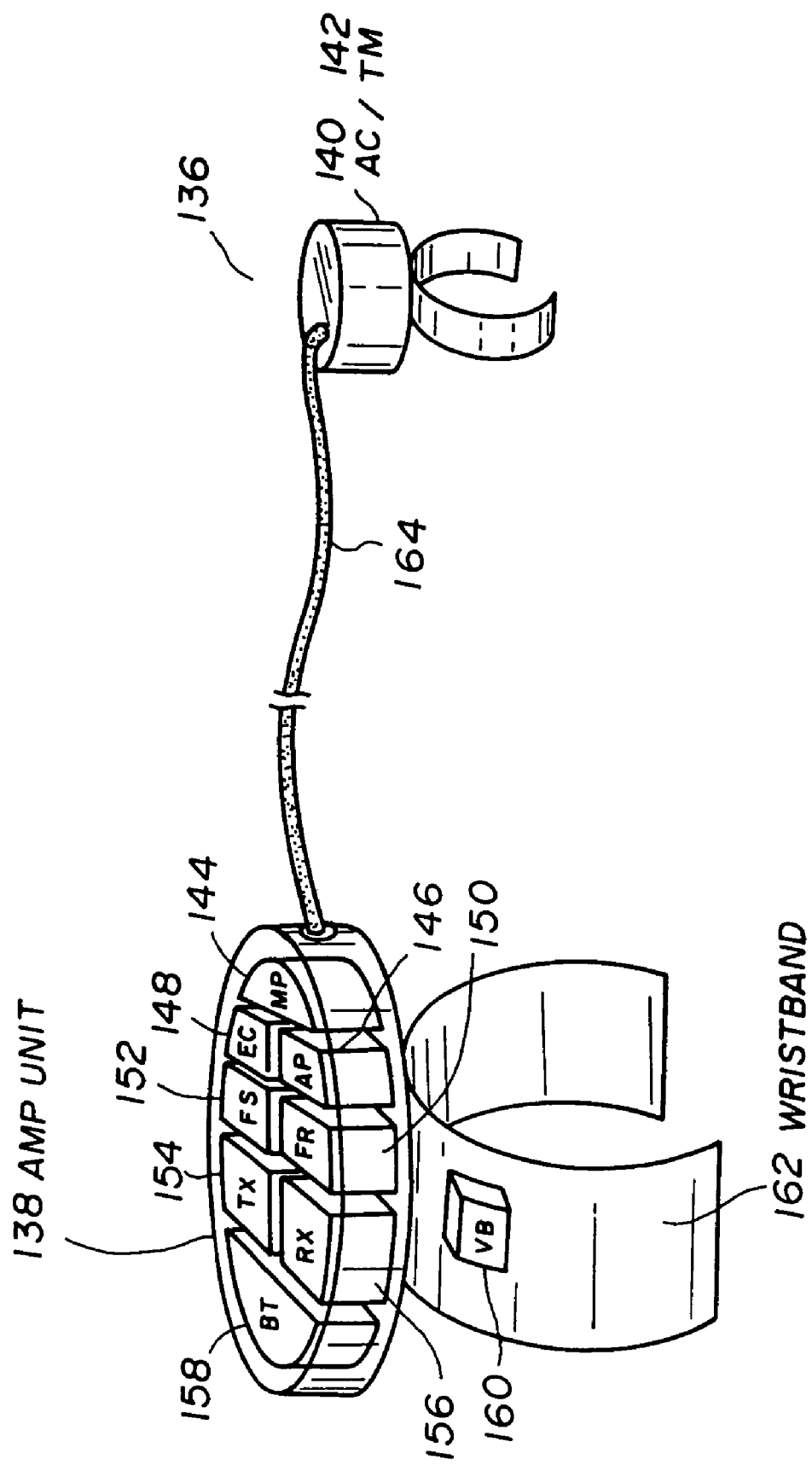
FIG. 42 is a perspective diagram showing the wearable communication device according to the seventh embodiment of the present invention.

FIG. 42 is a perspective diagram showing the inside of the wearable transmit/receive device 134. As shown in FIG. 42, the ring actuator 136 includes an actuator (AC) 140 and a bone conduction microphone (TM) 142. Also, a microphone amp (MP) 144, an actuator amp (AP) 146, an echo canceling part (EC) 148, a receiving filter (FR) 150, a transmitting filter (FS) 152, a transmitter (TX) 154, a receiver (RX) 156, and a battery (BT) 158 for supplying power are provided in the amp unit (AU) 138. A vibrator is attached on the wristband 162, and the ring-shaped actuator 136 and the amp unit 138 are connected by a cord 164. The amp unit includes a hook switch (SW) which is not shown in this figure.

Figure 43:
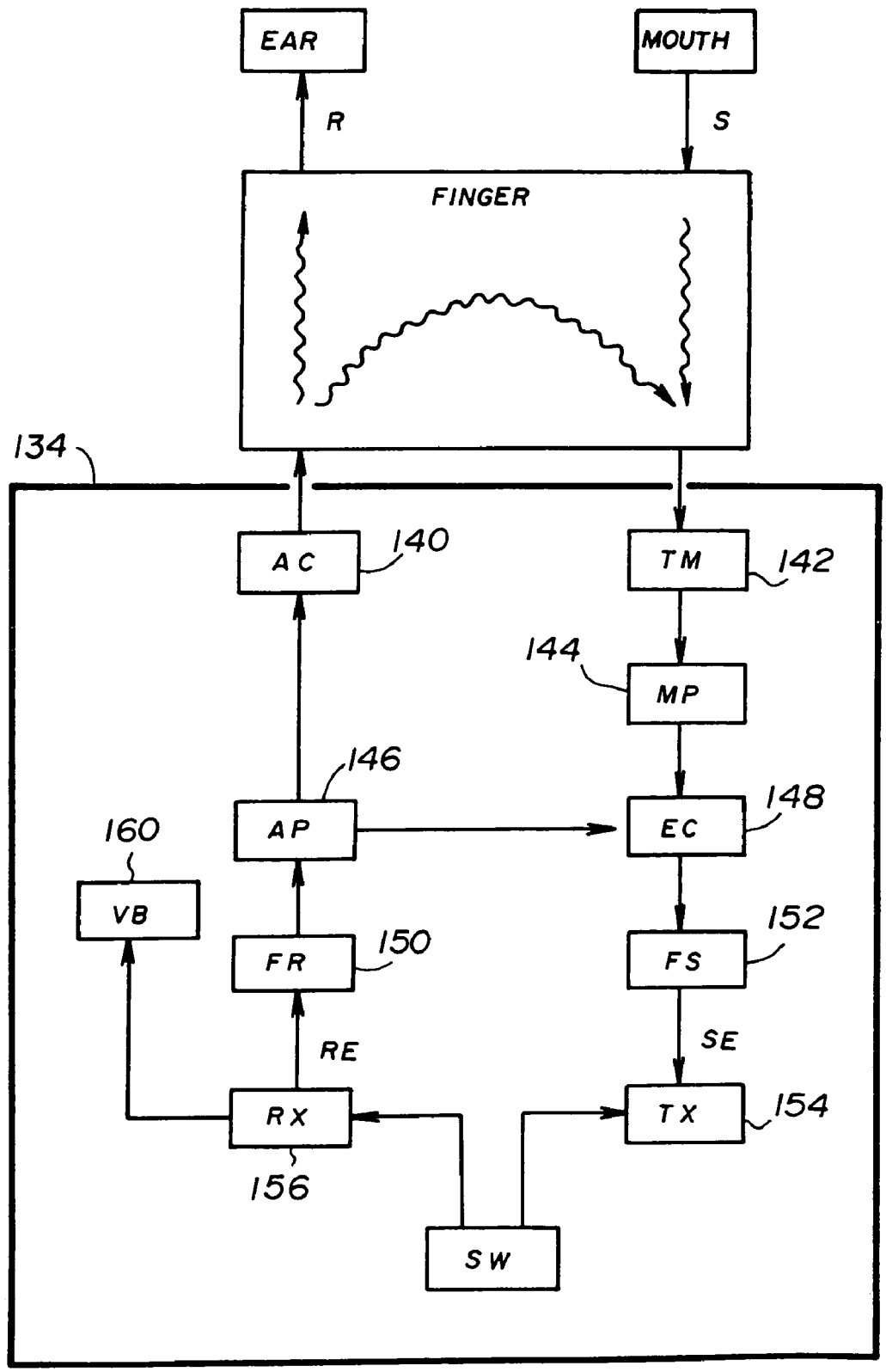
FIG. 43 is a block diagram showing the wearable communication device according to the seventh embodiment of the present invention.

FIG. 43 shows a block diagram of the wearable transmit/ receive device 134. The operation will be described below with reference to FIG. 43. When the user uses the wearable transmit/receive device 134, the hook switch works so as to connect a line. Next, the user inserts the fingertip of the finger on which the ring-shaped actuator (AC) 136 is mounted into the ear canal. The user also may cover up the entry of the ear canal by the nail of the finger or by the finger. The user's utterance (S) is transmitted to the bone conduction microphone (TM) through the head and the finger, then, it is amplified by the microphone amp (MP) 144.

A received voice signal (RE) is output from the receiver (RX) 156, and the change of the frequency characteristics caused by the transmission through the finger is corrected by the receiving filter (FR) 150. Then, the signal (RE) is amplified by the actuator amp (AP) 146 and vibrates the actuator (AC) 140. The vibration of the actuator (AC) 140 is transmitted to the ear through the finger.

Even though both the transmitting voice (S) and the received voice (R) are input in the bone conduction microphone (TM) 142 at the same time, the echo canceling part (EC) 148, into which the received voice signal (RE) is input as a reference input, separates the transmitting voice signal (SE) from the received voice signal (RE).

The transmitting voice signal (SE), which is separated from the received voice signal (RE) by the echo canceling part (EC), is transmitted by the transmitter (TX) 154 after correction of the frequency characteristics. The characteristics of the receiving filter (FR) and the transmitting signal filter (FS) 152 are configured beforehand usually, but it is possible to configure them so as to adapt to various users by a calibration.

The location of the receiving filter (150) can be anywhere so long as the location is between the receiver (RX) 156 and the actuator (AC) 140. Also, the location of the transmitting filter (152) can be anywhere so long as the location is between the transmitter (TX) 154 and the bone conduction microphone (TM) 142.

A user is notified of an incoming call by vibrations of the vibrator (VB) 160. Instead of a vibrator (VB) 160, the user can be notified of the incoming call by inputting a large-amplitude low frequency signal into the actuator (AC) 140.

Further, the location of the bone conduction microphone (TM) 142 is not limited to the inside of the ring-shaped actuator 136 as shown in FIG. 42. It can also be mounted on the user's wrist, hand, finger or nail. Also, the actuator can be mounted on the user's wrist, hand, finger or nail.

According to the above-mentioned embodiment, the user can receive the received voice clearly even under a noisy environment without leakage of the voice since the user inserts the finger on which the ring-shaped actuator 136 is mounted into the ear canal. Further, the user can get naturally the feedback of the user's utterance by bone conduction because the user inserts the finger on which the ring-shaped actuator 136 is mounted into the ear canal. As a result, the influence of the user's utterance on surrounding people decreases since the user does not need to speak loudly even when the user is in a noisy environment. Further, the device can gather the user's utterance stably without being disturbed by outside noise. Furthermore, only the user can be notified of an incoming call without disturbing the surrounding people since the alert is by the vibrator.

Figure 44:
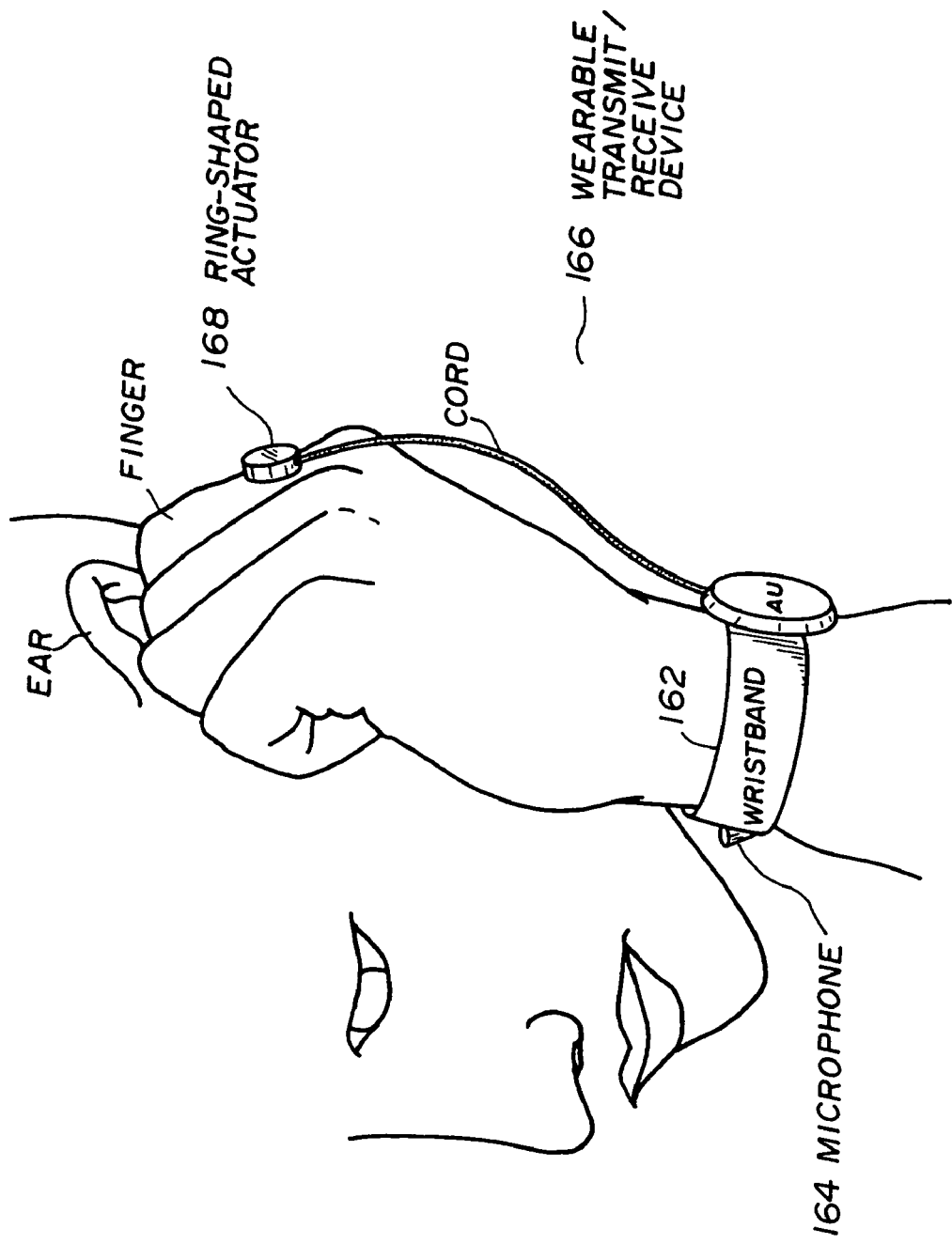
FIG. 44 is a schematic perspective diagram showing a wearable communication device according to an eighth embodiment of the present invention.

FIG. 44 is a schematic perspective diagram showing a wearable transmit/receive device according to an eighth embodiment of the present invention. As shown in FIG. 44, the wearable transmit/receive device 164 of this embodiment includes a microphone 164 on the side of a wristband 162 instead of the bone conduction microphone of the seventh embodiment.

Figure 45:
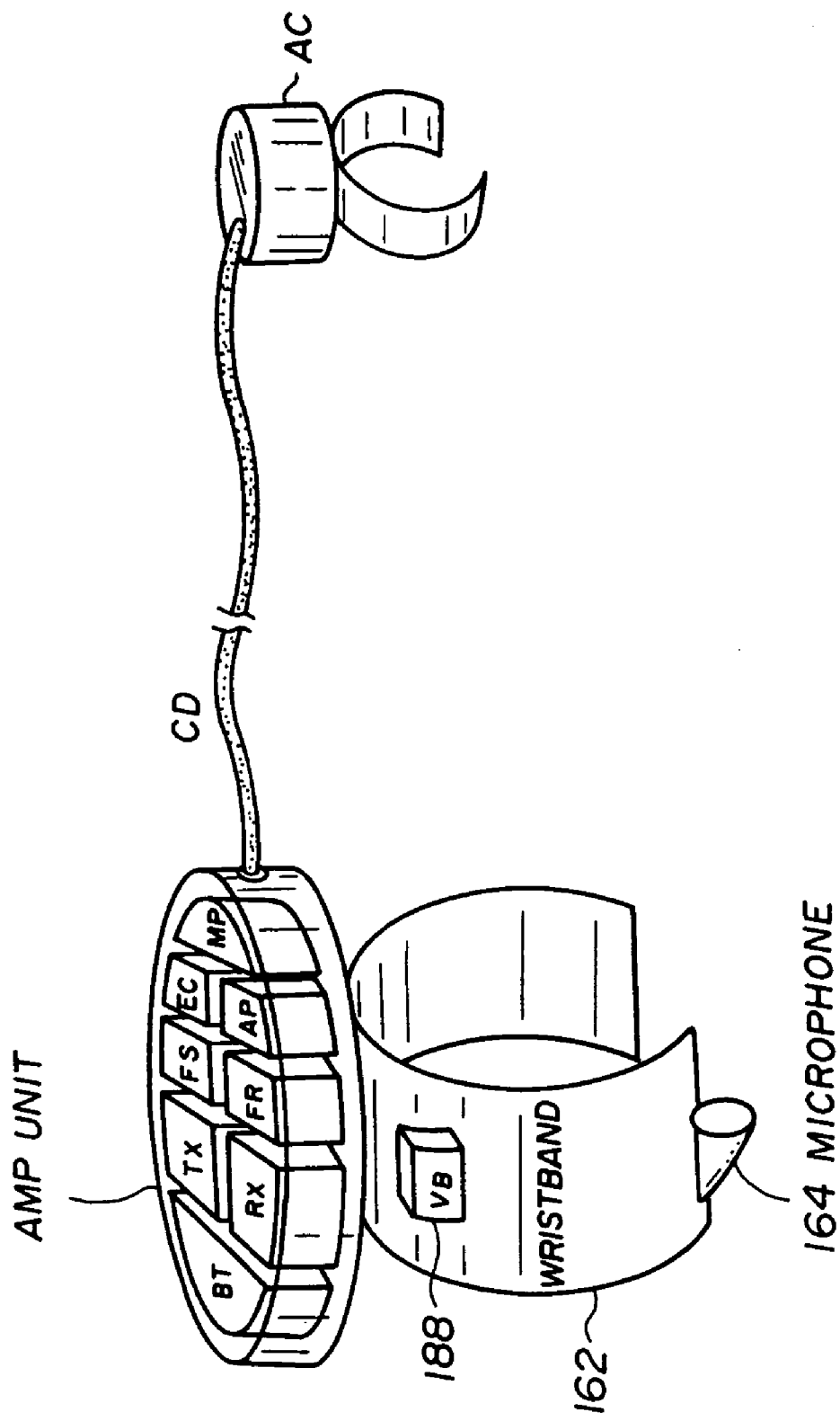
FIG. 45 is a perspective diagram showing the wearable communication device according to the eighth embodiment of the present invention.

FIG. 45 is a perspective diagram showing the inside of wearable transmit/receive device 166. In the following, different points from the seventh embodiment will be described.

A ring-shaped actuator 168 has only the bone conduction actuator, and, the microphone 164 is provided on the side of the wristband 162. The amp unit includes a hook switch (SW) which is not shown in the figure.

Figure 46:
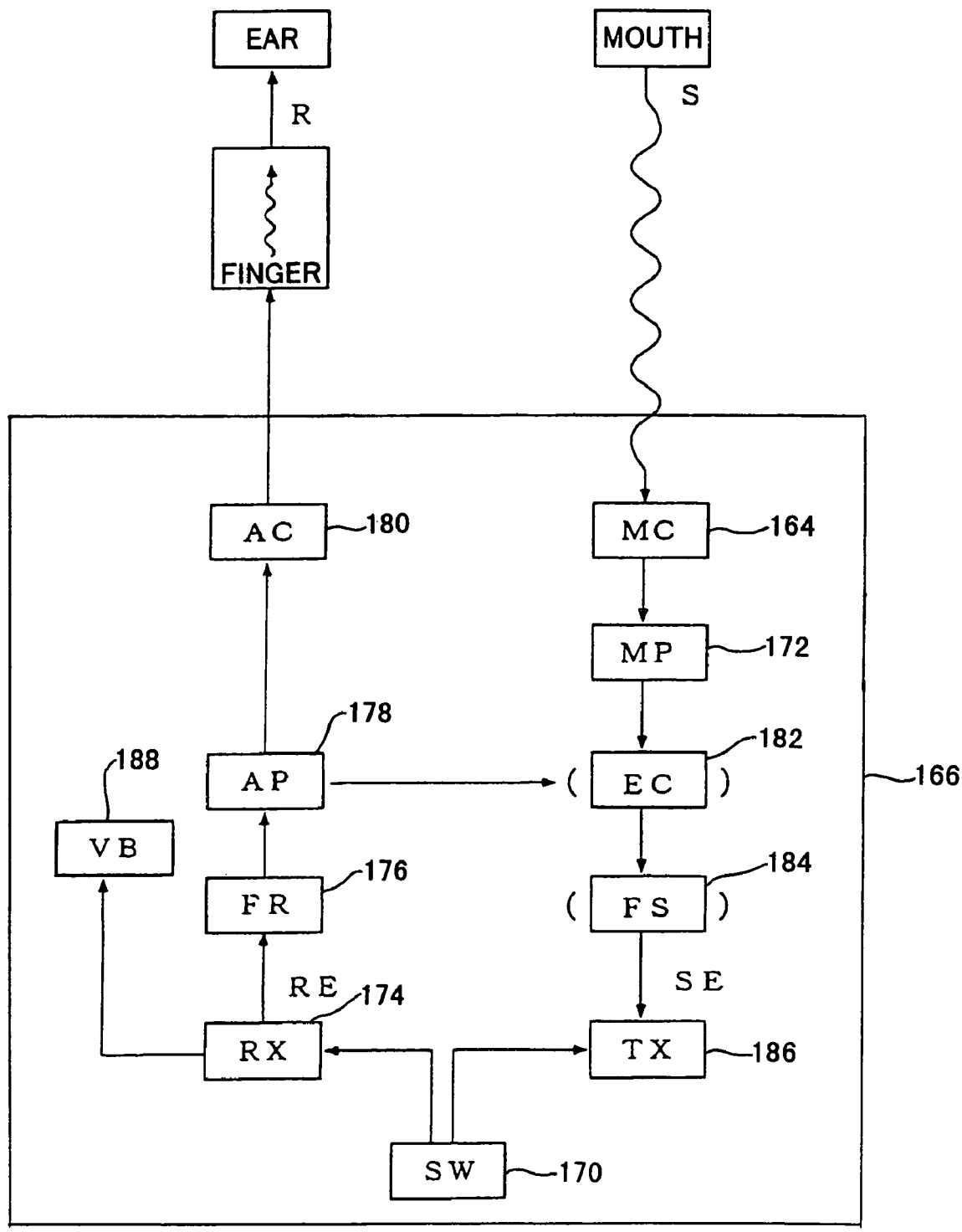
FIG. 46 is a block diagram showing the wearable communication device according to the eighth embodiment of the present invention.

FIG. 46 is a block diagram showing the wearable transmit/ receive device 166. The operation will be described with reference to FIG. 46 in the following.

When the user uses the wearable transmit/receive device 166, the hook switch works so as to connect a line. Next, the user starts a call after inserting the fingertip of the finger on which the ring-shaped actuator is mounted into the ear canal.

The hook switch can take various mechanisms. For example, the mechanism may be the one described as the third embodiment shown in FIG. 10.

The user's utterance (S) is entered into the microphone (MC) 164, and, then, is amplified by a microphone amp 172. When the user inserts the fingertip of the finger into the ear canal, the mouth and the microphone 164 on the side of the wristband 162 become close naturally so that the microphone can receive the user's utterance well.

The received voice signal (RE) is output from a receiver (RX) 174, and the change of the frequency characteristics caused by transmission through the back of the hand and the finger is corrected by a receiving filter (FR) 176. Then, the signal (RE) is amplified by an actuator amp (AP) 178 and vibrates an actuator (AC) 180. The vibration of the actuator (AC) 180 is transmitted to the ear through the finger.

Even though both the transmitting voice (S) and the received voice (R) are input in the microphone (MC) 164 at the same time, an echo canceling part (EC) 182 into which the received voice signal (RE) is input as a reference input separates the transmitting voice signal (SE) from the received voice signal (RE).

The transmitting voice signal (SE) which is separated from the received voice signal (RE) by the echo canceling part (EC) 182 is transmitted by the transmitter (TX) 186 after correction of the frequency characteristics by a transmitting filter (FS) 184. The characteristics of the receiving filter (FR) 176 and the transmitting voice signal filter (FS) 184 are configured beforehand usually, but it is possible to configure them so as to adapt to various users by a calibration.

The location of the receiving filter (FR) 176 can be anywhere so long as the location is between the receiver (RX) 174 and the actuator (AC) 180. Also, the location of the transmitting voice filter (184) can be anywhere so long as the location is between the transmitter (TX) 186 and the microphone (TM) 164.

The echo canceling part (EC) 182 can be omitted if the microphone (MC) 164 can get only the user's utterance (S). The user is notified of an incoming call by the vibration of the vibrator (VB) 188. Instead of the vibrator (VB) 188, the user can be notified of the incoming call by inputting a large-amplitude low-frequency signal into the actuator (AC) 180.

According to the above-mentioned embodiment, the user can receive the received voice clearly even under a noisy environment without leakage of the voice since the user inserts the finger on which the ring-shaped actuator is mounted into the ear canal.

When the user inserts the fingertip of the finger into the ear canal, the mouth and the microphone 164 on the side of the wristband 162 become close naturally so that the microphone can receive the user's utterance well. Further, the using posture is similar to that in which a user makes a call with a conventional handset. Therefore, the user of the present embodiment can make a call without taking a strange posture.

Further, only the user can be notified of an incoming call without disturbing the surrounding people since the alert is by the vibrator.

Figure 47:
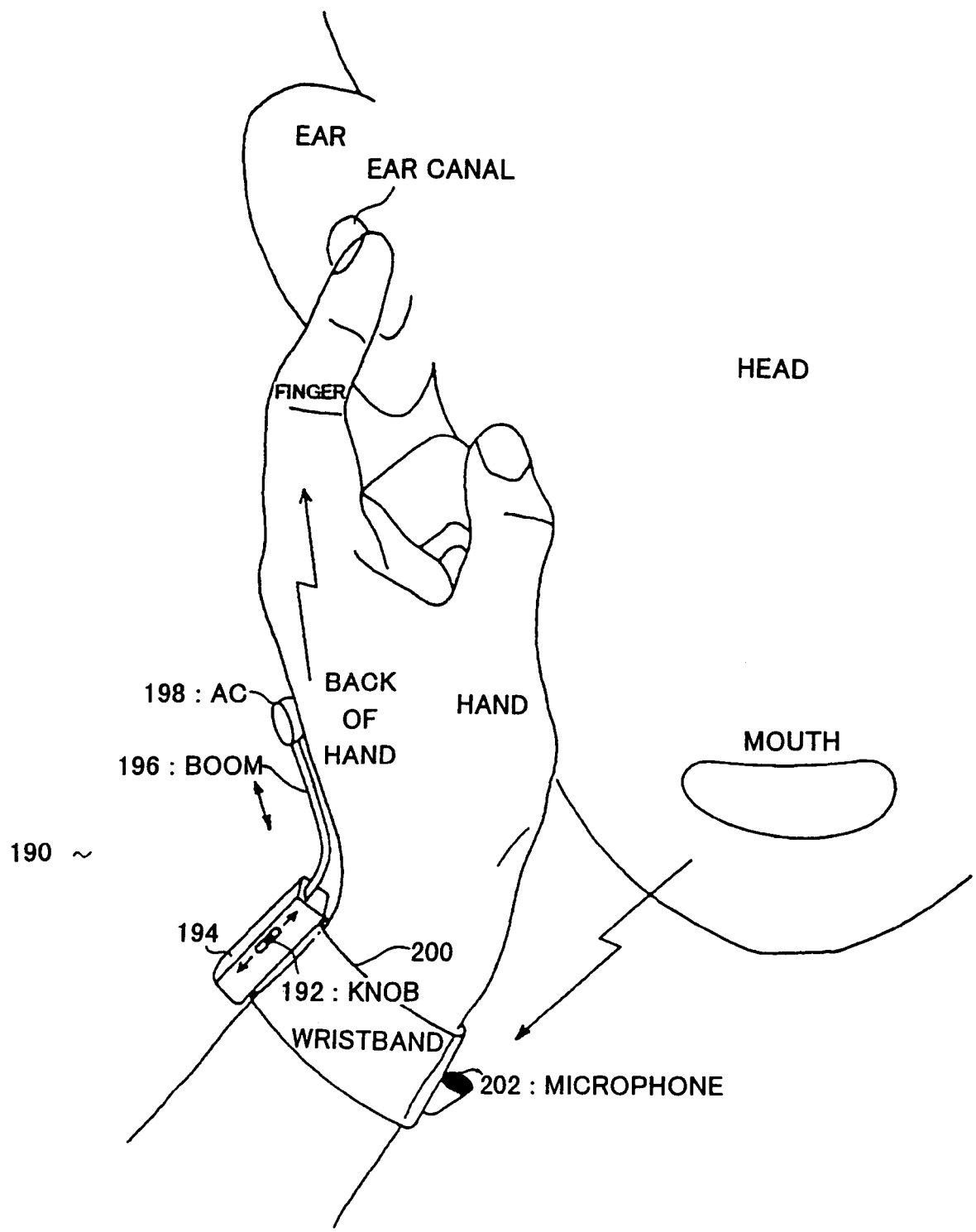
FIG. 47 is a schematic perspective diagram showing another example of the wearable communication device according to the eighth embodiment of the present invention.

The above-mentioned wearable transmit/receive device may take a form shown in FIG. 47. As shown in FIG. 47, the wearable transmit/receive device 190 has a knob 192 on the surface of a main unit 194. By sliding the knob 192, a boom 196 extends from the main unit 194. An actuator 198 is provided at the end of the boom 196. A main unit 194 of the wearable transmit/receive device 190 is mounted on the user's wrist by a wristband 200 which has a microphone 202 on the inside of the wrist. The inside block diagram is the same as that shown in FIG. 46. The boom 196 and the actuator 198 can be formed like ones shown in FIG. 13.

When the wearable transmit/receive device 190 is used, the boom 196 is pulled out by sliding the knob 192 forward. A hook switch SW works in conjunction with the sliding movement of the knob 192 so that a line connects.

Figure 48:
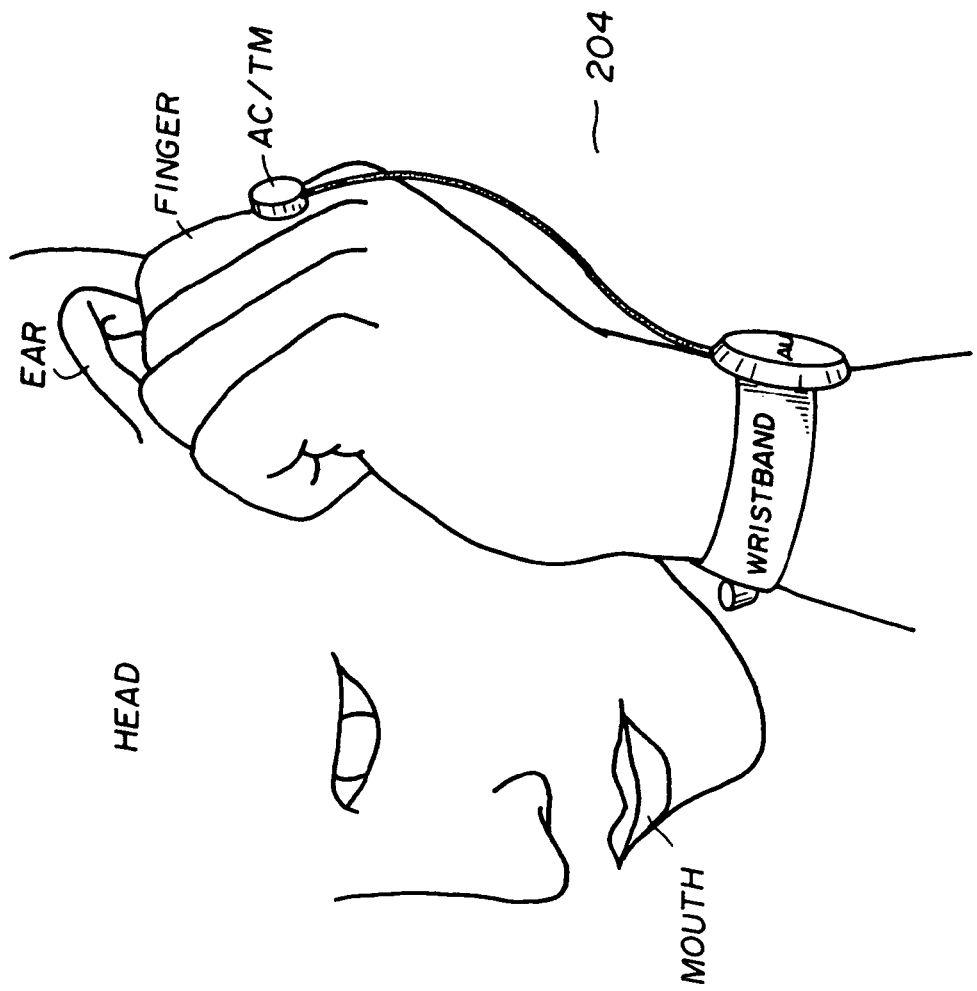
FIG. 48 is a schematic perspective diagram showing a wearable communication device according to a ninth embodiment of the present invention.

FIG. 48 is a schematic perspective diagram showing a wearable transmit/receive device according to a ninth embodiment of the present invention.

As shown in FIG. 48, the wearable transmit/receive device 204 has both of the bone conduction microphone of the seventh embodiment and the microphone of the eighth embodiment.

Figure 49:
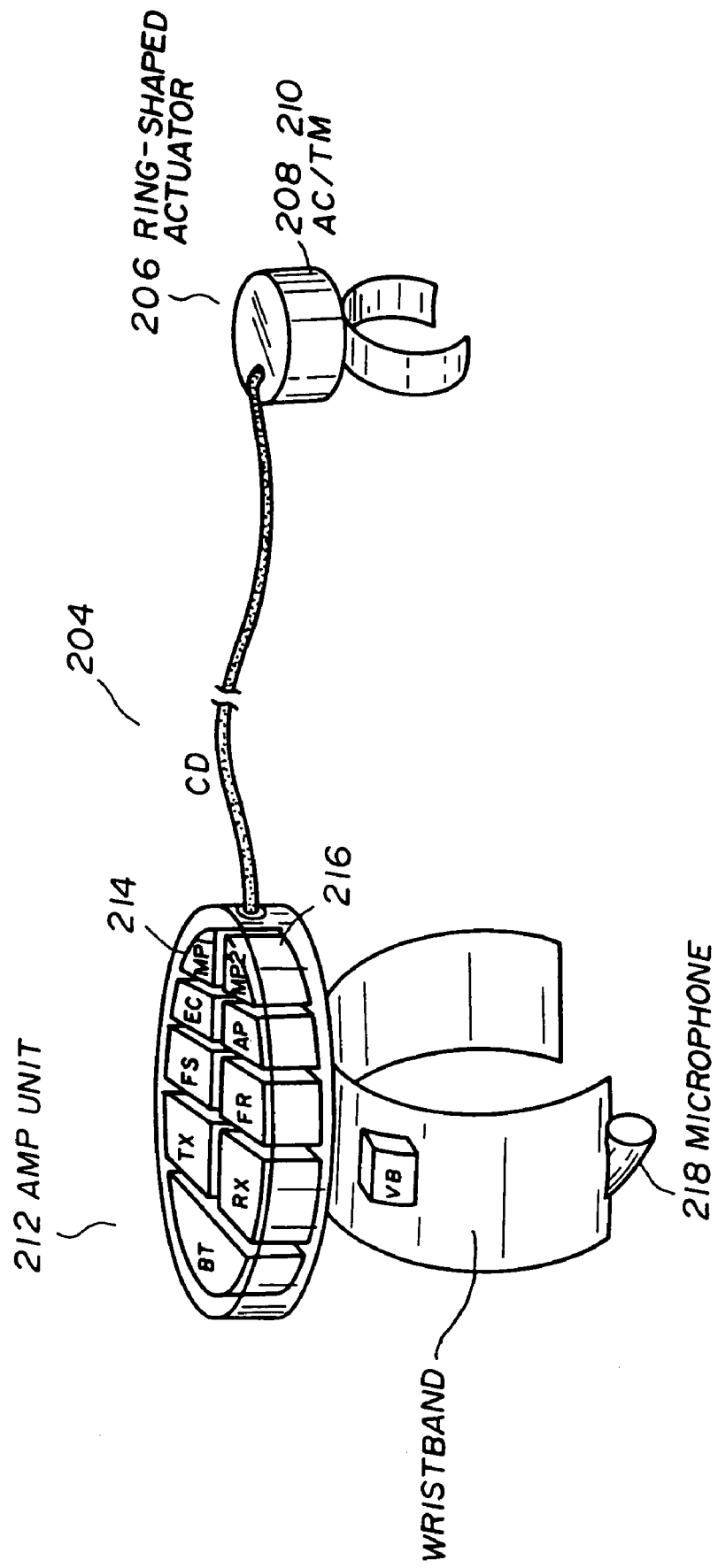
FIG. 49 is a perspective diagram showing the wearable communication device according to the ninth embodiment of the present invention.

FIG. 49 shows the inside configuration of the wearable transmit/receive device 204. The different point from the seventh and the eighth embodiments is as follows. A ring-shaped actuator 206 includes an actuator (AC) 208 and a bone conduction microphone (TM) 210, and an amp unit 212 includes a bone conduction microphone amp (MP1) 214 and a microphone amp (MP2) 216. Further, an adder (AD), not shown in FIG. 49, which mixes the signals from the amps is provided.

Figure 50:
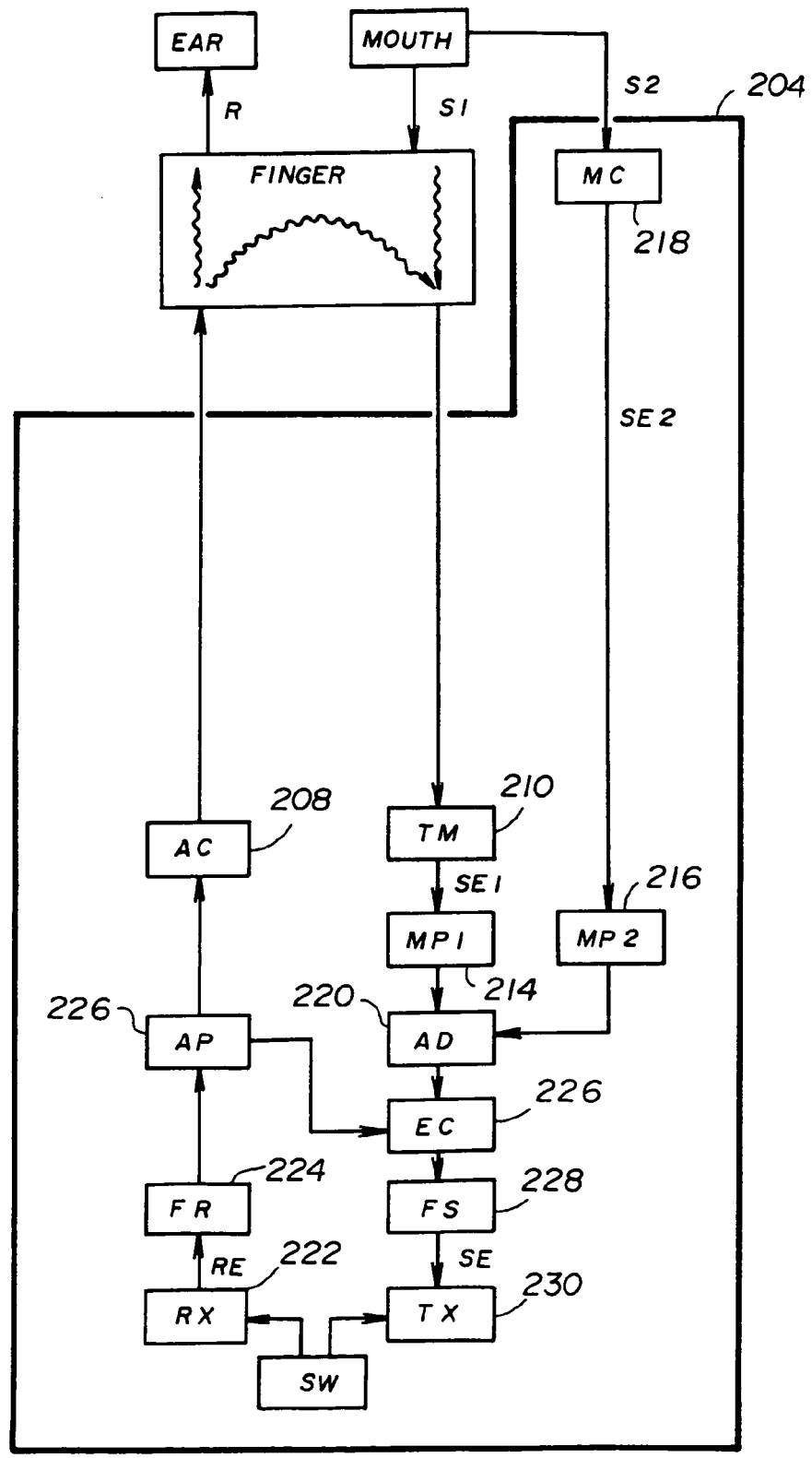
FIG. 50 is a block diagram showing the wearable communication device according to the ninth embodiment of the present invention.

FIG. 50 is a block diagram of the wearable transmit/receive device 204. The operation will be described in the following with reference to FIG. 50.

When the wearable transmit/receive device 204 is used, the user inserts the fingertip of the finger on which the ring-shaped actuator 206 is mounted into the ear canal, and, then, speaks by the ring-shaped actuator 206. The user's utterance (S1) is transmitted to the bone conduction microphone (TM) 210 through the head and the finger, and is amplified by the bone conduction microphone amp (MP1) 214. The transmitting voice signal (SE1) which is gathered by the bone conduction microphone (TM) 210 and the transmitting voice signal (SE2) which is gathered by the microphone (MC) 218 are mixed by the adder (AD) 220. There are several methods for the mixing such as a method using a fixed mixing ratio and a method controlling the mixing ratio according to surrounding noise.

A received voice signal (RE) is output from a receiver (RX) 222, and a change of the frequency characteristics caused by the transmission through the finger is corrected by a receiving voice filter (FR) 224. Then, the signal (RE) is amplified by an actuator amp (AP) 226 and vibrates the actuator (AC) 208. The vibration of the actuator (AC) 208 is transmitted to the ear through the finger.

Even though both the transmitting voice (S) and the received voice (R) are input in the bone conduction microphone (TM) 210 at the same time, an echo canceling part (EC) 226, into which the received voice signal (RE) is input as a reference input, separates the transmitting voice signal (SE1, SE2) from the receiving voice signal (RE).

The transmitting voice signal (SE) which is separated from the receiving voice signal (RE) by the echo canceling part (EC) 226 is transmitted by a transmitter (TX) 230 after correction of the frequency characteristics by a transmitting filter (FS) 228.

Usually, the characteristics of the received voice signal filter (FR) 224 and the transmitting voice signal filter (FS) 228 are configured beforehand, but it is possible to configure them so as to adapt to various users by a calibration.

The location of the receiving filter (FR) 224 can be anywhere so long as the location is between the receiver (RX) 222 and the actuator (AC) 208. Also, the location of the transmitting voice filter (FS) 228 can be anywhere so long as the location is between the transmitter (TX) 230 and the bone conduction microphone (TM) 210.

The above-mentioned embodiment has the advantages of the seventh and the eighth embodiments. In addition, according to the embodiment, the device can pick up the user's utterance more clearly.

Figure 51:
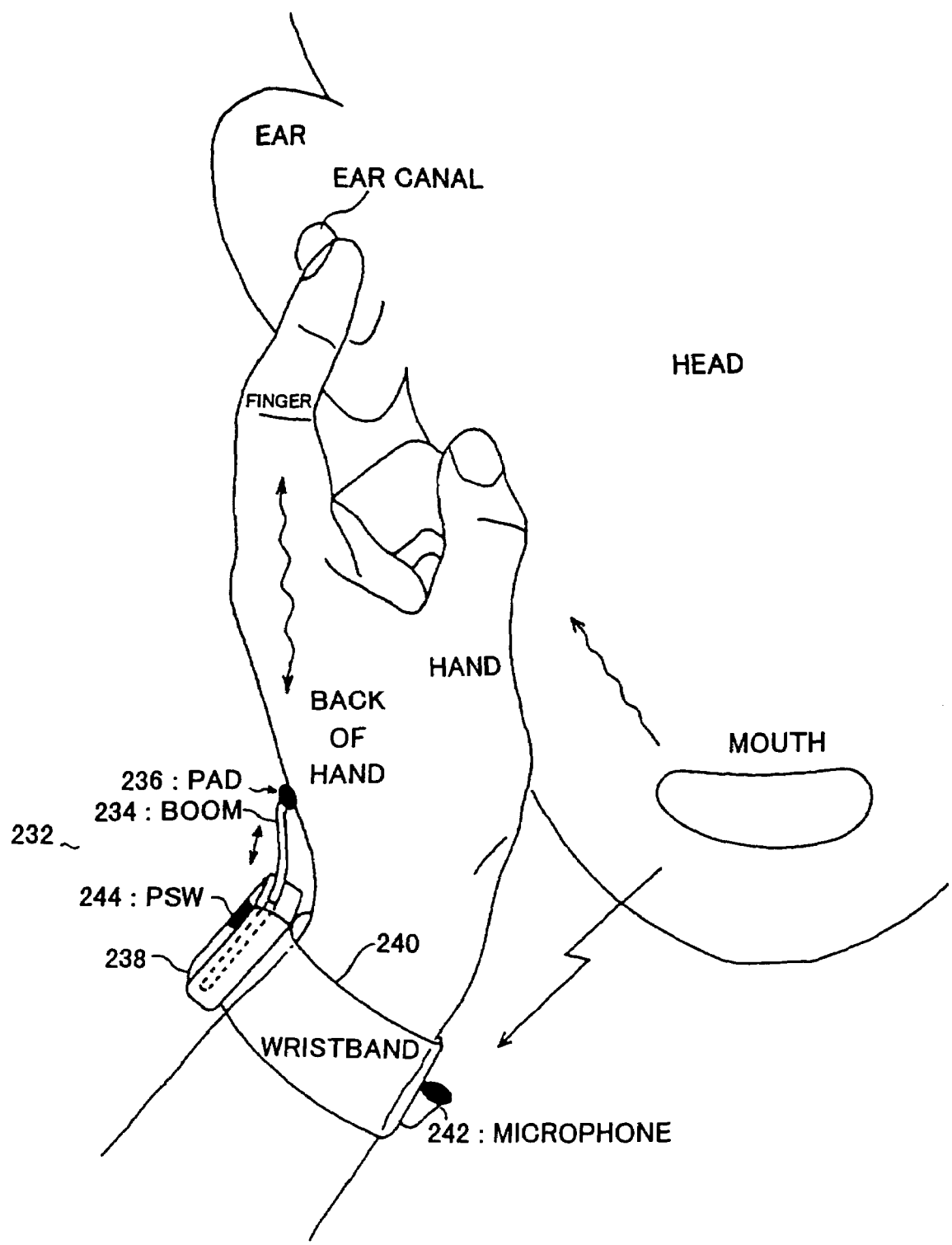
FIG. 51 is a schematic perspective diagram showing another example of the wearable communication device according to the ninth embodiment of the present invention.

A wearable transmit/receive device using both of the bone conduction microphone and the normal microphone like the above-mentioned device also can be formed as shown in FIG. 51. As shown in FIG. 51, the wearable transmit/receive device 232 has a boom 234 extending from a main unit 238. A pad 236 is provided on the end of the boom 234. The main unit 238 of the wearable transmit/receive device 232 is mounted on the user's wrist by the wristband 240 which has a microphone 242 on the inside or the wrist. In the embodiment, the main unit 238 includes the bone conduction microphone and the actuator. Further, a motor for sliding the boom 234 is embedded in the main unit 238.

When the wearable transmit/receive device 232 is used, the boom is pulled out by the motor and a line is connected by pushing on a switch (PSW) 244 which is provided on the main unit 238. The boom 234 is connected to the actuator and the bone conduction microphone in the main unit 238 so as to transmit a vibration. Other components are the same as shown in FIG. 50.

In this embodiment, the user's utterance (S) is transmitted to the bone conduction microphone through the head, the finger, the back of the hand, the pad 236 and the boom 234. Also, the vibration of the actuator by the received voice is transmitted to the ear through the boom 234, the pad 236, the back side of the hand and the finger.

Figure 52:
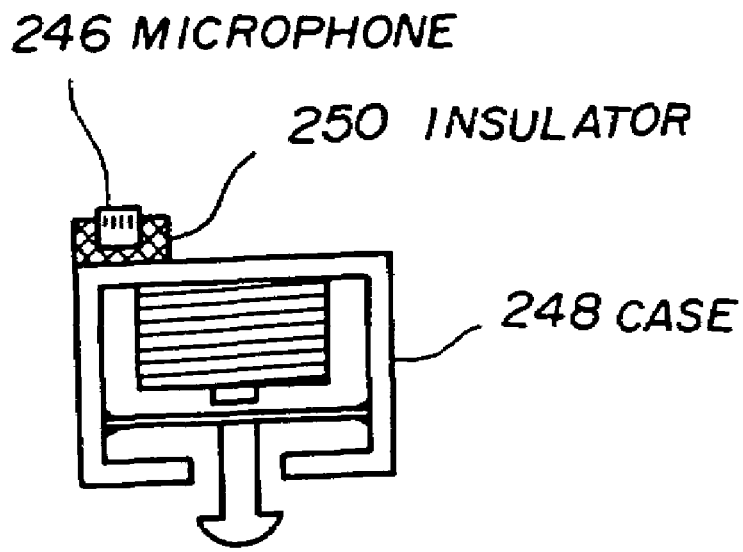
FIG. 52 is a sectional view of the bone conduction actuator with a microphone.

In the embodiments using the ring-shaped actuator such as the seventh embodiment, as shown in FIG. 52, a microphone 246 for gathering the user's utterance can be provided on a case 248 of the actuator. In the configuration as shown in FIG. 52 and a configuration in which the microphone is provided on the wristband, by surrounding the microphone with an insulator 250, a vibration of the receiving voice transmitted from the case or the band can be prevented. As a result, the user's utterance is clearly caught. Including an echo canceling part is further effective.

Figure 53:
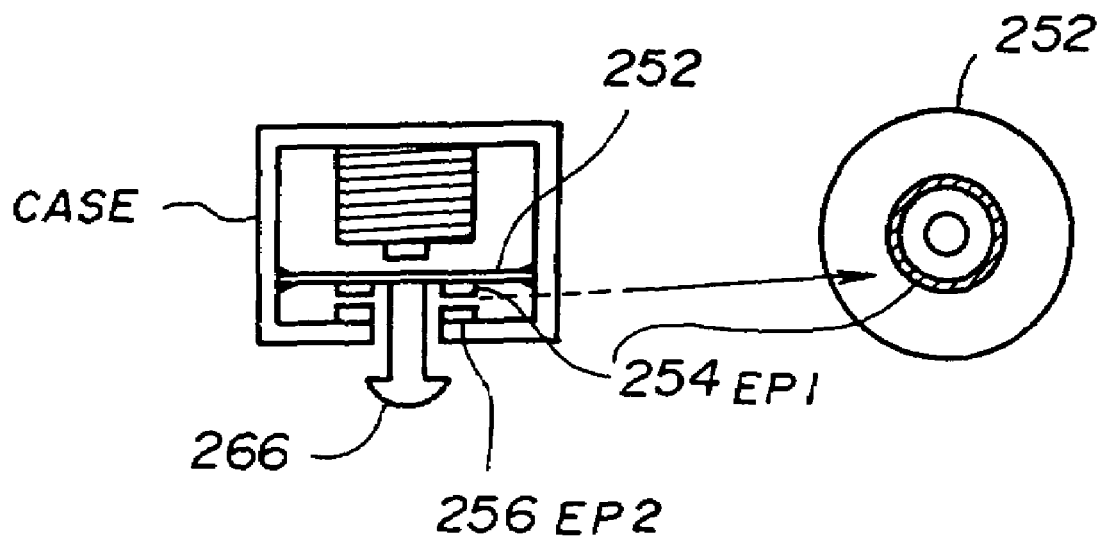
FIG. 53 is a sectional view of the bone conduction actuator with a microphone inside.

FIG. 53 shows an actuator which is a bone conduction actuator/microphone hybrid device. As shown in FIG. 53, the device includes a vibration plate 252 which has an electrode (EP1) 254 and a case which has another electrode (EP2) on the bottom, in which the spacing between the electrodes is minute. Also, the device includes a capacity detector (CD) 258 which detects capacity change between the electrodes and a microphone amp (MP) 260 which amplifies the output from the capacity detector (CD), both of which are not shown in FIG. 53. Thus, the bone conduction microphone and the actuator are integrated so as to improve usability. Further, the bone conduction microphone like this can detect the user's utterance clearly even under a noisy environment.

Figure 54:
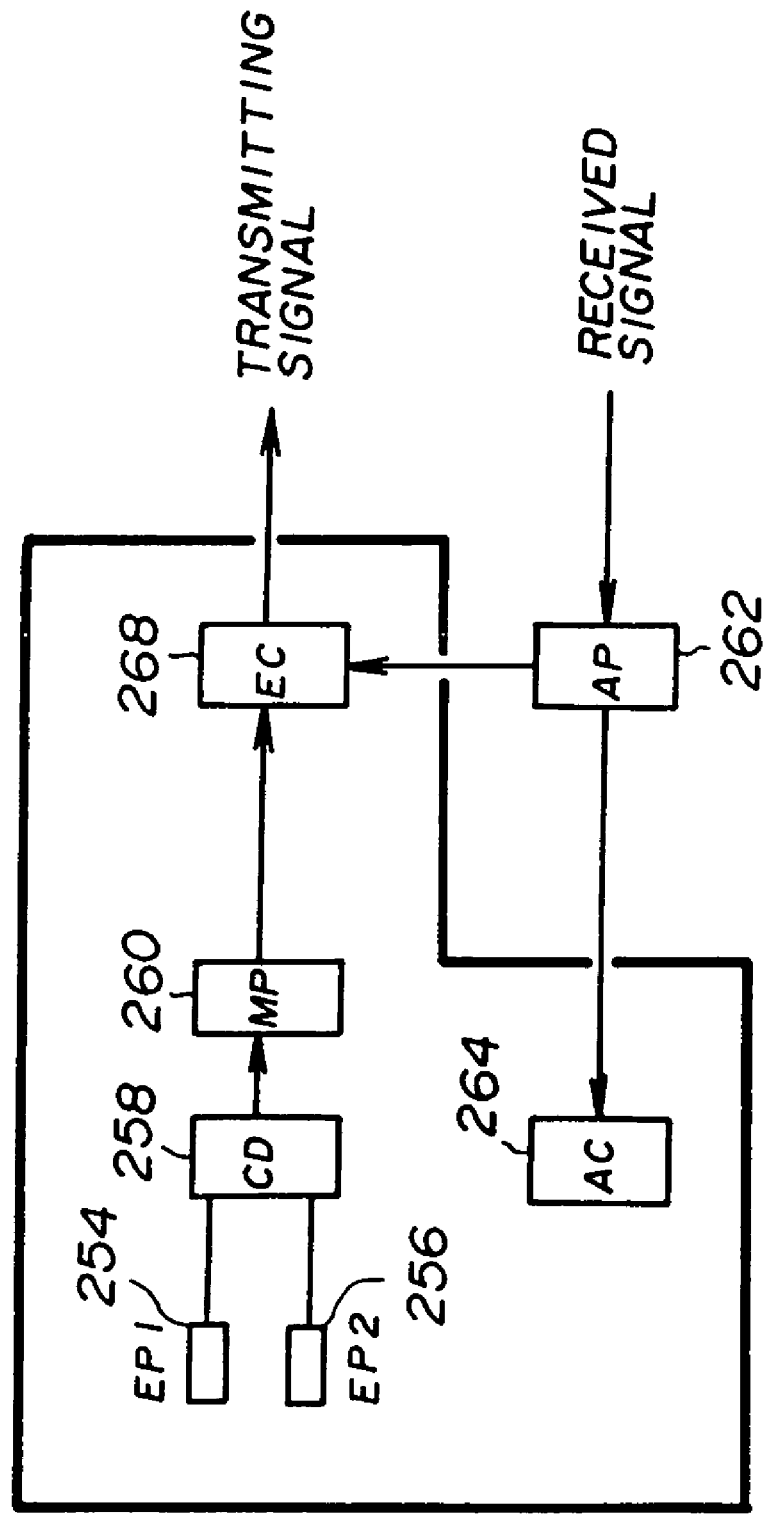
FIG. 54 is a block diagram of the bone conduction actuator shown in FIG. 53.

FIG. 54 is a block diagram of the actuator. In this embodiment, the amp (AP) 262 is not included in the actuator but is included in another unit such as the amp unit. The operation will be described with reference to FIG. 54. When the user speaks by the device with a vibrator 266 of an actuator (AC) 264 being in contact with the body such as the wrist or the finger by inserting the fingertip into the ear canal, the vibration of the vibrator caused by the user's utterance changes the capacity between the electrodes slightly. The capacity change is detected by the capacity detector (CD) 258 and is amplified by the microphone amp (MP) 260. Thus, the user's utterance is detected. The spacing between the electrodes also changes by received voice vibrations of the bone conduction actuator, and the change level is far larger than the change level by the user's transmitting voice. Therefore, an echo canceling part (EC) 268 which removes the received voice signal needs to be provided as shown in FIG. 54 in order to extract only the user's utterance from the vibration. Regarding the method for configuring the bone conduction microphone, a capacitor microphone method is used in this embodiment. However, a dynamic microphone method which uses a coil can be used.

Figure 55:
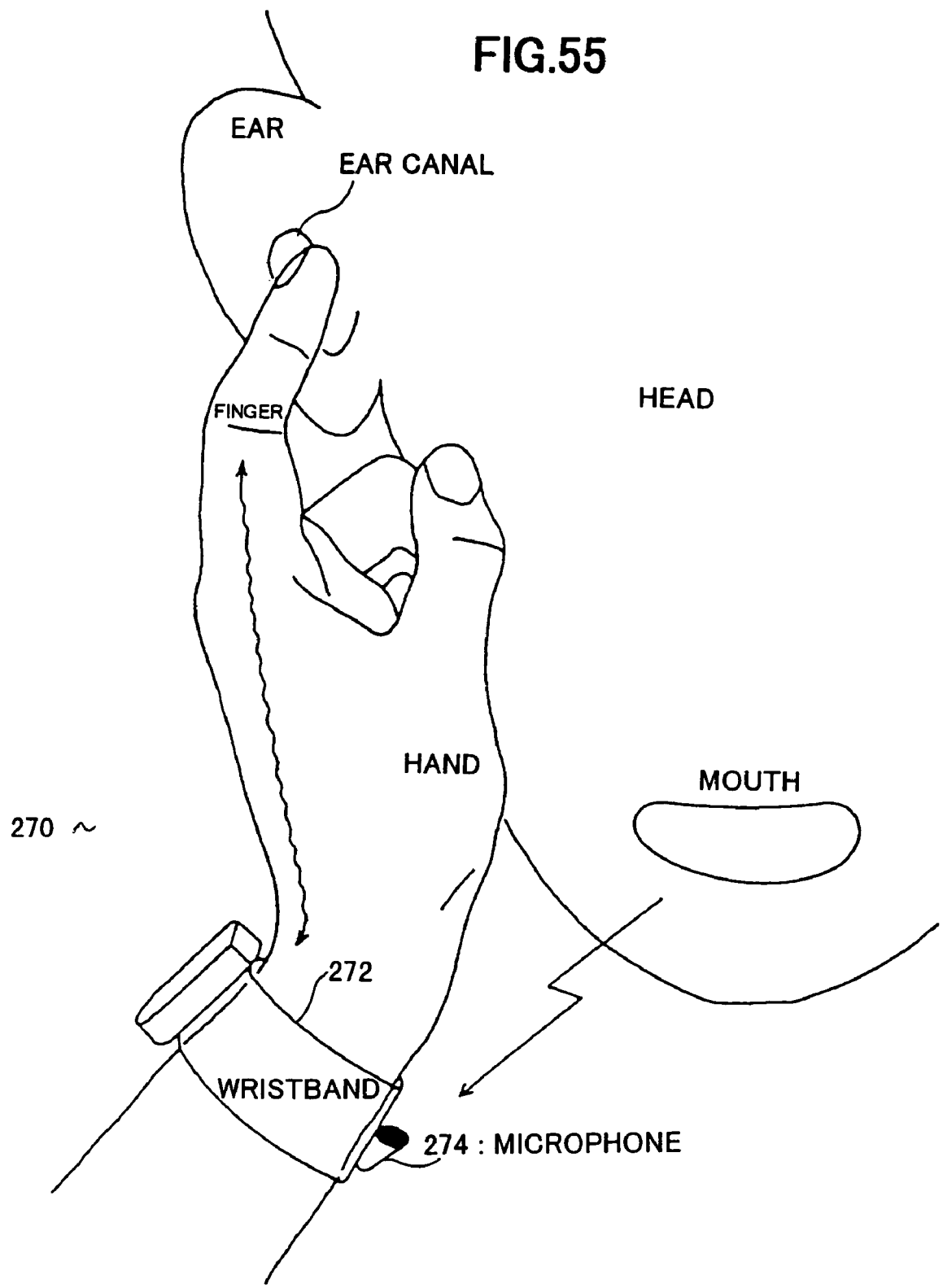
FIG. 55 is a schematic perspective diagram showing a wearable communication device according to a tenth embodiment of the present invention.

FIG. 55 is a schematic perspective diagram showing a wearable transmit/receive device 270 according to a tenth embodiment of the present invention. As shown in FIG. 55, the wearable transmit/receive device 270 is mounted on the user's wrist by a wristband 272 on which a microphone 274 is attached. The location of the microphone 274 is inside of the wrist.

Figure 56:
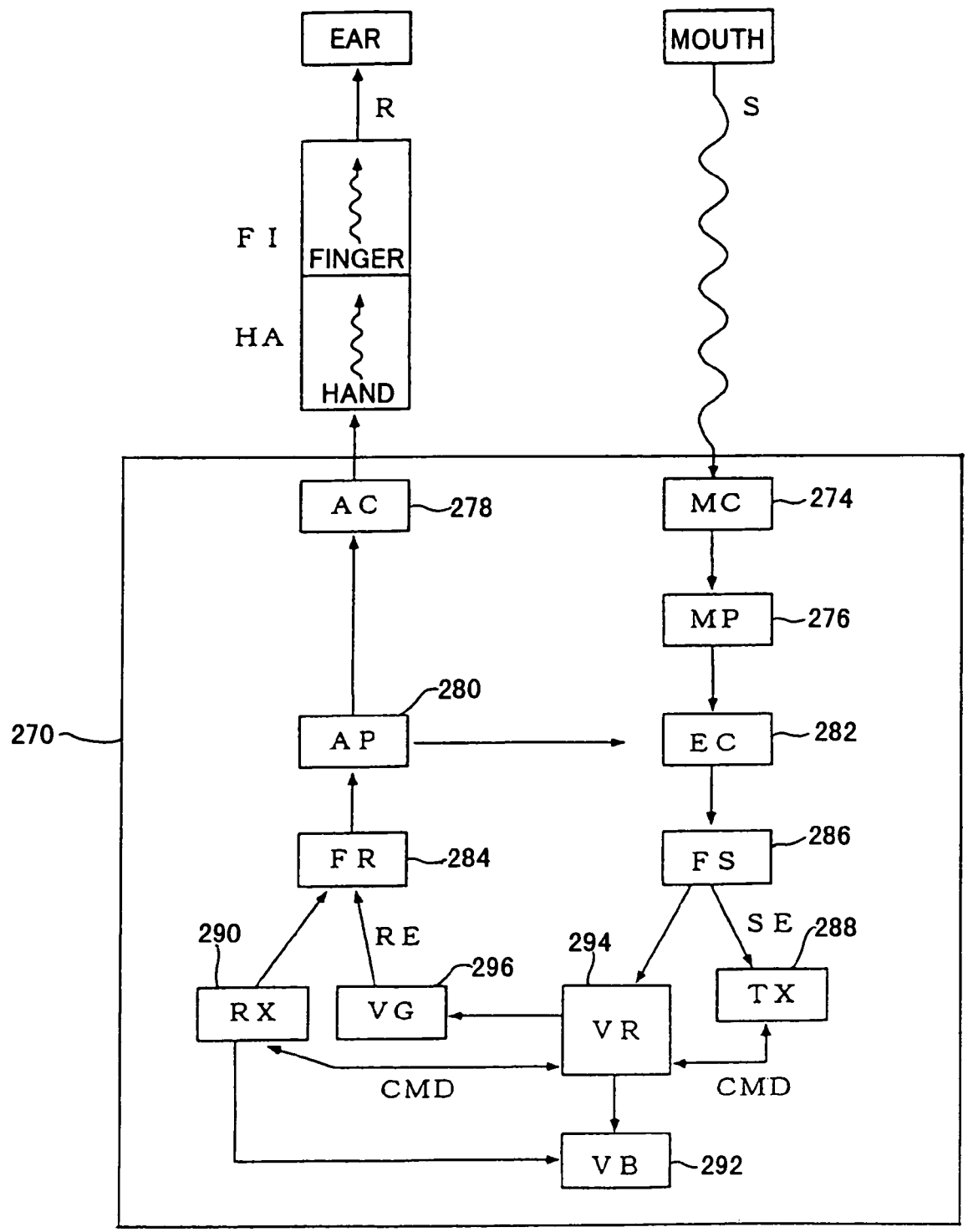
FIG. 56 is a block diagram showing the wearable communication device according to the tenth embodiment of the present invention.

FIG. 56 is a block diagram showing the wearable transmit/receive device 270 according to the tenth embodiment of the present invention. As shown in FIG. 56, the wearable transmit/receive device 270 includes a microphone amp (MP) 276, an actuator (AC) 278, an actuator amp (AP) 280, an echo canceling part (EC) 282, a received voice filter (FR) 284, a transmitting voice filter (FS) 286, a transmitter (TX) 288, a receiver (RX) 290, a vibrator (VB) 292, a voice recognition unit (VR) 294 and a voice generator (VG) 296. A battery which is not shown in the figure is included. The operation will be described below.

When the user use the wearable transmit/receive device 270, the user inserts one of the fingers of the user's arm on which the device 270 is mounted into the ear canal, and, then, speaks.

The user's utterance (S) is input into the microphone (MC) 274 and is amplified by the microphone amp (MP) 276. When the user inserts the fingertip of the finger into the ear canal, the mouth and the microphone 274 on the side of the wristband 272 become close naturally so that the microphone can pick up the user's utterance well.

The received voice signal (RE) output from the receiver (RX) 290 is amplified by the actuator amp (AP) 280 after correction of the change of the characteristics caused by the transmission through the back of the hand and the finger by the receiving filter (FR) 284. Then, the signal (RE) vibrates the actuator (AC) 278. The vibration (the received voice (R)) of the actuator (AC) 278 is transmitted to the ear through the back of the hand and the finger.

Even though both the transmitting voice (S) and the received voice (R) are input into the microphone (MC) 274 at the same time, the echo canceling part (EC) 282, into which the received voice signal (RE) is input as a reference input, separates the transmitting voice signal (SE) from the received voice signal (RE).

The transmitting voice signal (SE), which is separated from the received voice signal (RE) by the echo canceling part (EC) 282, is transmitted by the transmitter (TX) 288 after correction of the frequency characteristics by the transmitting filter (FS) 286.

Usually, the characteristics of the receiving voice signal filter (FR) 284 and the transmitting voice signal filter (FS) 286 are configured beforehand, but it is possible to configure them so as to adapt to various users by a calibration.

According to this embodiment, as described precisely later, a command can be entered by the user's voice. A command voice gathered by the microphone 274, as is the case with the conversation voice, is interpreted as a command by the voice recognition unit (VR) 294. Examples of the voice commands are on-hook/off-hook, abbreviated dialing, dialing, loudness control and the like.

When the wearable transmit/receive device 270 gets an incoming call, the user is notified of the incoming call by the vibration of the vibrator (VB) 292. Then, the user enters an incoming call command so as to connect the call line. Next, the user start speaking into the device by inserting the fingertip of the finger of the arm on which the wearable transmit/receive device 270 is mounted into the ear canal.

After the voice command is entered, the user gets the feedback of the status of the device 270 by a voice or a sound. In addition to the advantages described before, the wearable transmit/receive device in this embodiment has an advantage in that the user can operate the wearable transmit/receive device without pushing any buttons in various situations in daily life since the user can enter various commands such as on-hook/off-hook commands and dialing commands by the user's voice and can utilize the voice feedback while inserting the finger into the ear canal. Thus, the operability is not impaired even when the device becomes very small.

Figure 57:
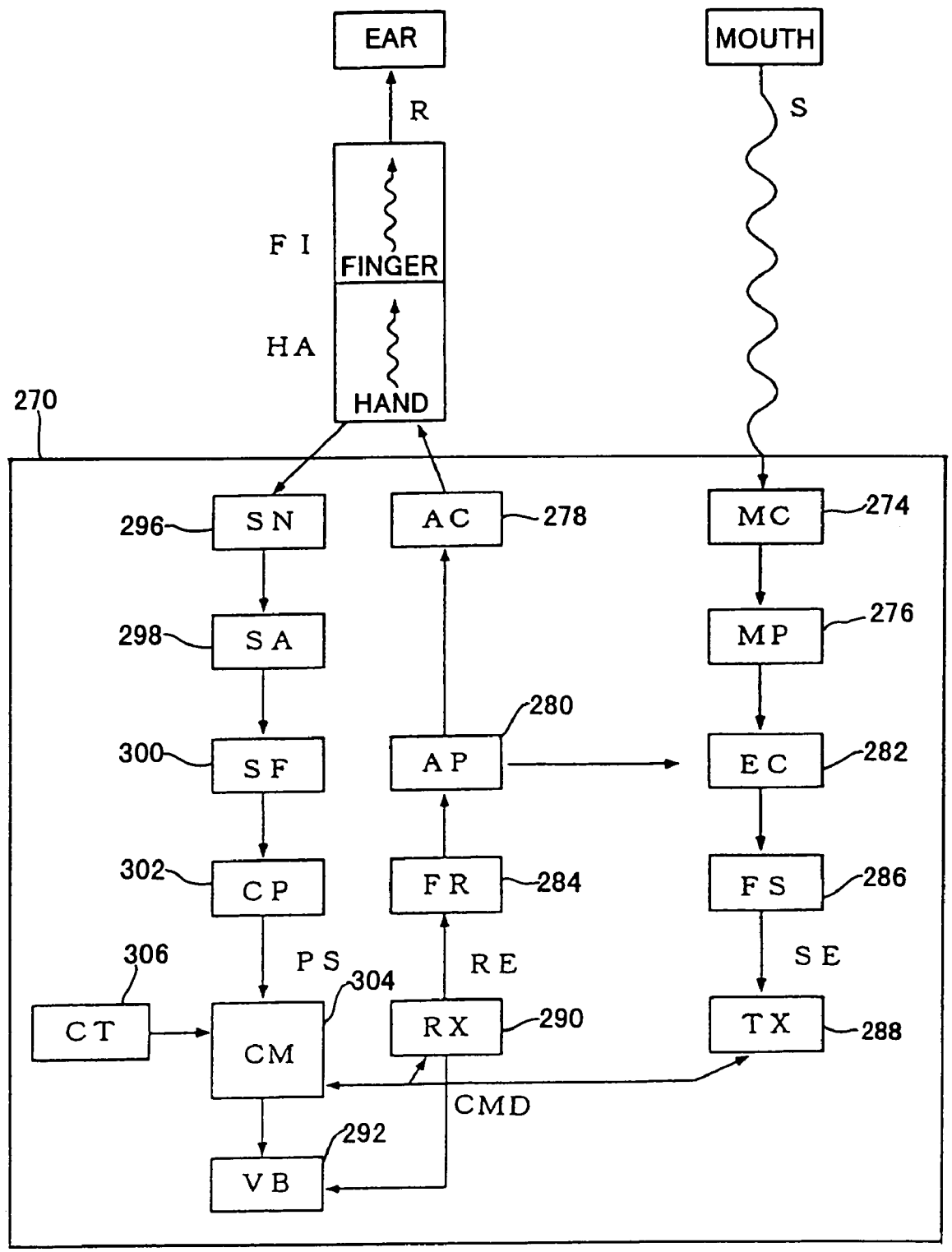
FIG. 57 is a block diagram showing another example of the wearable communication device according to the tenth embodiment of the present invention.

Further, the above embodiment can be configured such that the user can enter commands by small movements of the user's fingers. FIG. 57 is a block diagram showing the wearable transmit/receive device in this case.

As shown in FIG. 57, the wearable transmit/receive device includes the microphone amp (MP) 276, the actuator (AC) 278, the actuator amp (AP) 280, the echo canceling part (EC) 282, the receiving filter (FR) 284, the transmitting voice filter (FS) 286, the transmitter (TX) 288, the receiver (RX) 290, the vibrator (VB) 292, an acceleration or shock sensor (SN) 296, a sensor amp (SA) 298, a sensor filter (SF) 300, a comparator (CP) 302, a command table (CT) 306 and a command execution unit (CM) 304. Also, a battery for supplying power which is not shown FIG. 56 is provided. The operation is as follows.

When the user taps one of the fingertips of the arm on which the wearable transmit/receiver device 270 is mounted on any object such as a desk or the user's knee, or when the user taps the fingertips mutually, a shock according to the tap is transmitted to the acceleration sensor (SN) 296 through the finger and the hand. The shock is amplified by the sensor amp (SA) 298. After that, only characteristic frequency components which are generated by the tap of the finger are extracted from the shock signal by the sensor filter (SF) 300. The frequencies are, for example, from 80 Hz to 100 Hz.

The output of the sensor filter (SF) 300 is processed by the comparator (CP) 302 with a threshold. Then, a pulse sequence (PS) is generated according to the tap of the finger. The pulse sequence (PS) is transmitted to the command execution unit (CM) 304 which determines an execution command (CMD) by comparing the pulse sequence (PS) with the command table (CT) 306.

Examples of the execution commands are on-hook/off-hook, abbreviation dialing, dialing, loudness control and so on. Further, the tap of the fingertip is performed not only on objects but also on another fingertip.

Regarding the command entry method by tapping, the Japanese Laid-Open Patent No. 10-200610, "Full-Time Wearable Telephone" can be referred to. The precise description on generating the command will be given later.

When the wearable transmit/receive device 270 receives an incoming call, the user is notified of the incoming call by the vibration of the vibrator (VB) 292. Then, the user enters an incoming call command so as to connect the line. Next, the user starts speaking by inserting the fingertip of the finger of the arm on which the wearable transmit/receive device 270 is mounted into the ear canal.

The user's utterance (S) is input into the microphone (MC) 274 and is amplified by the microphone amp (MP) 276. The received voice signal (RE) output from the receiver (RX) 290 is amplified by the actuator amp (AP) 280 after the correction of the change of the frequency characteristics caused by the transmission through the back of the hand and the finger by the receiving filter (FR) 284. Then, the signal (RE) vibrates the actuator (AC) 278. The vibration (the received voice (R)) of the actuator (AC) 278 is transmitted to the ear through the back of the hand and the finger.

In addition to the advantages described before, the wearable transmit/receive device in this embodiment has an advantage in that the user can operate the wearable transmit/receive device without pushing any buttons in various situations including while walking since the user can enter various commands such as on-hook/off-hook commands and dialing commands by tapping the finger on a object or tapping fingers.

Although the wearable transmit/receive device has these advantages, in the above-mentioned configuration, an undesigned command input may possibly occur due to a vibration generated by bending or twisting of the wrist. The improper input from the joint of the wrist can be prevented by increasing the threshold for detecting the tapping input. However, in this case, a weak tapping may not be detected. In the following, a wearable command input device which solves these problems will be described.

Figure 58:
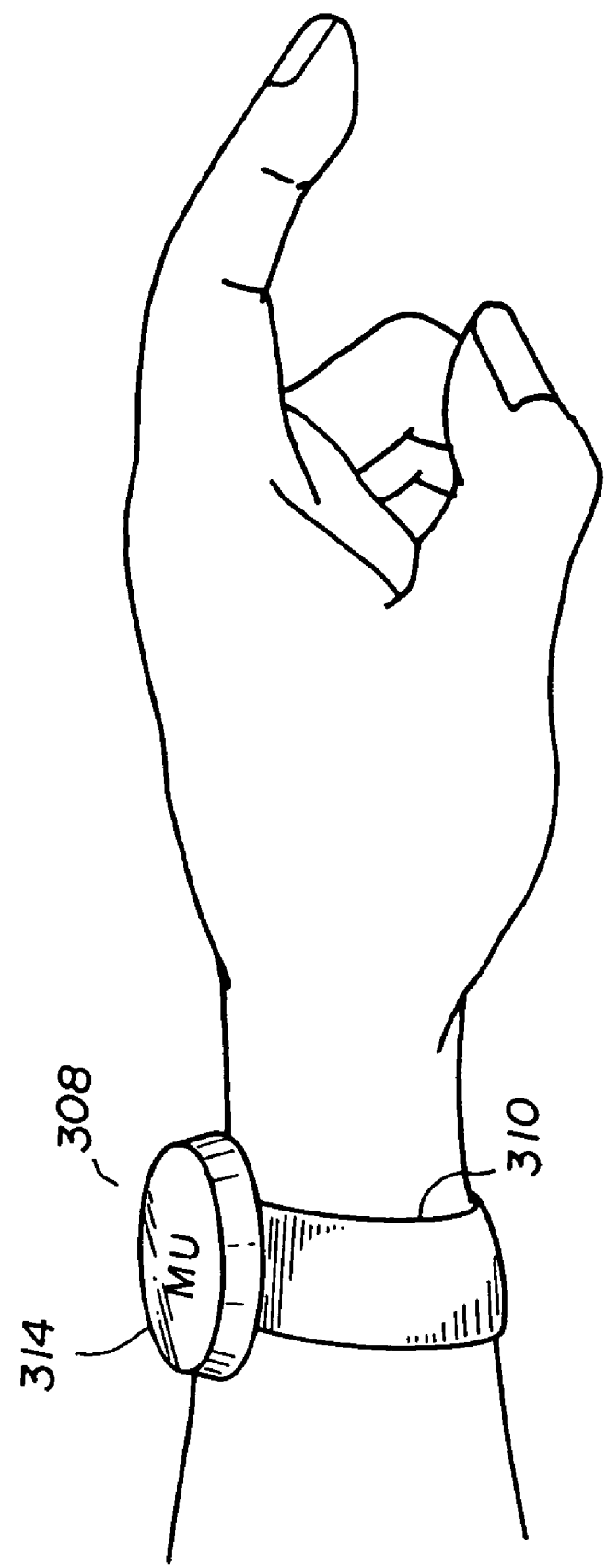
FIG. 58 is a schematic perspective diagram showing a wearable command input device according to an eleventh embodiment of the present invention.

FIG. 58 is a schematic perspective diagram showing the wearable command input device 308 as a eleventh embodiment of the present invention. This wearable command input device 308 has the above-mentioned command input mechanism by the finger tap. Here, the mechanism is described more precisely. In addition, a mechanism for preventing the undesigned input by bending or twisting of the wrist will be described.

As shown in FIG. 58, a main unit (MU) 314 of the wearable command input device 308 is mounted on the user's wrist by a wristband (BA) 310. Also, one or more vibration generators (NM) are provided in the inside of the wristband 310.

FIG. 59 shows the inside of the main unit (MU) 314 of the wearable command input device 308. FIG. 59(a) is a horizontal sectional view, and (b) and (c) are vertical sectional views. As shown in FIG. 59(a)-(c), a sensor unit (SS) 312 is provided under the main unit (MU) 314. A shock sensor (SN) 316 is provided under the sensor unit (SS) 312 and is in contact with the surface of the user's body so as to detect vibrations of it. The sensor unit (SS) 312 is separated from the main unit (MU) 314 by an insulator (IS) 318 which prevents an unnecessary vibration of the main unit (MU) 314 from being transmitted to the sensor unit (SS) 312. The surface of the sensor unit (SS) 312 is coated with a resin such that the metallic part of the sensor unit (SS) 312 does not directly contact the surface of the user's skin. As indicated in FIG. 59(b), the wristband 310 is connected to the main unit (MU) 314 and is separated from the sensor unit (SS) 312. As shown in (a), the sensor unit (SS) 312 and the peripheral part of the main unit (MU) 314 include the shock sensor (SN) 316, a sensor amp (SA) 320, a band-pass filter for detecting the finger tapping (BPF1) 322, a band-pass filter for detecting a wrist movement (BPF2) 324, a comparator (CMP) 326, a level-setting mechanism (CPL) 328 for the comparator, a trigger generator (TRG) 330, a code assembling device (CAM) 332, a code table (CTB) 334 and a timer 336. Also, a battery for supplying power is provided.

In this embodiment, the sensor amp (SA) 320 and so on are provided in the sensor unit (SS) 312, but these may be provided in the main unit (MU) 314.

Figure 60:
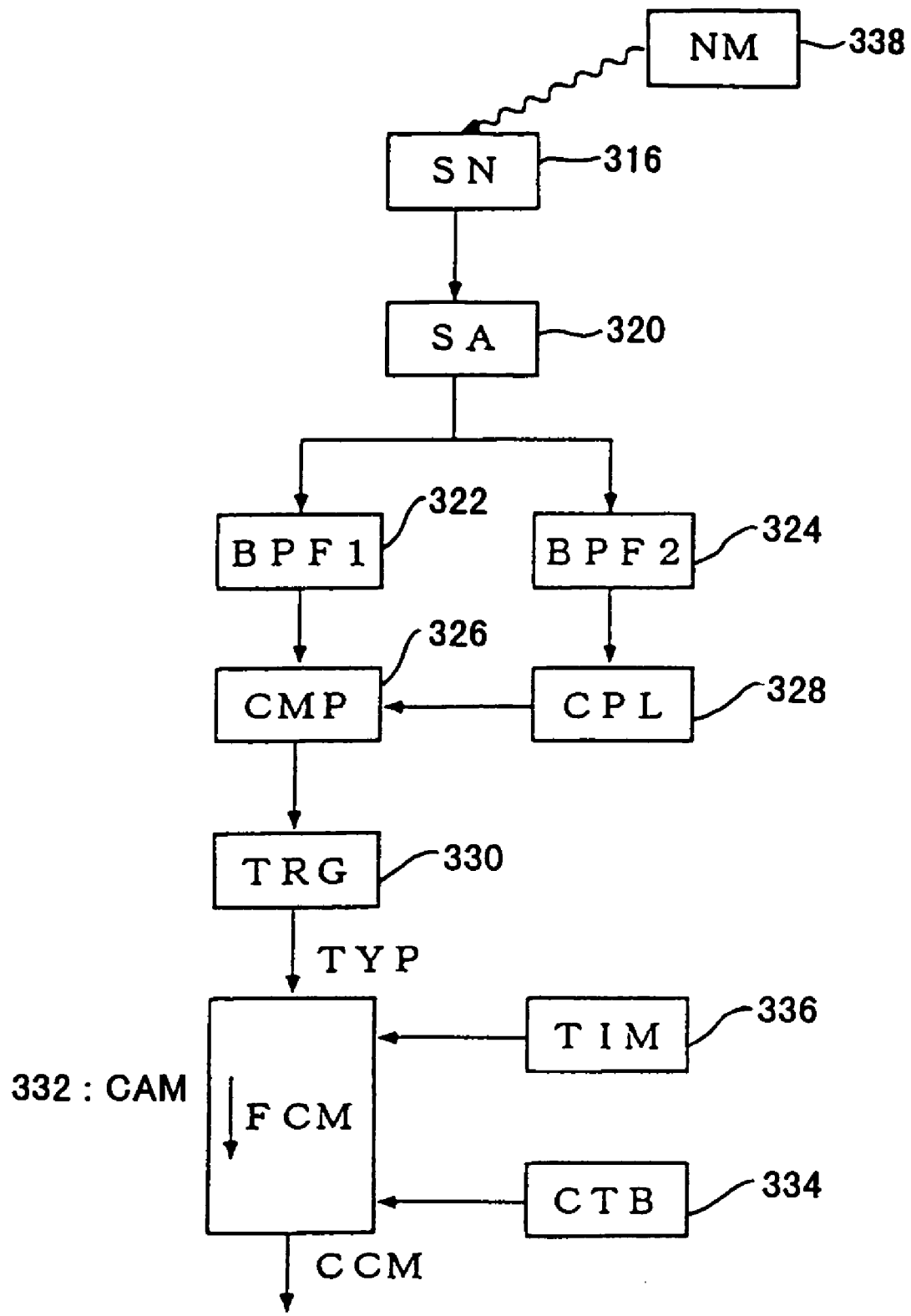
FIG. 60 is a block diagram showing the wearable command input device according to the eleventh embodiment of the present invention.

FIG. 60 shows a block diagram of the wearable command input device 308. The operation will be described with reference to FIG. 60 in the following. The user preferably operates the wearable command input device 308 while mounting it on the user's wrist. When the user taps the user's fingertip of any finger of the arm on which the main unit (MU) is mounted on a desk, the user's knee, another wrist and the thigh and so on, or taps the user's fingers with each other, the shock by tapping is transmitted to the shock sensor (SN) 316 through the finger and the hand. The tapping shock detected by the shock sensor (SN) 316 is amplified by the sensor amp (SA) 320. The amplified signal is input into the band-pass filter (BPF1) 322 for detecting the finger tap, and, then, only characteristic frequency components of the finger tap are output from the band-pass filter (BPF1) 322. The bandwidth which the band-pass filter (BPF1) 322 passes preferably is between 80 Hz and 100 Hz.

The output from the band-pass filter (BPF1) 322 is processed by the comparator (CMP) 326 using a threshold so that only the tap signal is extracted. The extracted tapping signal is converted into tapping timing information (TYP) by the trigger generator (TRG) 330. The tapping timing information (TYP) is sent to the code assembling device (CAM) 332 which interprets the tapping timing information (TYP) according to a timing clock supplied by the timer (TIM) 336 and determines a tapping command (FCM). The tapping command (FCM) is converted into a command (CCM) on the basis of the information in the code table (CTB) 334, and, then, is output. The vibration generator (NM) 338 will be described later.

According to this embodiment, because the user can tap with any finger of the arm which has the wearable command input device 308, the user can input commands more quickly as compared to inputting commands with one finger.

In the above-mentioned configuration shown in FIG. 59 and FIG. 60, interference between the finger tapping and other finger movements can be avoided by the band-pass filter (BPF1) 322 so that only the tapping of the fingertip can be detected.

The wearable command input device described above, however, may possibly accept an undesigned input when the wrist with the main unit (MU) is bent or twisted. That is because the vibration arising from the joint of the wrist includes frequencies between 80 Hz and 100 Hz, which frequencies are the passing bandwidth of the band-pass filter (BPF1) 322. The undesigned input can be suppressed by increasing the threshold of the comparator (CMP) 326. But, in this case, a weak tapping of the fingertip may not be detected.

The vibration generator (NM) 338 is provided to solve this problem. The vibration generator (NM) 338 is provided in the inside of the wristband 310 so as to be in contact with the surface of the skin. When the wrist is bent or twisted, the surface of the skin is crinkled such that the vibration generator generates vibrations (or sound) of specific frequencies by being rubbed against the crinkled skin. Hereinafter, the vibration of the specific frequencies will be refereed to as a wrist vibration.

FIGS. 61(a) and (b) shows the configuration of the vibration generator. The example shown in (a) has a thin plastic plate stuck on the surface of the sensor unit (SS) 312. The plastic plate 340 generates vibrations by rubbing against the surface of the skin, which vibrations have frequencies which are different from those of the finger tapping, so as to detect the wrist movement easily.

The example shown in (b) includes small pieces 342, 344 of sponge, felt and the like on the inside of the wristband 310 for the pieces to be in contact with the surface of the wrist. As an alternative, the inside of the wristband 310 may be formed of these materials. The pieces rub against the surface of the skin to generate the vibrations.

As mentioned above, the frequencies generated by rubbing of those objects are different from the bandwidth generated by the finger tapping. In this embodiment, a vibration generator which generates vibrations of frequencies between 1000 Hz and 2000 Hz is used.

Figure 62:
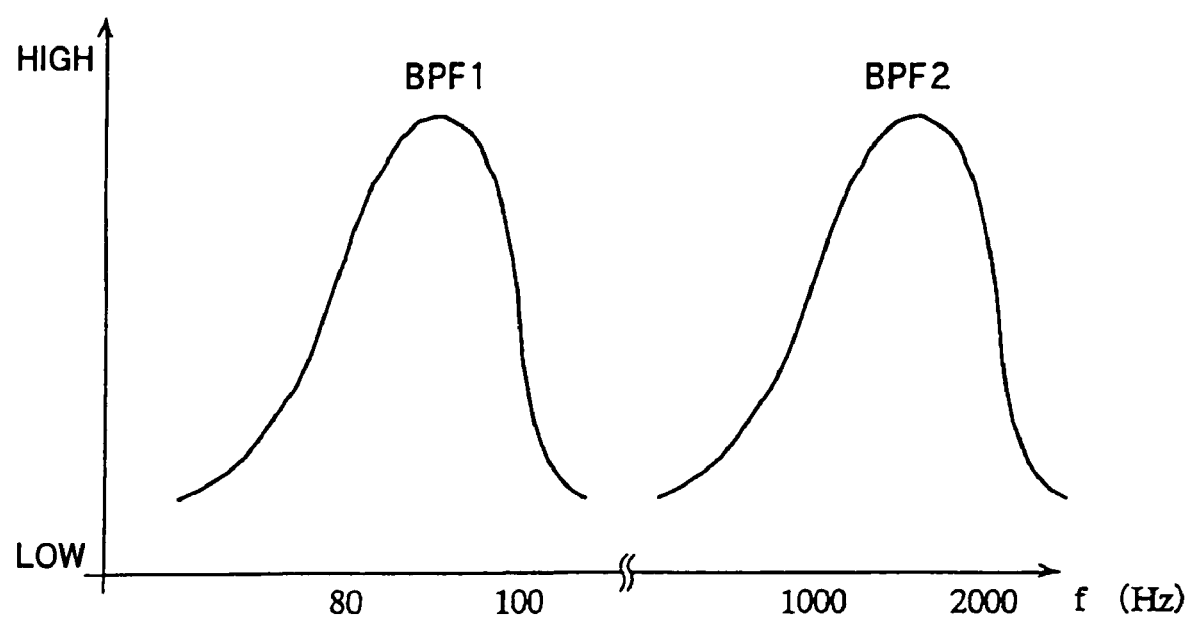
FIG. 62 is a graph showing a spectrum of a band-pass filter for detecting a finger tap and a spectrum of a band-pass filter for detecting a wrist movement according to the eleventh embodiment of the present invention.

FIG. 62 shows an example of the passing bandwidths of the band-pass filter (BPF1) 322 for detecting the finger tapping and the band-pass filter (BPF2) 324 for detecting wrist movements, both of which filters are used in this embodiment.

In this embodiment, the vibration generator generates wrist vibrations by being rubbed against the skin. But, the method for generating vibrations is not limited to this. For example, a plurality of vibration generators rubbing against each other can generate the wrist vibrations.

Thus, the wrist vibrations generated by the vibration generator (NM) 338 are, similar to the tapping vibrations, as shown in FIG. 60, detected by the shock sensor (SN) 316 and amplified by the sensor amp (SA) 320, and, then, are separated from other vibrations. The level-setting mechanism (CPL) 328 for the comparator controls the threshold of the comparator (CMP) 326.

To be more specific, if the wrist vibrations are large, the threshold is set to be a large value, and, if the wrist vibrations do not exist or are very small, the threshold is set to be a small value. Thus, the undesigned input caused by the unnecessary signal components at 80 Hz-100 Hz generated by bending or twisting the wrist is suppressed even if the wrist vibration is large. Further, when the wrist vibration does not exist or is very small, even small finger tapping can be detected stably.

The suppression of the undesigned input by the wrist movement can be achieved by other methods such as, for example, a method using delay and dead time instead of the above-mentioned method.

Thus, according to this embodiment, the detection of the wrist movement can be easily achieved without providing a new sensor for detecting the wrist movements.

The problems in the tenth embodiment can be solved by the configuration of this eleventh embodiment.

Here, the method for assembling the tapping timing information (TYP) into the tapping command (FCM) will be described as a precise description of the command generation by tapping in the following with reference to FIG. 63 which shows the method performed in the code assembling device (CAM) 332 in FIG. 60.

Figure 63:
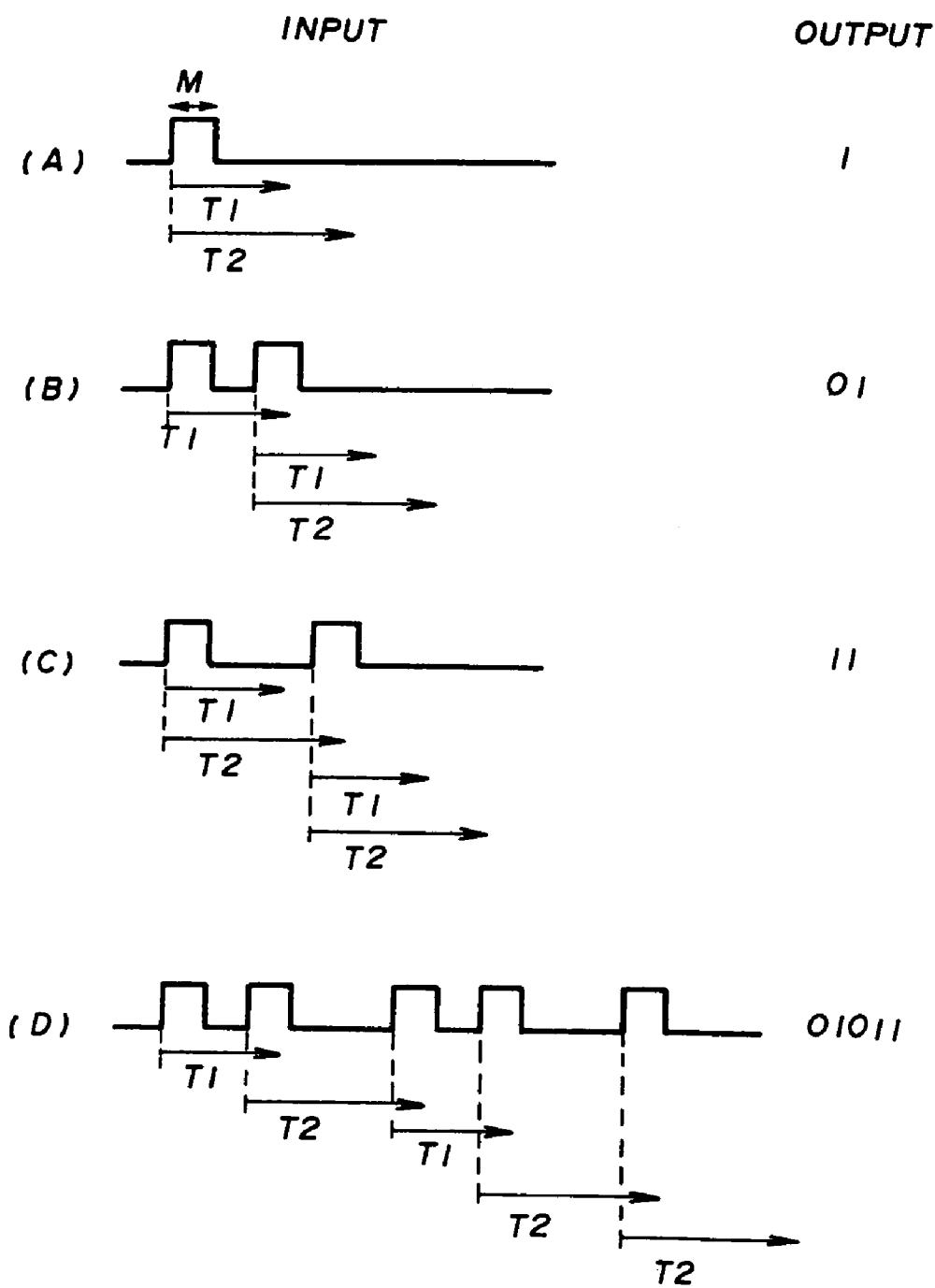
FIG. 63 is a diagram showing a method for generating a command by a series of triggers according to the eleventh embodiment of the present invention.

As shown in FIG. 63, the tapping timing signal (TYP) is generated once according to one tapping in which the width of the pulse (M) is constant. T1 and T2 are time constants for the recognition.

The tapping is performed by one or more fingers of a hand. Once a pulse arises by a tap, if another pulse arises within the period of time T1 from a reference time that is the time of the rising edge of the first pulse, it is regarded as "0", and, the device 332 waits for a next pulse while returning the reference time to 0, and, then, if a next pulse arises within the period of time T2 from the reference time, it is regarded as "1", then, the device 332 waits for a next pulse while returning the reference time to 0. If a next pulse does not arise within the period of time T2, the interpretation of the pulse sequence is stopped.

Therefore, the series of tapping timing signals shown in FIG. 63(A)-(D) are converted into "1", "0, 1", "1, 1" and "0, 1, 0, 1, 1" respectively.

Thus, according to the above-mentioned method shown in FIG. 63, a train of pulses which include "0" and "1" is generated by using intervals between pulses like the Morse code.

The last code is "1" at all times in the method shown in FIG. 63, which is different from the Morse code.

In the embodiment shown in FIG. 63, a more complex command can be generated using tap intensity in which the tap intensity is detected in a portion of the signal amplified by the sensor amp (SA) and different pulse widths are provided according to the intensity.

The generated tapping command (FCM) is converted into the command (CCM) on the basis of information within the code table (CTB) and output.

FIG. 64 shows an example of tapping commands (FCM) and commands (CCM) corresponding to the tapping commands (FCM).

The tapping command (FCM) requires a length to some extent so that undesigned operation of the wearable command input device which is caused by movements of surrounding noise, chewing, a normal conversation and so on can be prevented. However, short tapping commands (FCM) can be used so as to improve operability for commands such as a dialing command in which the using situation is specific.

Figure 65:
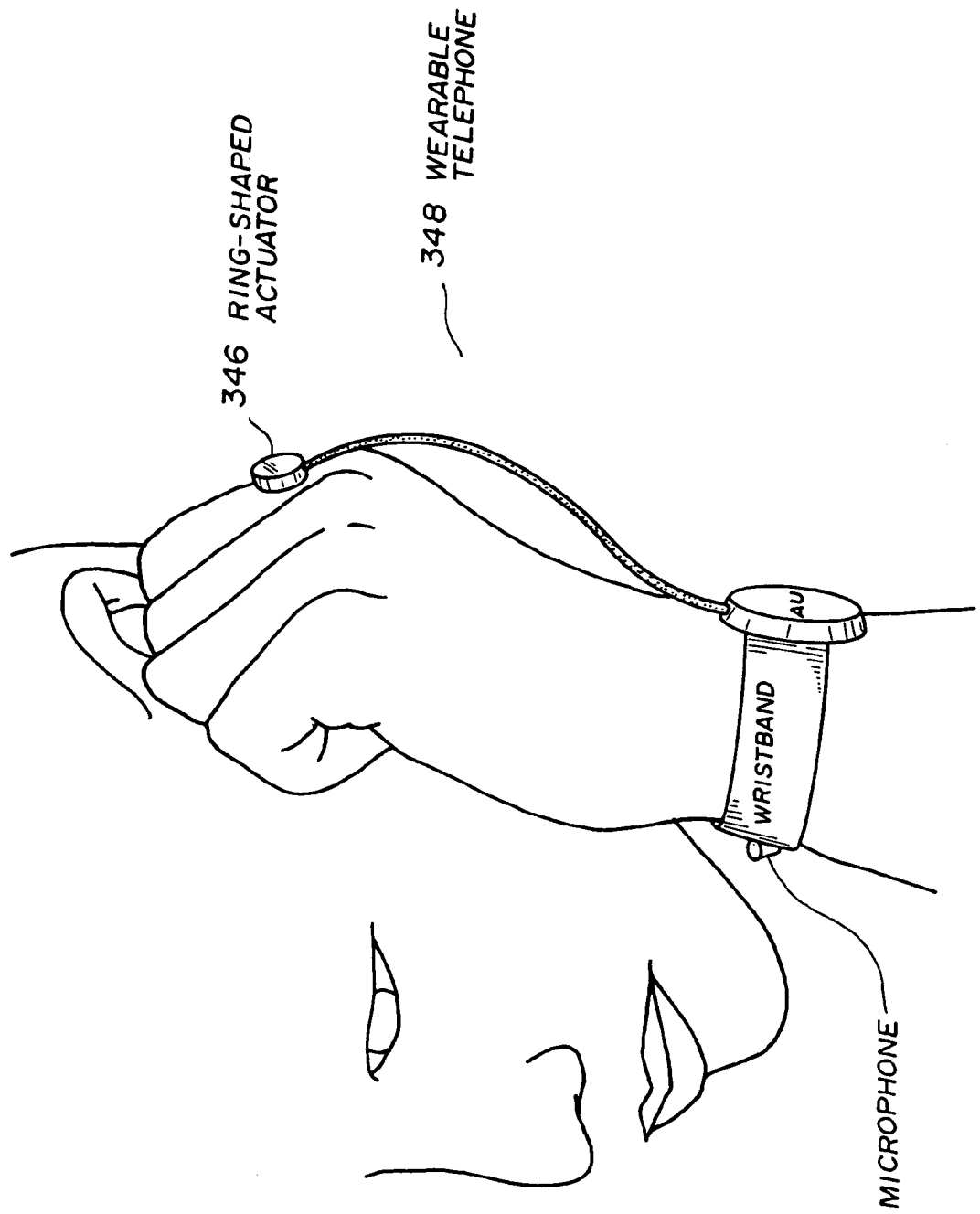
FIG. 65 is a schematic perspective diagram showing a wearable telephone according to a twelfth embodiment of the present invention.

The above-mentioned wearable command input device and vibration generator are applicable to the wearable transmit/receive device such as shown in FIG. 55. FIG. 65 shows an example of such a device as a twelfth embodiment. This is a wearable telephone device in which the above-mentioned command input mechanism is combined with a wearable transmit/receive device which has the ring-shaped actuator.

Figure 66:
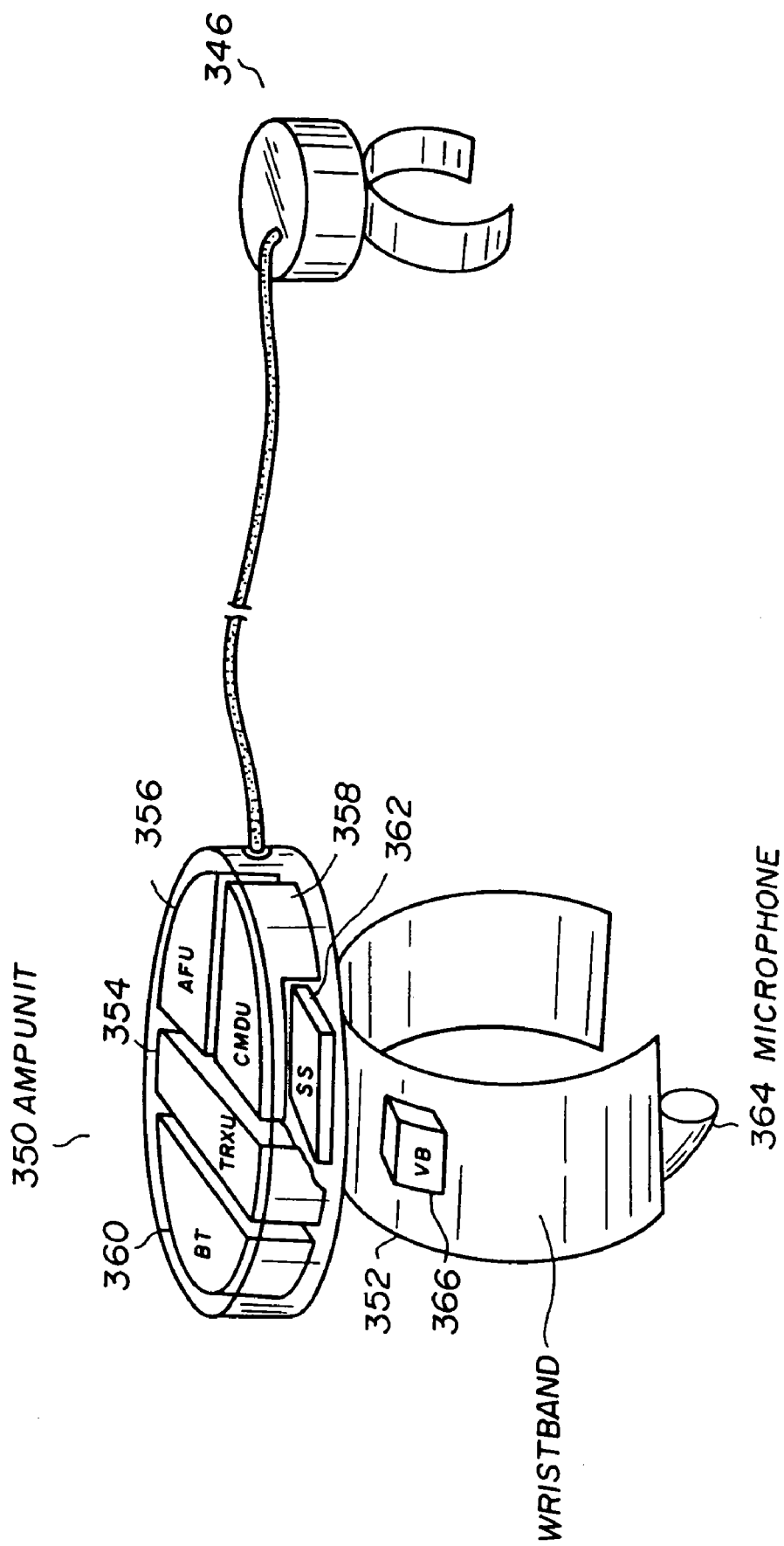
FIG. 66 is a perspective diagram showing the wearable telephone according to the twelfth embodiment of the present invention.

FIG. 66 shows the inside configuration of the wearable telephone 348. As shown in FIG. 66, the wearable telephone 348 includes a ring-shaped actuator 346, an amp unit 350 and a wristband 352. The ring-shaped actuator 346 and the wristband 352 are the same as those described before, for example, with reference to FIG. 45. The amp unit 350 includes a wireless telephone device (TRXU) 354, a voice unit (AFU) 356, a command unit (CMDU) 358 and a battery (BT) 360. The wireless telephone device (TRXU) 354 establishes a connection to a line and transmits/receives voice signals. The voice unit (AFU) 356 has functions such as for amplifying voice signals for the bone conduction and includes the microphone amp (MP), the actuator amp (AP), the echo canceling part (EC), the receiving voice filter (FR) and the transmitting voice filter (FS) which are described before. The command unit (CMDU) 358 has a command input mechanism by a finger tap or a voice and includes the main unit (MU), the shock sensor (SN), the sensor amp (SA), the band-pass filter (BPFL) for detecting the finger tapping, the band-pass filter (BPF2) for detecting the wrist movement, the comparator (CMP), the level-setting mechanism (CPL), the trigger generator (TRG), the code assembling device (CAM), the code table (CTB) and the timer (TIM) which have been described in FIG. 59. Also, the sensor (SS) 362 is provided in a location in which it contacts the surface of the wrist. The wristband 352 has a microphone 364 and a vibrator (VB) 366.

Figure 67:
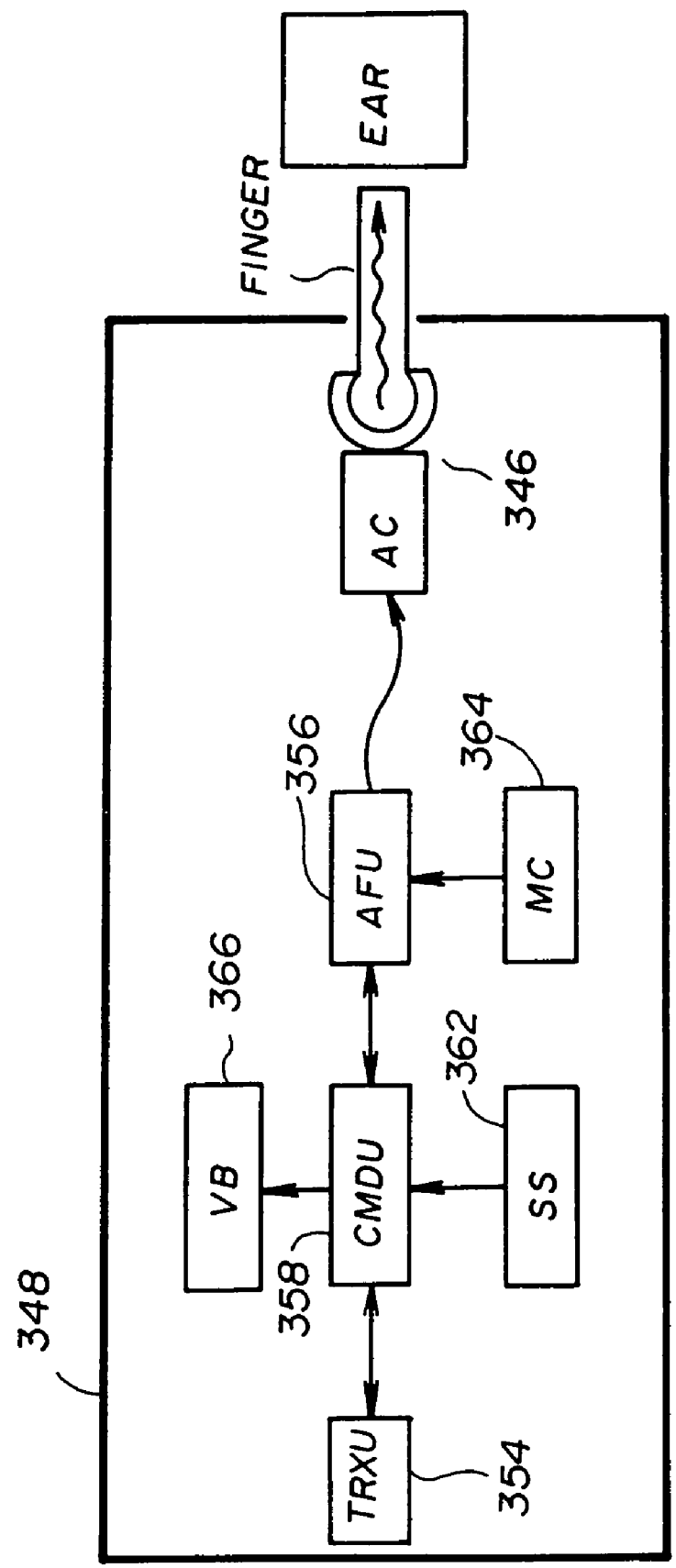
FIG. 67 is a block diagram showing the wearable telephone according to the twelfth embodiment of the present invention.

FIG. 67 shows a block diagram of the wearable telephone 348. The operation will be described with reference to FIG. 67 in the following.

When the wireless telephone device (TRXU) receives an incoming call, the vibrator (VB) 366 vibrates so as to notifies the user of the call. Then, the user may input an incoming call command by the finger tap when inserting the fingertip into the ear canal, or the user may insert the fingertip into the ear canal before the user inputs the incoming call command by the user's voice. In the case of the finger tap, the sensor unit (SS) 362 transmits the vibration of the command to the command unit (CMDU) 358 which interprets the vibration as the incoming call command. Then, the user starts speaking through the wireless telephone device (TRXU) 354 by utilizing the voice unit (AFU) 356, the microphone 364 and the actuator (AC) 346 as mentioned before. At the end of the telephone conversation, the user inputs a disconnecting command by the finger tap so that the wireless telephone device disconnects the line when the command unit (CMDU) interprets the finger tap as the disconnecting command. Also, a voice command can be used here.

Next, the operation at the time of making a call will be described. The user may input a command for making a call by the finger tap when inserting the fingertip into the ear canal, or the user may insert the fingertip into the ear canal, and then input the command by the user's voice. The command unit (CMDU) 358 interprets the vibration or the voice as the command. Then, the user starts speaking through the wireless telephone device (TRXU) 354. At the end of the telephone conversation, the user inputs a disconnecting command by the finger tap so that the wireless telephone device disconnects the line when the command unit (CMDU) interprets the finger tap as the disconnecting command. Also, a voice command can be used here.

Figure 68:
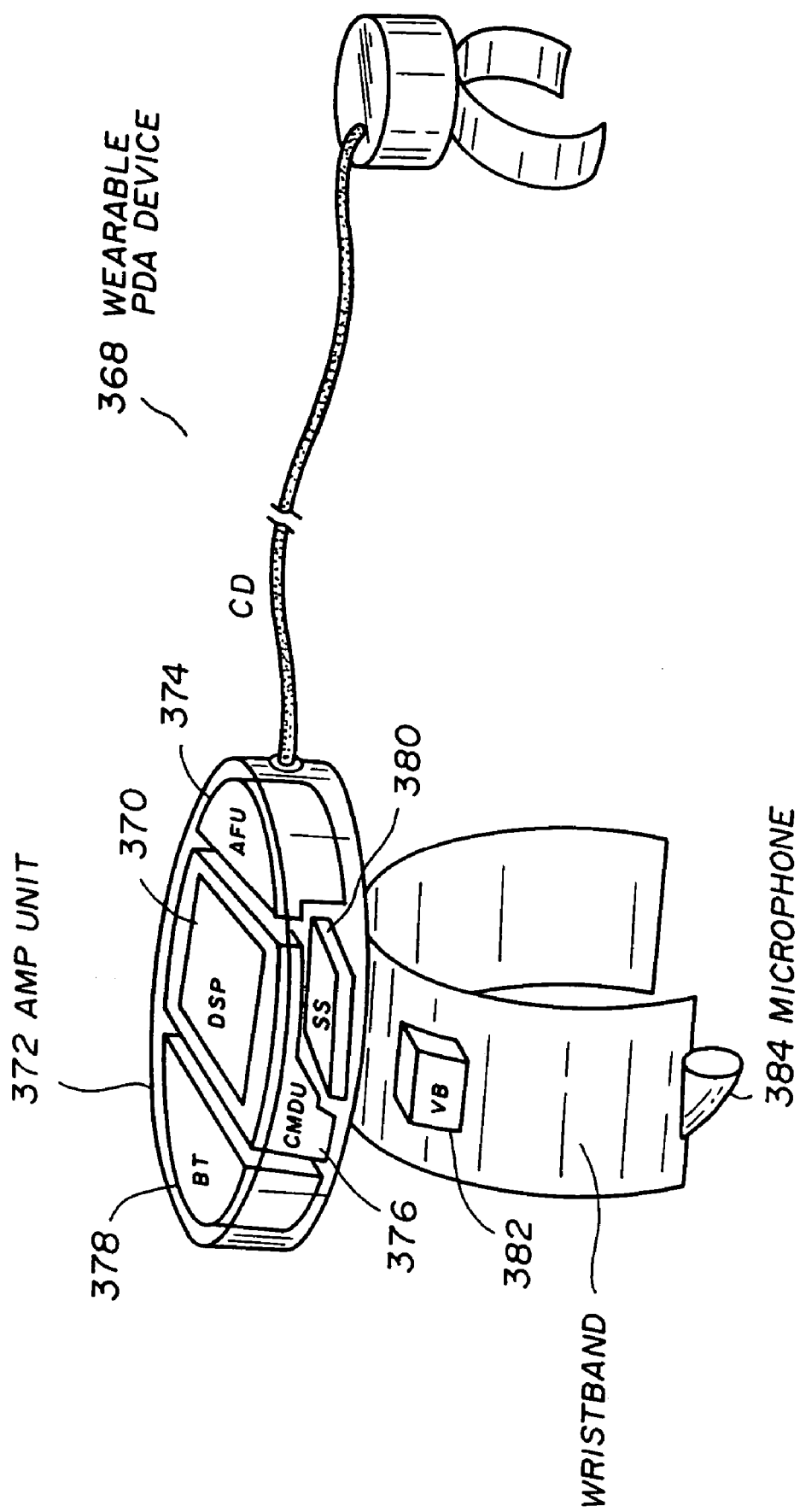
FIG. 68 is a schematic perspective diagram showing a wearable PDA device according to a thirteenth embodiment of the present invention.

FIG. 68 shows a wearable PDA (Personal Digital Assistant) device 368 according to a thirteenth embodiment of the present invention. The method of use of the wearable PDA device 368 is the same as shown in FIG. 65. The wearable PDA device 368 includes a display (DSP) 370 and a PDA device (not shown in the figure), and is operable by the voice command and the finger tap command.

As shown in FIG. 68, components except for the amp unit 372 are similar to those shown in FIG. 62. The amp unit 372 includes a voice unit (AFU) 374, a command unit (CMDU) 376 and a battery (BT) 378. The voice unit (AFU) 374 has functions such as for amplifying voice signals for the bone conduction and includes the microphone amp (MP), the actuator amp (AP), the echo canceling part (EC), the receiving voice filter (FR) and the transmitting voice filter (FS) which are described before with reference to FIG. 45 for example. The command unit (CMDU) 376 has a command input mechanism by a finger tap or a voice and includes the main unit (MU), the shock sensor (SN), the sensor amp (SA), the band-pass filter (BPF1) for detecting the finger tapping, the band-pass filter (BPF2) for detecting the wrist movement, the comparator (CMP), the level-setting mechanism (CPL), the trigger generator (TRG), the code assembling device (CAM), the code table (CTB) and the timer (TIM) which have been described in FIG. 59. Also, the sensor (SS) 380 is provided in a location in which it contacts the surface of the wrist. Further, the display (DSP) 370 for displaying, for example, texts and a device for PDA are provided in the amp unit 372.

Figure 69:
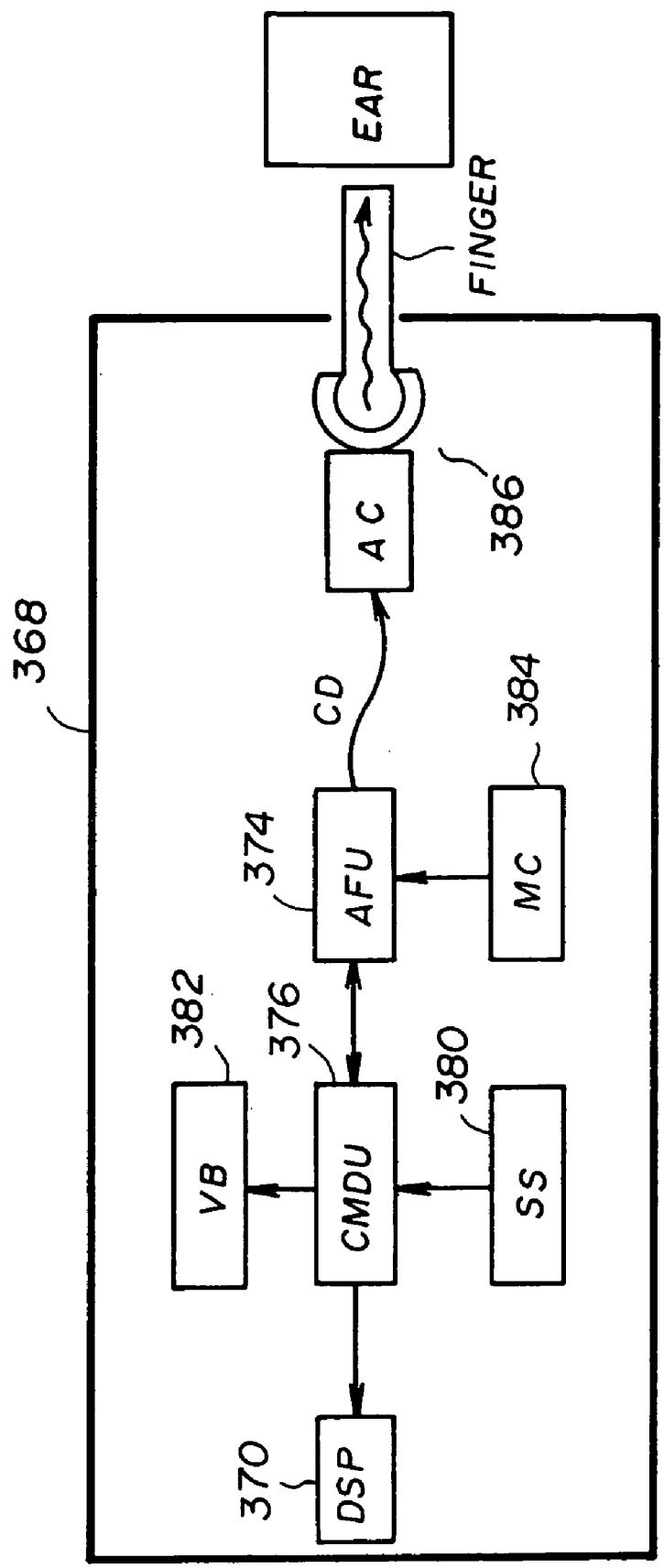
FIG. 69 is a block diagram showing the wearable PDA device according to a thirteenth embodiment of the present invention.

FIG. 69 shows a block diagram of the wearable PDA device. As shown in FIG. 69, the command unit (CMDU) 376 is connected to the display (DSP) 370 instead of the wireless telephone device shown in FIG. 67.

First, an operation example using a voice command will be described. In order to start the operation, the user inserts the fingertip into the ear canal while inputting a start command by the finger tap, or inserts the fingertip into the ear canal and then inputs the start command by the voice. The command unit (CMDU) 376 interprets the command so as to process for starting the operation. An operation command for a PDA function is input by the user's voice and outputs of the wearable PDA device 368 are sent back to the user's ear with a synthesized voice. At the end of the operation, the user inputs an end command by the finger tap or by voice.

Next, an operation in the case of checking a schedule with the finger tap as an example using the PDA function will be described in the following.

The user inputs a schedule checking command by the fingertip tap. Then, the command is interpreted by the command unit (CMDU) 376 and sent to the PDA device. The PDA device displays the schedule on the display (DSP) 370. A mechanism for automatically going into a sleep mode after a predetermined time may be provided preferably here.

Further, it is possible to use vibrations as an alarm which will be described below. If a scheduled time comes, the vibrator (VB) 382 vibrates to notify the user of the time coming and the time is displayed on the display (DSP) 370 at the same time. If the user needs to know about the schedule in detail, the user inserts the fingertip into the ear canal while inputting a detail command so that the user can hear the detailed schedule in a synthesized voice. At the same time, the detailed schedule is displayed on the display (DSP) 370. These are realized by the PDA device and the command unit (CMDU) 376. In addition, the user can also operates this PDA by wristwatch looking style. The command is input by tapping fingertips mutually in the air. Then, the schedule appears on the display (DSP) 370. In this case, no surface for the tapping is required. According to this embodiment, operability of a PDA device will improve in daily life since operations of buttons or a touch panel are not necessary in contrast to the prior art.

As mentioned above, according to the devices of the present embodiment, the user can hear a received voice without leaking the voice outside and can hear the received voice clearly even under a noisy environment since the user inserts the finger into the ear canal or put the finger on the ear canal so as to cover it up when using the devices.

Further, because the devices are operated in a posture such that the inside of the user's wrist is close to the mouth, the loudness of the user's utterance can be reduced. Therefore, the influence on the surrounding people by the utterance of the user while using the devices can be suppressed. Further, only the user may be notified of an incoming call without annoying surrounding people since the alert is by the vibrator.

Furthermore, the devices of the present invention can detect a weak finger tap as a command input stably while preventing movements caused by bending or twisting the wrist from being input erroneously without providing a new sensor for detecting the movements of the wrist. Also, sound leaking can be prevented since the devices can stop emitting the received voice when the actuator separates from the surface of the body. Moreover, because the devices can change the loudness or the tonal quality of the received voice so as to keep them constant according to the pushing pressure of the actuator to the surface of the body, the sound leakage can be prevented.

Therefore, the problems of the wrist wearable transmit/receive device disclosed in U.S. Pat. Nos. 5,381,387 and 5,499,292, and the problems of other conventional wearable transmit/receive devices will be solved by the present invention.

Further, according to the present invention, operability of a PDA device in daily life will improve because the wearable PDA device can accept a command by a finger tap or a voice.

The present invention is not limited to the specifically disclosed embodiments, and variations and modifications may be made without departing from the scope of the invention.

What is claimed is:

1. A wearable command input device for inputting information by tapping a finger of a user on a surface of an object or by tapping the fingertips mutually, wherein said wearable command input device can be mounted on the user's body and comprises:

detecting means for detecting tap vibrations which arise when the user taps the finger on the surface of the object and are transmitted through the user's finger;

a vibration generator, applicable to be mounted on the user's wrist, for generating wrist vibrations which arise when the user's wrist is bent or twisted and which have specific frequencies different from the frequencies of the tap vibrations;

extracting means for extracting tap signals which are signal components of the tap vibrations and wrist signals which are signal components of the wrist vibrations from output signals from said detecting means;

a trigger generator for outputting a series of trigger signals by detecting the presence or the absence of the tap signals while suppressing the detection of the tap signals from said extracting means if the wrist signals from said extracting means are detected; and a command generator for outputting commands corresponding to said trigger signals.

2. The wearable command input device as claimed in claim 1, said wearable command input device further comprising a command table for storing each command corresponding to each series of trigger signals, wherein said command generator outputs the command corresponding to the series of trigger signals with reference to said command table.

* * * * *